US010936077B2

(12) United States Patent
Funami

(10) Patent No.: US 10,936,077 B2
(45) Date of Patent: Mar. 2, 2021

(54) USER-INTERACTIVE GESTURE AND MOTION DETECTION APPARATUS, METHOD AND SYSTEM, FOR TRACKING ONE OR MORE USERS IN A PRESENTATION

(71) Applicant: Atsushi Funami, Tokyo (JP)

(72) Inventor: Atsushi Funami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 15/640,730

(22) Filed: Jul. 3, 2017

(65) Prior Publication Data

US 2018/0011543 A1    Jan. 11, 2018

(30) Foreign Application Priority Data

Jul. 5, 2016  (JP) .............................. JP2016-133342
Jul. 5, 2016  (JP) .............................. JP2016-133365

(51) Int. Cl.
*G06F 3/01*   (2006.01)
*G06F 3/0481*  (2013.01)
(Continued)

(52) U.S. Cl.
CPC .............. *G06F 3/017* (2013.01); *G06F 3/011* (2013.01); *G06F 3/012* (2013.01); *G06F 3/0304* (2013.01);
(Continued)

(58) Field of Classification Search
CPC .......... G06F 3/017; G06F 3/011; G06F 3/012; G06F 3/0304; G06F 3/0346; G06F 3/04812; G06F 3/04817; G06F 3/0484
See application file for complete search history.

(56) References Cited

U.S. PATENT DOCUMENTS 6,252,579 B1 * 6/2001  Rosenberg .............. G06F 3/016
                                              345/157
6,636,198 B1 * 10/2003  Gross .................. G06F 3/03543
                                              345/157
(Continued)

FOREIGN PATENT DOCUMENTS

JP      2013-539565      10/2013
JP      2014-026355      2/2014
(Continued)

OTHER PUBLICATIONS

Screen captures from YouTube video clip entitled "Dance Central Xbox 360 Kinect Gameplay Video," 7 pages, uploaded Oct. 28, 2010 by user "GameSpot." Retrieved from internet: https://www.youtube.com/watch?v=qIRK34wfCAY (Year: 2010).*
(Continued)

*Primary Examiner* — Abdullah Al Kawsar
*Assistant Examiner* — Samuel Shen
(74) *Attorney, Agent, or Firm* — IPUSA, PLLC

(57) ABSTRACT

An information processing apparatus includes a memory storing a program and at least one processor that executes the program to implement processes of detecting a speed of motion of a user based on motion information relating to a motion of the user that is detected by a detection device, and generating position information of a position indication display information item, which is displayed on a display device and indicates a position designated by the user, based on the motion information relating to the motion of the user. The position information of the position indication display information item is generated by restricting a moving direction of the position indication display information item to a predetermined direction when the detected speed of motion of the user does not meet a predetermined speed condition.

19 Claims, 33 Drawing Sheets

(51) Int. Cl.
   *G06F 9/451* (2018.01)
   *G06F 3/03* (2006.01)
   *G06F 3/0346* (2013.01)
   *G06F 3/0484* (2013.01)

(52) U.S. Cl.
   CPC .......... *G06F 3/0346* (2013.01); *G06F 3/0484* (2013.01); *G06F 3/04812* (2013.01); *G06F 3/04817* (2013.01); *G06F 9/453* (2018.02); *G06F 2203/04801* (2013.01)

(56) References Cited

U.S. PATENT DOCUMENTS

| | | | |
|---|---|---|---|
| 6,795,055 B1* | 9/2004 | Culler | G06F 3/038 345/157 |
| 9,384,384 B1* | 7/2016 | Tyagi | G06T 11/60 |
| 2009/0079813 A1* | 3/2009 | Hildreth | G06F 3/017 348/14.03 |
| 2010/0269072 A1 | 10/2010 | Sakata et al. | |
| 2010/0277411 A1 | 11/2010 | Yee et al. | |
| 2010/0281436 A1 | 11/2010 | Kipman et al. | |
| 2011/0154266 A1* | 6/2011 | Friend | G09B 21/009 715/863 |
| 2012/0110516 A1* | 5/2012 | Tumanov | G06F 3/017 715/863 |
| 2012/0157208 A1* | 6/2012 | Reville | G06F 3/04817 463/39 |
| 2013/0050458 A1* | 2/2013 | Kim | G06F 3/017 348/77 |
| 2013/0222246 A1* | 8/2013 | Booms | G06F 3/0484 345/168 |
| 2013/0241821 A1 | 9/2013 | Hiyama et al. | |
| 2013/0246955 A1* | 9/2013 | Schwesig | G06F 3/017 715/767 |
| 2014/0062862 A1 | 3/2014 | Yamashita | |
| 2014/0267008 A1 | 9/2014 | Jain et al. | |
| 2015/0095784 A1 | 4/2015 | Funami et al. | |

FOREIGN PATENT DOCUMENTS

| | | |
|---|---|---|
| JP | 2014-48936 | 3/2014 |
| JP | 2015-176451 | 10/2015 |
| JP | 2016-177595 | 10/2016 |
| WO | 2012/063560 | 5/2012 |
| WO | 2014/048686 | 4/2014 |
| WO | 2016/152070 | 9/2016 |

OTHER PUBLICATIONS

Screen captures from YouTube video clip entitled "Dance Central Xbox 360 Kinect Gameplay Video," 11 pages, uploaded Oct. 28, 2010 by user "GameSpot." Retrieved from internet: https://www.youtube.com/watch?v=qIRK34wfCAY (Year: 2010).*
Office Action dated Jan. 14, 2020 issued with respect to the corresponding Japanese Patent Application No. 2016-133342.
Japanese Office Action for 2016-133365 dated Mar. 10, 2020.
Extended European Search Report for 17178703.9 dated Jan. 18, 2018.
Partial European Search Report dated Sep. 12, 2017 issued with respect to the corresponding European Patent Application No. 17178703.9.

* cited by examiner

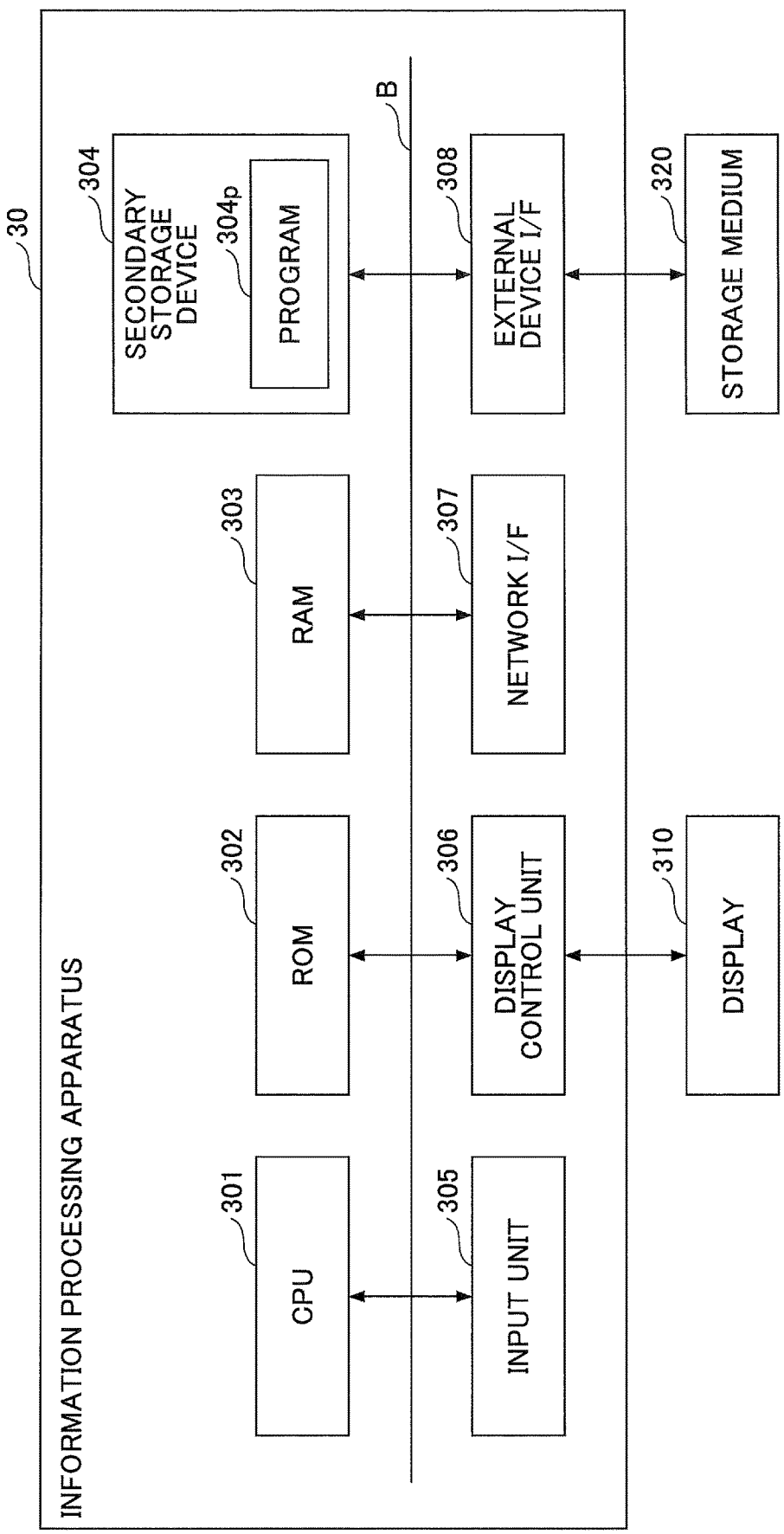

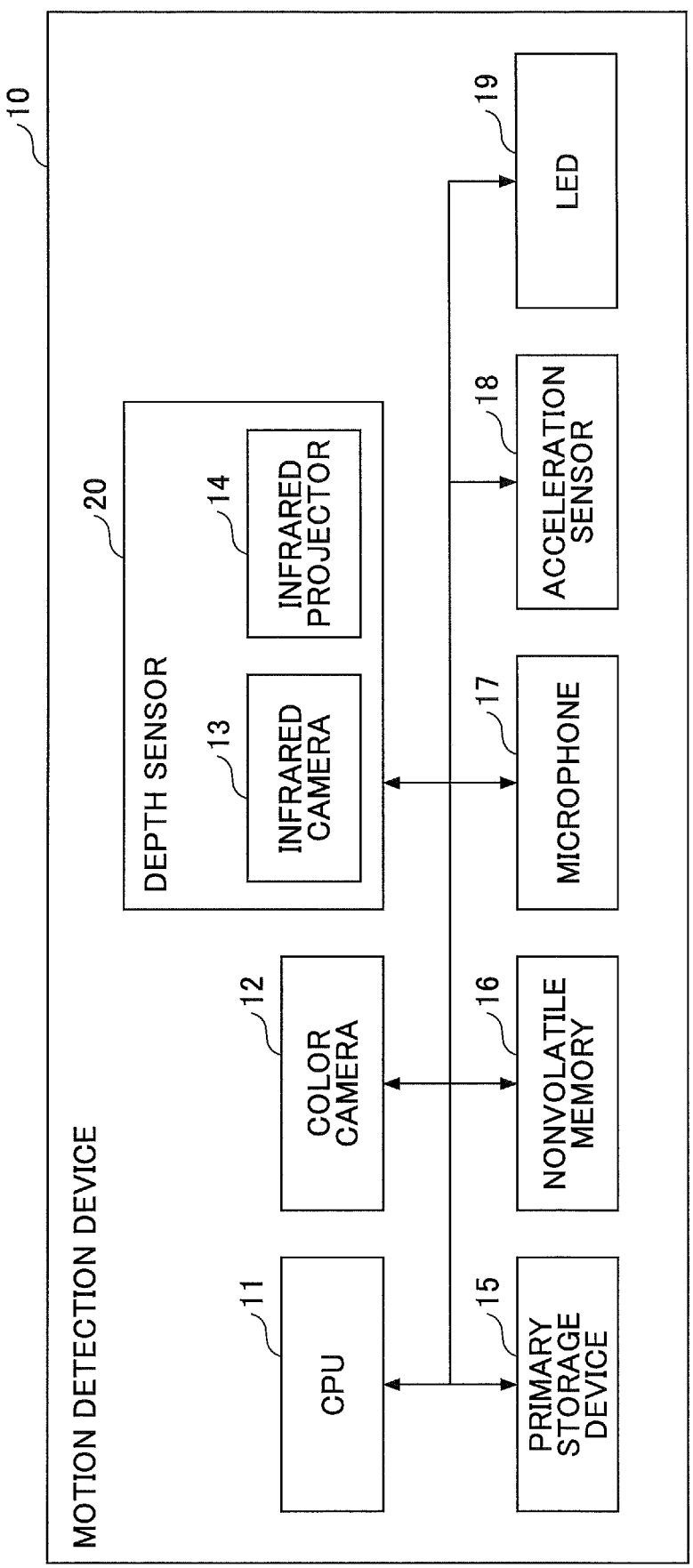

FIG.10
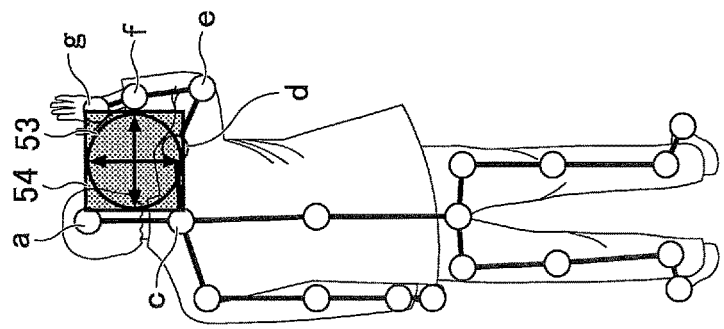
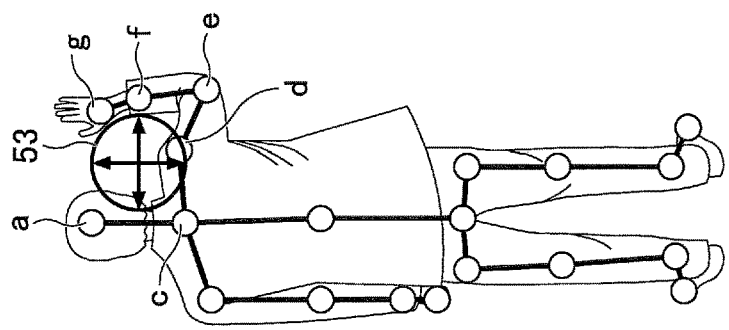
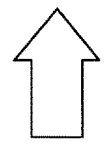
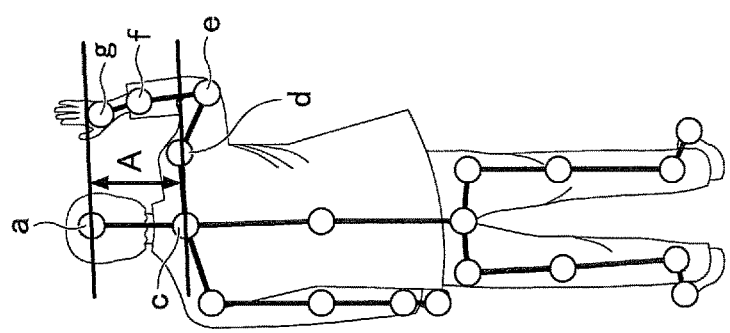

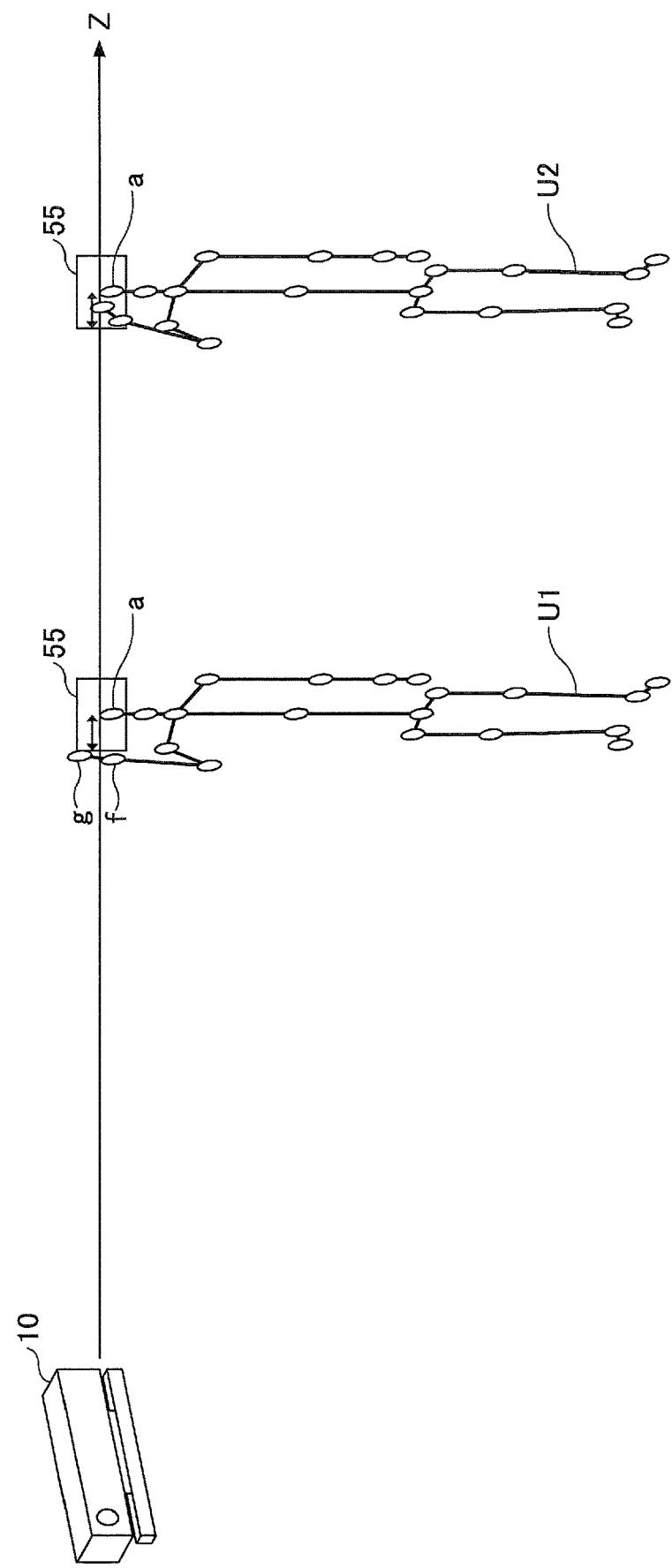

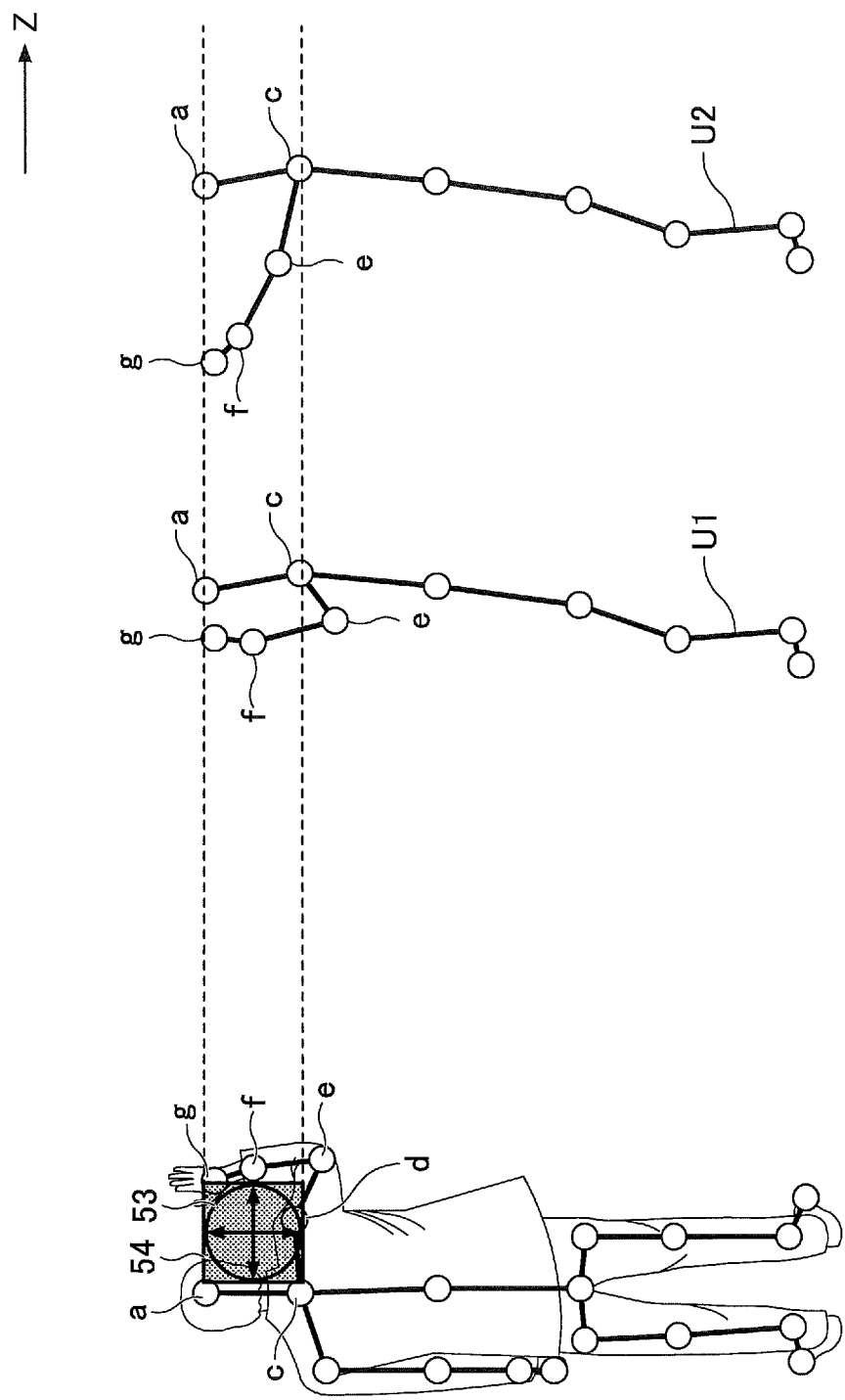

FIG.26

```
<TrackingInfos>
 <TrackingInfo>
  <TrackingID>7205759404127799Z</TrackingID> Individual ID
  <RecordDate>2016/06/23 13:40:09.943</RecordDate> Record date/time
  <FaceTrackingInfo>
   <FaceEngagement>No</FaceEngagement> ?
   <Glasses>Unknown</Glasses> Whether user is wearing glasses
   <Happy>Unknown</Happy> Whether user looks happy
   <LeftEyeClosed>Unknown</LeftEyeClosed> Whether the left eye is closed
   <RightEyeClosed>Unknown</RightEyeClosed> Whether the right eye is closed
   <LookingAway>Yes</LookingAway> Whether user is looking away from display
   <MouthMoved>Unknown</MouthMoved> Whether the mouth is moving
   <MouthOpen>Unknown</MouthOpen> Whether the mouth is open
   <Yaw>-40</Yaw> Face orientation in the lateral direction; positive when the neck is turned toward the left side of sensor and negative when the neck is turned toward the right side of sensor
   <Pitch>-25</Pitch> Face orientation in the vertical direction; positive when facing upward with respect to sensor and negative when facing downward with respect to sensor
   <Roll>-14</Roll> Face tilt (zero when the eyes and the mouth are upright vertical)
  </FaceTrackingInfo>
  <PositionInfo>
   <X>-2.1</X> Lateral distance from the center of sensor; positive value meaning to the right and negative value meaning to the left
   <Y>1.81</Y> Height
   <Z>4.19</Z> Distance from sensor
  </PositionInfo>
  <MouseTrackingInfo>
   <LeftButtonDown>Yes</LeftButtonDown> Whether left mouse button is being pressed
   <RightButtonDown>No</RightButtonDown> Whether right mouse button is being pressed
  </MouseTrackingInfo>
  <MousePositionInfo>
   <X>250</X> X coordinate of cursor
   <Y>300</Y> Y coordinate of cursor
  </MousePositionInfo>
 </TrackingInfo>
 <TrackingInfo>
  · Repeat
  ·
 </TrackingInfo>
</TrackingInfos>
```

USER-INTERACTIVE GESTURE AND MOTION DETECTION APPARATUS, METHOD AND SYSTEM, FOR TRACKING ONE OR MORE USERS IN A PRESENTATION

CROSS-REFERENCE TO RELATED APPLICATIONS

The present application claims priority under 35 U.S.C. § 119 to Japanese Patent Application No. 2016-133342 filed on Jul. 5, 2016 and Japanese Patent Application No. 2016-133365 filed on Jul. 5, 2016, the entire contents of which are incorporated herein by reference.

BACKGROUND OF THE INVENTION

1. Field of the Invention

The present invention relates to an information processing apparatus, a position information generation method, and an information processing system.

2. Description of the Related Art

Systems for displaying information on a display installed at a location where people gather or where people pass by are known. In such systems, an information processing apparatus is connected to a display via a network, for example, so that the information processing apparatus can provide useful information, such as advertisements, the weather, and the news, by displaying a still image or a moving image on the display. Such systems and mechanisms are referred to as digital signage. The display may be installed outdoors, or in storefronts, public spaces, transportation facilities, passageways, and the like, and can provide detailed and new information to commuters, visitors, and facility users, for example (hereinafter simply referred to as "users").

Typically, the main function of a digital signage with a large screen is to display information unilaterally. However, from the viewpoint of the user, because information that is displayed by the digital signage changes constantly, even if a particular display of information piques the interest of the user, the user may not be able to carefully view this particular information, for example. Also, from the viewpoint of the information provider, when the information provider is merely providing information without obtaining any feedback, such as the reaction of users to certain content, the information provider may be unable to determine the types of information that attract the interest of users, for example. Further, the user cannot easily control the digital signage to display detailed information relating to information that has been displayed, and the information provider cannot easily provide detailed information relating to information that has piqued the interest of a user, for example. That is, it has been difficult to enable a digital signage to perform interactive (bidirectional) operations.

To enable interactive operations, an input device for enabling the user to input an operation may be provided near the display, for example. However, it may be difficult to secure an installation space for the input device, or even if there is space to install the input device, there is a substantial risk of the input device being damaged or stolen, for example. In this respect, an operation mode in which a digital signage detects a gesture made by a user and accepts an operation based on the detected gesture of the user has been contemplated. Such an operation mode may be implemented by a pointing control device that moves a cursor displayed on a display screen based on a detected motion of a user and adjusts the movement of the cursor based on distance information of the user, for example.

SUMMARY OF THE INVENTION

According to one embodiment of the present invention, an information processing apparatus is provided that includes a memory storing a program and at least one processor that executes the program to implement processes of detecting a speed of motion of a user based on motion information relating to a motion of the user that is detected by a detection device, and generating position information of a position indication display information item, which is displayed on a display device and indicates a position designated by the user, based on the motion information relating to the motion of the user. The position information of the position indication display information item is generated by restricting a moving direction of the position indication display information item to a predetermined direction when the detected speed of motion of the user does not meet a predetermined speed condition.

BRIEF DESCRIPTION OF THE DRAWINGS

FIG. 3 is a diagram illustrating an example hardware configuration of an information processing apparatus;

FIG. 4 is a diagram illustrating an example hardware configuration of a motion detection device;

FIG. 10 is a diagram illustrating an operation area;

FIG. 13 is a side view of a cube defined in FIGS. 12A-12B;

FIG. 15 is a side view of three-dimensional coordinates of a wrist joint or a hand joint of a user;

FIG. 26 is a diagram illustrating an example of sensor information recorded by an information recording unit for analyzing face orientation;

DESCRIPTION OF THE EMBODIMENTS

Figure 1A:
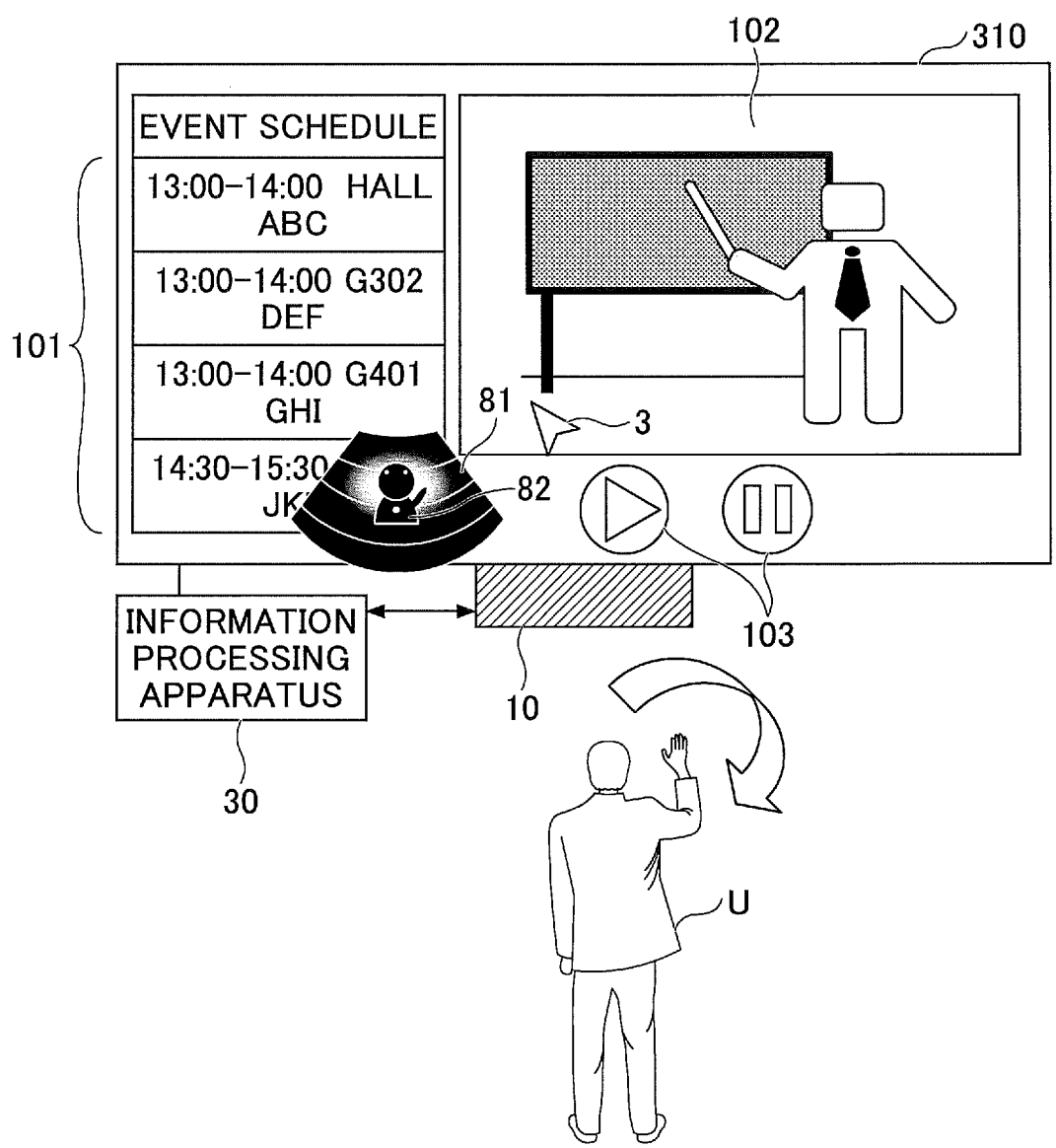
FIGS. 1A-1D are diagrams illustrating example operations of an information processing system including a display.

In a digital signage that accepts an operation based on a gesture or a motion made by a user, it is not always easy for the user to operate a cursor to an arbitrary position by moving the hand or arm. This is because movement of the hand or arm can be influenced by unconscious movement such as shaking of the body, and it may be difficult to distinguish a conscious movement of the hand or arm to operate the cursor from other arbitrary movements. Also, errors are inherently included information that detects the position of the hand or arm of the user within a given space. Thus, for example, it may not be easy to move a cursor to a desired position as intended by the user or to press an operation button at a desired position as intended by the user.

In view of the above, one aspect of the present invention is directed to providing an information processing apparatus that can facilitate input of position information of a position indication display information item, such as a cursor, that is displayed on a digital signage, for example.

Also, a user may have trouble figuring out where the user has to be positioned in order to operate the digital signage. Because a digital signage is typically installed at a location where many users come and go, the digital signage is most likely viewed by more than one user at one time. That is, the digital signage is most likely viewed by multiple users at the same time. When all the users viewing the digital signage are able to operate the digital signage, it may be difficult to accept and implement each operation desired by each user, for example. Also, if all the users viewing the digital signage are able to operate the digital signage, an unconscious movement of a user that is merely passing by may interfere with that of a user that actually wants to operate the digital signage.

In this respect, a motion detection device may be configured to detect the motion of only a user that is standing at a specific position, for example. By arranging the specific position to be a relatively small area, the number of users subjected to motion detection by the motion detection device may be limited (e.g., one user).

However, to enable a user to recognize the specific position at which the user can operate the digital signage, a physical indicator (e.g., tape, paint, or some other marking) may have to be prepared by an administrator of the digital signage. Also, the physical indicator has to be accurately placed at the position where the motion of a user can be detected by the motion detection device. As such, additional time and costs may be required for setting up such physical indicator.

In view of the above, another aspect of the present invention is directed to providing an information processing apparatus that can guide a user to an operation position for enabling the user to input an operation with respect to display content.

In the following, embodiments of the present invention are described with reference to the accompanying drawings.

<Information Processing System>

Figure 1B:
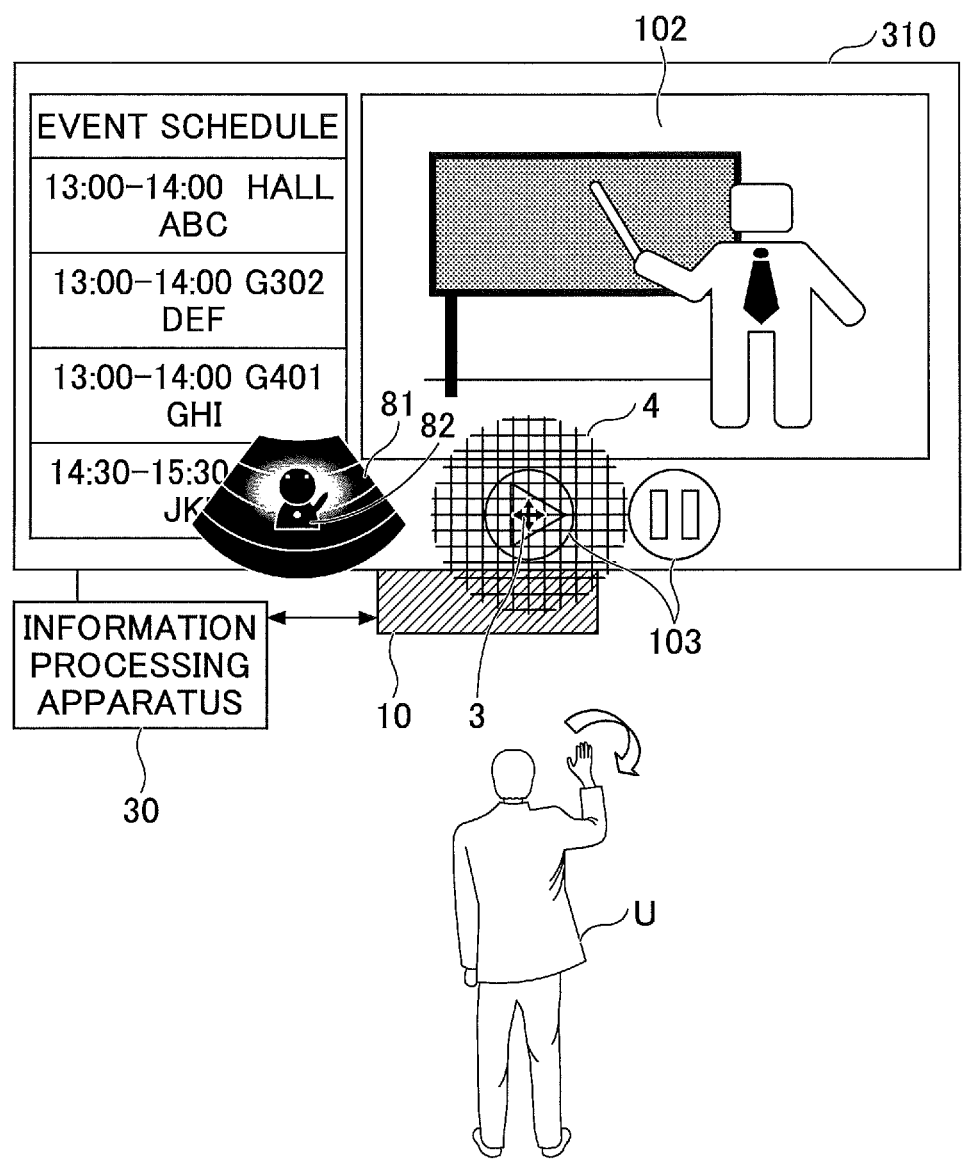
Figure 1C:
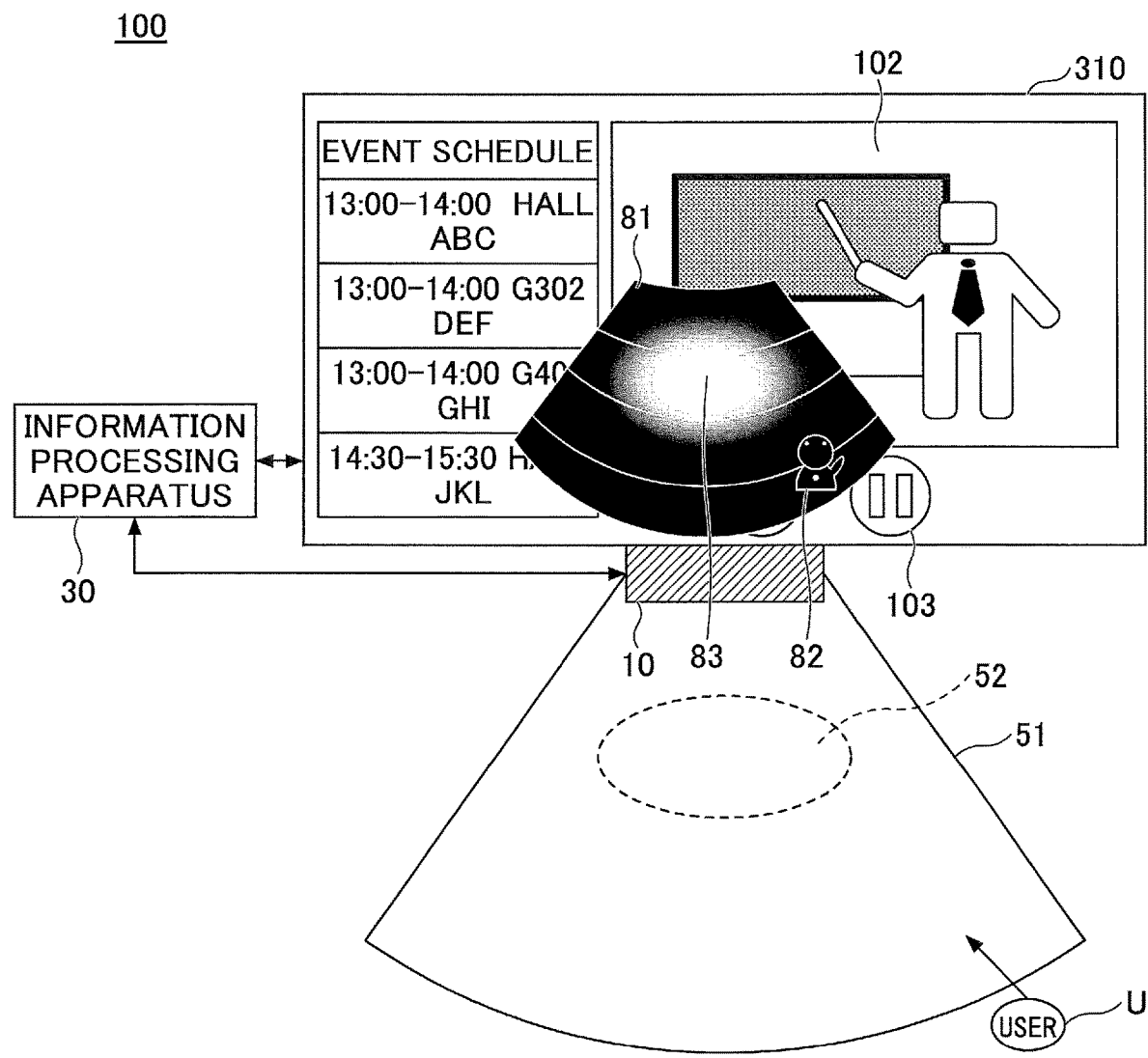
Figure 1D:
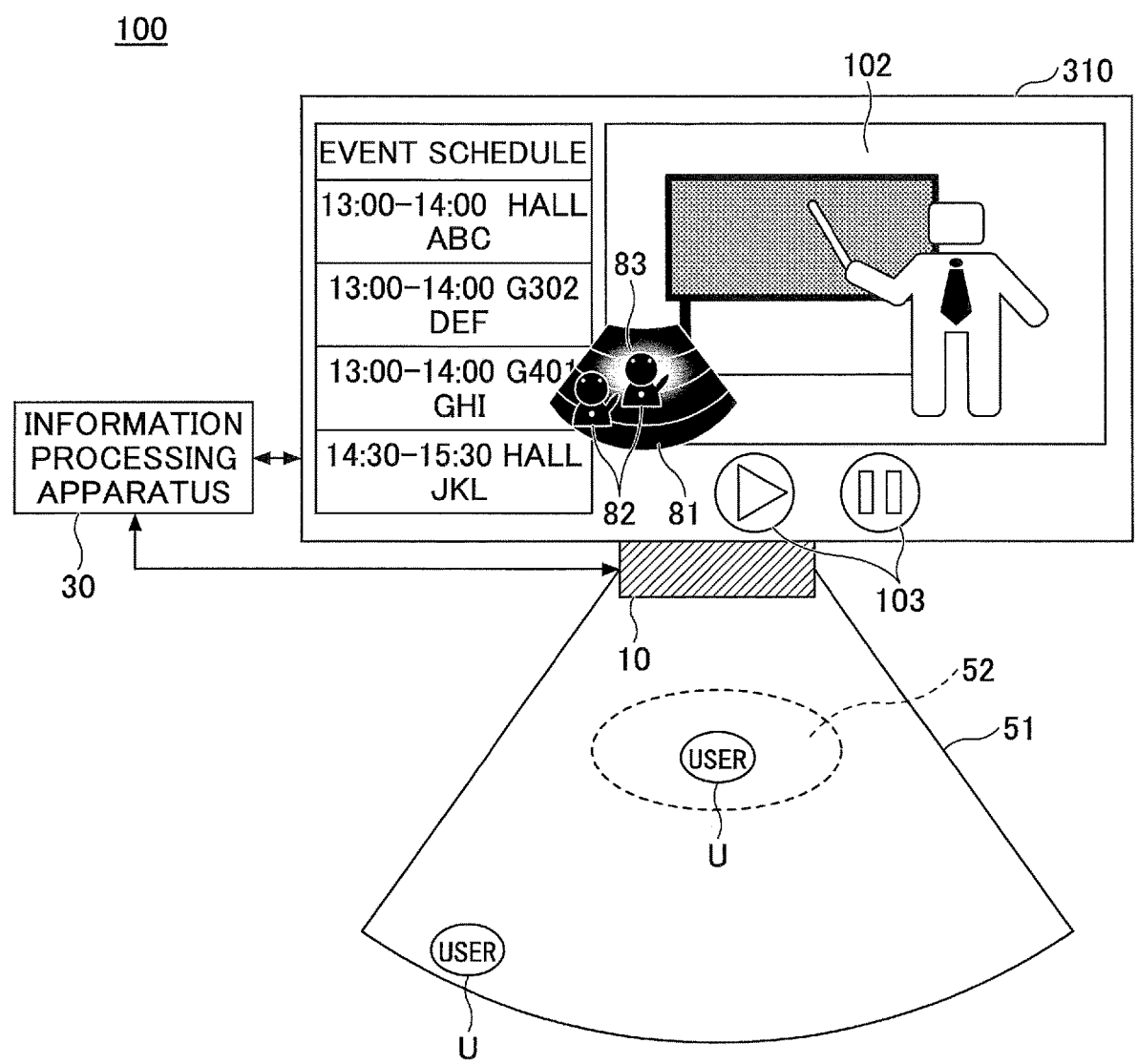

In the following, schematic features of an information processing system 100 according to an embodiment of the present invention will be described. FIGS. 1A-1D are diagrams illustrating example operations of an information processing system 100 including a display 310. FIGS. 1A and 1B illustrate operations of controlling the position of a cursor 3 displayed on the display 310. FIGS. 1C and 1D illustrate operations of guiding a user to an operation position 52.

As illustrated in FIG. 1A, the information processing system 100 includes a motion detection device 10, an information processing apparatus 30, and the display 310. The display 310 displays a content list 101 and a moving image 102 as digital signage, and also displays various operation buttons 103 for inputting operations (e.g., for playing or stopping the moving image 102). The information processing apparatus 30 displays an operation accepting support icon 81 on the display 310. Note that the operation accepting support icon 81 may always be displayed on the display 310 or displayed when the motion detection device 10 detects a user U. The information processing apparatus 30 further displays a person icon 82 representing the user U within the operation accepting support icon 81 when the motion detection device 10 detects the user U. In this way, the user U may be aware that his/her standing position and movement are being detected.

The user U makes a predetermined motion for operating the cursor 3 in front of the motion detection device 10. The motion detection device 10 detects three-dimensional coordinates of the joints of the user U and transmits the acquired three-dimensional coordinates to the information processing apparatus 30. The information processing apparatus 30 transforms the three-dimensional coordinates of a wrist joint or hand joint of the user U into a position of the cursor 3 on the display 310 and displays the cursor 3 at this position.

The information processing apparatus 30 according to the present embodiment switches a determination method for determining the position of the cursor 3 depending on a speed of motion of the user U. When the speed of motion is greater than or equal to a threshold value, the information processing apparatus 30 transforms the three-dimensional coordinates of the wrist joint or hand joint of the user U into a position of the cursor 3. That is, the three-dimensional coordinates of the writs joint or hand joint of the user U is associated with a corresponding position of the cursor 3. Such a method of determining the position of the cursor 3 is hereinafter referred to as "normal cursor position determination method".

In the following, a method of determining the position of the cursor 3 in the case where the speed of motion is less than the threshold value will be described with reference to FIG. 1B. In this case, the information processing apparatus 30 classifies the direction of movement of the hand or wrist of the user U into one of the directions up, down, left, and right, and moves the cursor 3 in one of these directions. As illustrated in FIG. 1B, when the speed of motion is less than the threshold value, the information processing apparatus 30 displays a guide mesh 4. Also, the current position of the cursor 3 is emphatically displayed on the guide mesh 4. Note that in the present case, even if the user U moves the wrist joint or hand joint diagonally, the information processing apparatus 30 determines that the user's hand has moved in the longitudinal direction or lateral direction and moves the cursor 3 only in the directions up, down, left, or right.

The user U controls the position of the cursor 3 in the above described manner and performs a predetermined gesture corresponding to a click event (described below). For example, the user U may perform a left-click operation with respect to the operation button 103 or select the content list 101 to be scrolled.

The determination method for determining the position of the cursor 3 used when the speed of motion is less than the threshold value restricts the moving direction of the cursor 3. However, when the user U tries to make a small movement to move the cursor 3 slightly, the user may not necessarily be able to accurately move the wrist joint or hand joint in the direction intended by the user U due to shaking of the user's body and other influences. For example, even though the user U intended to move the cursor 3 in a diagonal direction, the cursor 3 may end up being moved in the longitudinal or lateral direction, or even if the user U intended to move the cursor 3 in the longitudinal direction or lateral direction, the cursor 3 may end up being moved in a diagonal direction. Also, the three-dimensional coordinates detected by the motion detection device 10 may include detection errors, and such errors may not be negligible when the user U is attempting to make slight movements. Thus, even if the three-dimensional coordinates are directly transformed into a position of the cursor 3, it may be difficult to move the cursor 3 to the position intended by the user U.

In this respect, when the moving direction of the cursor 3 is restricted to the directions up, down, left, and right, it may be easier to move the cursor 3 in the direction intended by the user U. For example, in a case where the user U intends to move the cursor 3 to the right, even if the body of the user U is shaking or the wrist joint or hand joint does not move in the exact direction intended (right), it is unlikely for the wrist or hand to move upward, downward, or to the left. Also, even when a detection error of the motion detection device 10 is included, the error may only have influences in the longitudinal and lateral directions. Thus, it may be easier for the user U to move the cursor 3 in the intended direction.

As described above, in the information processing system 100 according to the present embodiment, when the speed of motion of the user U is less than the threshold value, it is presumed that the user U is making a slight movement of the cursor 3 and the moving direction of the cursor 3 is restricted to a predetermined direction. In this way, operability at the time of inputting the position of the cursor 3 can be improved, for example.

Referring to FIGS. 1C and 1D, the motion detection device 10 detects a user U that has entered a human detection range 51 having a predetermined angle range and a predetermined distance range. Further, the motion detection device 10 detects a standing position and movement of a user U that is positioned at an operation position 52 within the human detection range 51.

The display 310 may always display the operation accepting support icon 81 or the operation accepting support icon 81 may be displayed when the motion detection device 10 detects a user U. An operation position indication display 83 (described below) is displayed in the operation accepting support icon 81. When the motion detection device 10 detects a user, the person icon 82 representing the user U detected by the motion detection device 10 is displayed in the operation accepting support icon 81. The person icon 82 is displayed at a position within the operation accepting support icon 81 corresponding to the standing position of the user U within the human detection range 51.

In this way, the user U viewing the display 310 may be able to determine that the user U has been detected. Also, the user U may determine that when the user U moves, the person icon 82 also moves accordingly.

The use U is made aware through guidelines or the like that to operate the digital signage, the user U has to move the person icon 82 to the operation position indication display 83. The user U moves within the human detection range 51 so that the person icon 82 that changes position as the user U moves (the person icon 82 representing the user U) enters the operation position indication display 83. When the person icon 82 is located at the operation position indication display 83, this means that the user U is located at the operation position 52.

By having the user U move such that the person icon 82 moves to the operation position indication display 83 in the above-described manner, the user U may easily move to the operation position 52 where the movement of the use U would be detected by the motion detection device 10. The information processing apparatus 30 can detect the position of the user U within the human detection range 51, convert the position of the user U into a corresponding position in the operation accepting support icon 81 to display the person icon 82, and guide the user U to the operation position 52.

In this way, the information processing system 100 according to the present embodiment can guide the user U where to move in order to operate the digital signage without using physical indicators, such as tape, paint, or some other marking, which will have to be placed at the operation position 52 by an administrator or content provider, for example. Note, however, that providing physical indicators may make it even easier for the user U to recognize the operation position 52.

<Terminology>

Motion information is information representing motion of a user. Also, motion information may include motion of the user that is converted into a format that can be interpreted by the information processing apparatus 30. Also, motion information may include information for inputting a user operation to the information processing apparatus 30 without physical contact. Specifically, motion information may include information relating to a position, a posture, a movement of a limb of the user, for example. Note that in the following descriptions, the term "sensor information" is used to describe an example of the motion information.

A position indication display information item is a display object that displays a position designated by the user on a display device. The display object is a concept including an image, a number, a letter, a symbol, and a figure. The display object may also be displayed as a combination of two or more of the above types of display objects, for example. Generally, a position may be indicated by some pointing device, such as a mouse (device), a trackball, or some other input device. The display object indicating a position may be called a cursor, a mouse, a mouse cursor, a mouse pointer, a movement key, and the like. In the following descriptions, the term "cursor" is used to describe an example of the position indication display information item.

A gesture is a predetermined motion from among various motions made by a user. That is, a specific motion that is predefined is referred to as a gesture. For example, a gesture is used as an event for operating the information processing apparatus 30.

Also, a speed of motion may be defined by the amount of movement per unit time or the amount of movement of a predetermined part of the user U in unit time, for example. In the following descriptions, the speed of motion of the hand is used as an example. Note that the hand includes the wrist and all joints beyond the wrist, but the hand may also be broadly construed to include the elbow or parts of the arm between the elbow and the wrist, for example.

Not meeting a predetermined speed condition refers to a case of detecting an intention of a user relating to control of the cursor position. The intention of the user refers to the intention to control the cursor position with high accuracy. Not meeting the predetermined speed condition may be, for example, the speed of motion being less than a threshold value (not reaching the threshold value), or the speed of motion not being within a predetermined range. In the following descriptions, an example case is described where not meeting the predetermined speed condition means the speed of motion is less than a threshold value.

User position information relating a user position of a user may include information specifying the position of the user and information representing the position of the user. For example, the user position information may include a relative position of the user relative to the motion detection device 10. Note that if the positions of the motion detection device 10 and a display device are fixed, the user position may also be referred to as a relative position of the user relative to the display device. Note that the user position information may also include absolute position information such as coordinates of the user position.

A display position on the display device refers to a position on the display device, such as the display 310. For example, a display position on the display device may be indicated by a cursor.

Display content displayed on the display device generally refers to visually discernible information that is displayed on the display device. Note that when audio is streamed along with the display content, the display content may be construed to include such audio as well.

User position display information refers to display information representing a user or the position of the user on the display device. In the following descriptions, the term "person icon 82" is used to describe an example of the user position display information.

Guidance position display information refers to display information displayed on the display device for guiding a user to a predetermined position. Alternatively, guidance position display information may represent a preferred position of the user. In the following descriptions, the term "operation position indication display 83" is used to describe an example of the guidance position display information.

<System Configuration>

Figure 2A:
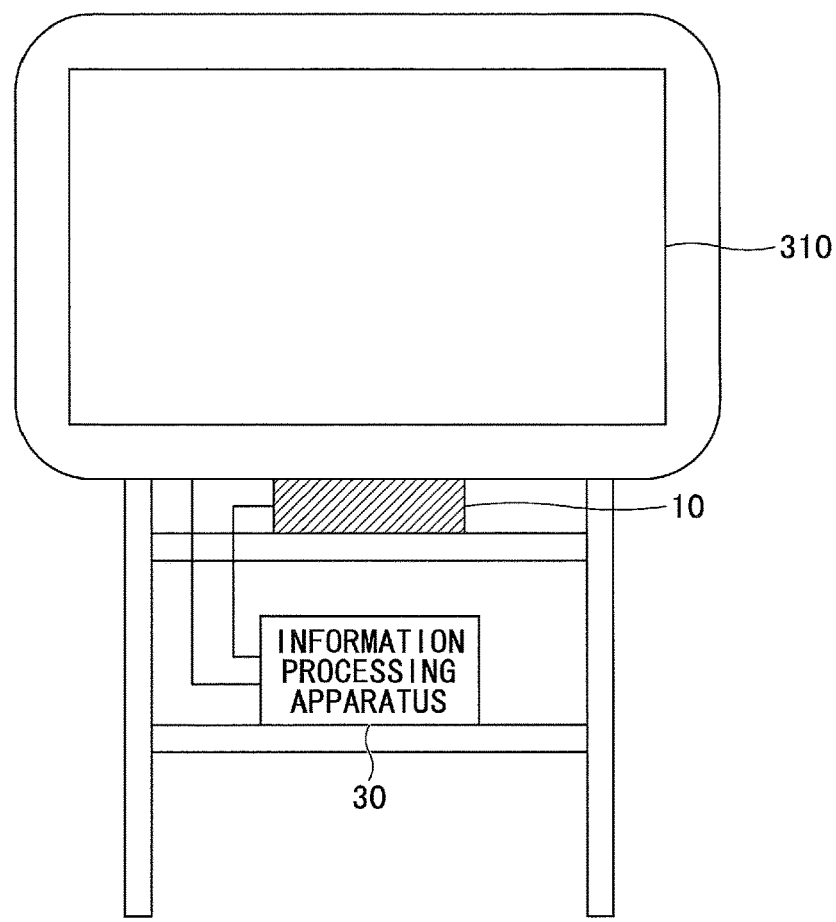
FIGS. 2A and 2B are diagrams illustrating example configurations of the information processing system.
Figure 2B:
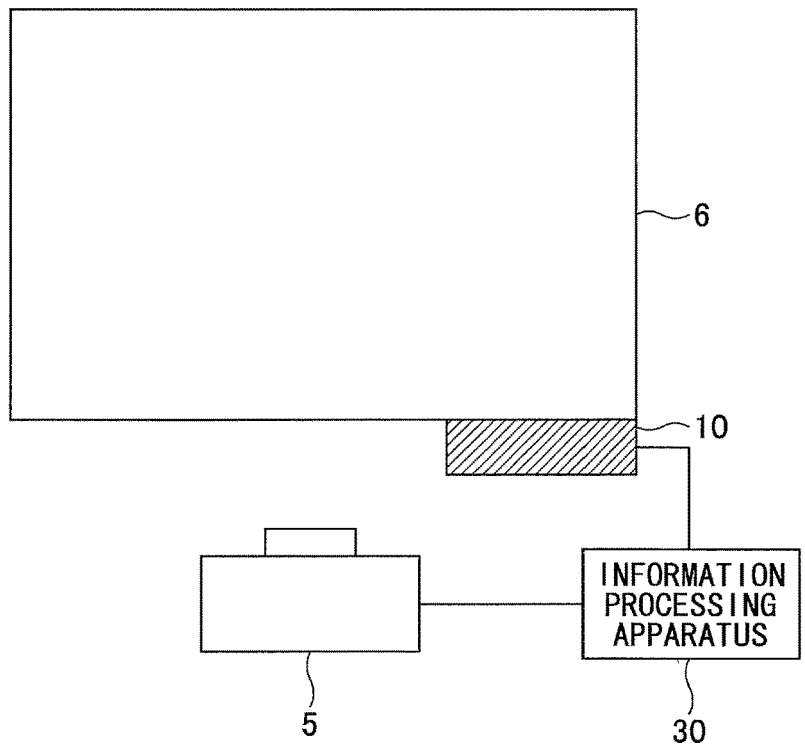

FIGS. 2A and 2B are diagrams illustrating example system configurations of the information processing system 100. As illustrated in FIG. 2A, the information processing system 100 may include the display 310, the motion detection device 10, and the information processing apparatus 30. The motion detection device 10 is connected to the information processing apparatus 30 by a cable, such as a USB cable or an IEEE 1394 cable, and the information processing apparatus 30 and the display 310 are connected to each other via a cable for DisplayPort (registered trademark), DVI (Digital Visual Interface), HDMI (High-Definition Multimedia Interface, registered trademark), VGA (Video Graphics Array), or some other connection standard. Note that the motion detection device 10 and the information processing apparatus 30 may communicate wirelessly, such as via a wireless LAN, Bluetooth (registered trademark), ZigBee (registered trademark), or the like. Similarly, the information processing apparatus 30 and the display 310 may communicate wirelessly, such as via a wireless LAN or a wireless HDMI protocol, for example.

The information processing apparatus 30 can be a general-purpose computer such as a PC (Personal Computer), a tablet terminal, a smartphone, a mobile phone, or a PDA (Personal Digital Assistant), for example. The information processing apparatus 30 runs an OS (operating system) 130, which has a function of detecting the position of a pointing device, such as a mouse or a touch panel, and displaying the cursor 3 at this position (see FIG. 6). The OS 130 also detects events performed by the pointing device (e.g., left-click, right-click, double-click, mouse-over, mouse-down, mouse-up). The information processing apparatus 30 also runs various types of application software, including application software 120, on the OS 130. The OS 130 notifies the application software 120 of the position and event of the pointing device, and the application software 120 executes process operations based on the event performed at the position of the pointing device.

In the present embodiment, the motion detection device 10 and a gesture operation accepting program 110 (described below) operate as a pointing device. The gesture operation accepting program 110 is a program run on the information processing apparatus 30 for acquiring sensor information from the motion detection device 10 and converting the acquired sensor information into a position of the cursor 3, and detecting an event, for example. The gesture operation accepting program 110 notifies the application software 120 (described below) of the position the cursor 3 and the detected event. Thus, the application software 120 can operate without taking into account the pointing device (i.e., the application software does not have to implement any changes due to the pointing device being the motion detection device 10).

The display 310 may be a liquid crystal display device, a display device using organic electroluminescence, or a display device using plasma light emission, for example. The application software 120 creates a screen, which may be referred to as a CUI (Character User Interface) or a GUI (Graphical User Interface), and displays the screen on the display 310.

Note that any device equipped with the display 310 may be used as the display 310. For example, a display provided in an electronic whiteboard, a notebook PC, or some other device can be used as the display 310.

The motion detection device 10 is a sensor for detecting motion of a person. For example, when a space is imaged with a stereo camera, parallax for each pixel of image data and distance information for each pixel of image data can be obtained. Also, by performing pattern recognition of the image data, a person may be detected or a movement of the person may be recognized, for example. Specifically, three-dimensional coordinates and posture of the palm, the wrist, the shoulder, or some other body part of the person can be obtained. Kinect (registered trademark) is known as a sensor suitable for detecting such human motion. The features and functions of Kinect will be described in detail below. Note that the motion detection device 10 does not necessarily have to be the Kinetic, but may be some other sensor or camera having the same functions as the Kinect. For example, a stereo camera or a camera for detecting the distance by TOF (Time Of Flight) may also be used as the motion detection device 10.

It should be noted that the installation position of the motion detection device 10 in FIG. 2A is merely one example, and the motion detection device 10 may also be installed on the upper side, the left side, or the right side of the display 310. Further, the installation position of the information processing apparatus 30 in FIG. 2A is merely one example, and the information processing apparatus 30 may also be installed behind the display 310, for example. Further, the information processing apparatus 30 may be connected to the motion detection device 10 via a network, for example.

FIG. 2B shows another example system configuration of the information processing system 100. As illustrated in FIG. 2B, the information processing system 100 may include a projector 5 instead of the display 310. In this case, the information processing system 100 includes the motion detection device 10, the projector 5, and the information processing apparatus 30. The projector 5 is a display device that projects an image onto a projection surface 6, such as a screen, using LCD (liquid crystal display), LCOS (liquid crystal on silicon), or DLP (Digital Light Processing), for example.

The projector 5 and the information processing apparatus 30 may be connected in a manner similar to the connection between the display 310 and the information processing apparatus 30. The projector 5 is preferably capable of projecting an image from a so-called extremely single focal point. This makes it easier to secure a space for the user U to perform operations. The motion detection device 10 may be positioned toward the user U or toward the projection surface 6 (screen) with respect to the projector 5. If the motion detection device 10 is positioned toward the screen, it may be fixed to the lower side, upper side, left side or right side of the screen, for example. Also, if the motion detection device 10 is positioned toward the user U, it may be installed on a stand, for example. Note that although the motion detection device 10 is installed at the right side of the projector 5 in FIG. 2B, this is merely one example, and the motion detection device 10 may also be installed at the left side of the projector 5, for example. The motion detection device 10 may preferably be installed at the right side or left side of the projector 5 in order to avoid exposure to waste heat from the projector 5, for example. If waste heat would not be a substantial issue, the motion detection device 10 may be installed at any location.

Note that in some examples, the display 310 and the projector 5 may be used together. In this case, for example, the projector 5 may project an arrow or the like toward the floor, so that the user can be guided to an operation position 52 (see FIG. 8). Also, the projector 5 may indicate a travelling direction by displaying an arrow (e.g., direction of the elevator, direction of the operation position 52).

<Hardware Configuration>
<<Hardware Configuration of Information Processing Apparatus>>

FIG. 3 is a diagram illustrating an example hardware configuration of the information processing apparatus 30. The information processing apparatus 30 includes a CPU 301, a ROM 302, a RAM 303, and a secondary storage device 304. Further, the information processing apparatus 30 as a server for private use may include an input unit 305, a display control unit 306, a network I/F 307, and an external device I/F 308. Note that the above units of the information processing apparatus 30 are connected to each other via a bus B.

The CPU 301 executes various programs and an OS that are stored in the secondary storage device 304. The ROM 302 is a nonvolatile memory. The ROM 302 stores programs and data for the CPU 301 to execute various programs stored in the secondary storage device 304.

The RAM 303 is a primary storage device, such as DRAM (Dynamic Random Access Memory) or a SRAM (Static Random Access Memory). Programs stored in the secondary storage device 304 are loaded in the RAM 304 upon being executed by the CPU 301, and the RAM 303 serves as a work area of the CPU 301.

The secondary storage device 304 stores various programs 304p to be executed by the CPU 301 and various databases used when the CPU 301 executes the various programs. The secondary storage device 304 is a nonvolatile memory, such as an HDD (Hard Disk Drive) or an SSD (Solid State Drive), for example.

The input unit 305 is an interface for an operator to input various instructions to the information processing apparatus 30. For example, the input unit 305 may include a keyboard, a mouse, a touch panel, and/or a voice input device. Note that in the present embodiment the input unit 305 does not necessarily have to be connected to the information processing apparatus 30 at all times and may be connected as necessary, for example.

The display control unit 306 displays various items of information held by the information processing apparatus 30 on the display 310. For example, the display control unit 306 may display the cursor 3, a menu, a window, a character, an image, or the like in response to a request from the CPU 301. The display control unit 306 may be implemented by a graphic chip or an interface (I/F) with the display 310, for example.

The network I/F 307 is a communication device that communicates with other devices via a network. The network I/F 307 may be implemented by an Ethernet (registered trademark) card, for example, but it is not limited thereto.

The external device I/F 308 is an interface for connecting a USB cable or a storage medium 320, such as a USB memory. In the present embodiment, the motion detection device 10 is connected to the information processing apparatus 30 via the external device I/F 308.

The information processing apparatus 30 preferably supports cloud computing. Also, note that the information processing apparatus 30 does not necessarily have to be accommodated within a single housing or provided as one unit. For example, the information processing apparatus 30 may be configured such that hardware resources can be dynamically connected/disconnected according to the load.

<<Hardware Configuration of Motion Detection Device>>

FIG. 4 is a diagram illustrating an example hardware configuration of the motion detection device 10. The motion detection device 10 includes a CPU 11, a color camera 12, an infrared camera 13, an infrared projector 14, a primary storage device 15, a nonvolatile memory 16, a microphone 17, an acceleration sensor 18, and an LED 19. The CPU 11 loads firmware stored in the nonvolatile memory 16 into the primary storage device 15 and executes the firmware to thereby control operations of the motion detection device 10. The primary storage device 15 is a high-speed volatile memory such as DRAM, for example, and the nonvolatile memory 16 may be a flash memory, for example.

The color camera 12 may be an imaging device for capturing a color image with a resolution of 1920×1080, for example. In this case, RGB density information may be obtained for each pixel. The infrared camera 13 and the infrared projector 14 make up a depth sensor (distance sensor) 20. The infrared projector 14 projects pulse-modulated infrared rays, and the infrared camera 13 captures an image of the infrared rays projected by the infrared projector 14. The depth sensor 20 measures the time it takes for an infrared light ray that is projected to return after being reflected and obtains distance information for each infrared ray that is projected. Note that the resolution of the distance information is 512×424 in the present embodiment, but this is merely one example.

Also, the above-described principle used by the depth sensor 20 to measure a distance is merely one example. In another example, the infrared camera 13 may capture an infrared pattern that has been projected, and the distance information may be acquired based on distortion of the infrared pattern.

The microphone 17 is a device for detecting ambient sound, and the CPU 11 compares the phases of sounds detected by a plurality of microphones 17 and estimates the direction of the sound source. The acceleration sensor 18 is a sensor for detecting an inclination of the motion detection device 10 with respect to the horizontal direction. The LED 19 displays a status of the motion detection device 10 by color or blinking, for example.

<Information Acquired by Motion Detection Device>

In the following, information acquired by the motion detection device 10 will be described. Information acquired by the motion detection device 10 can be used by the information processing apparatus 30. Note, however, that the information processing apparatus 30 does not necessarily have to use all the information described below. The information acquired by the motion detection device 10 as described below may be referred to as "sensor information".

1. Color Image

A color image corresponds to image data including RGB density information for each pixel. The infrared camera 13 of the motion detection device 10 captures a color image at a predetermined frame rate (e.g., 30 fps).

2. Distance Image

A distance image corresponds to image data including distance information obtained at a resolution of 512×424 as described above. The depth sensor 20 of the motion detection device 10 captures a distance image at a predetermined frame rate (e.g., 30 fps). In this way, the distance to an object including the user U may be obtained at a predetermined resolution.

3. Infrared Image

An infrared image is a grayscale image captured by the infrared camera 13. The infrared camera 13 can capture infrared light pulses projected by the infrared projector 14. Also, the infrared camera 13 can detect a person (user U) emitting infrared rays.

4. Shape Data of Person

The motion detection device 10 can extract shape data of a person by extracting only a region corresponding to a person from the distance image. For example, an imaging region of a person may be identified from an infrared image, or a region having a distance changing with each frame may be identified as an imaging region of a person. Such imaging region extracted from the distance image corresponds to shape data of the person. In this way, the information processing apparatus 30 may be able to determine a pixel region in which the user U is present. Also, when multiple users U are detected, the motion detection device 10 detects each user U in association with a corresponding pixel region. The information processing apparatus 30 can also cut out only a region corresponding to a person from the color image.

5. Skeleton Information

Figure 5:
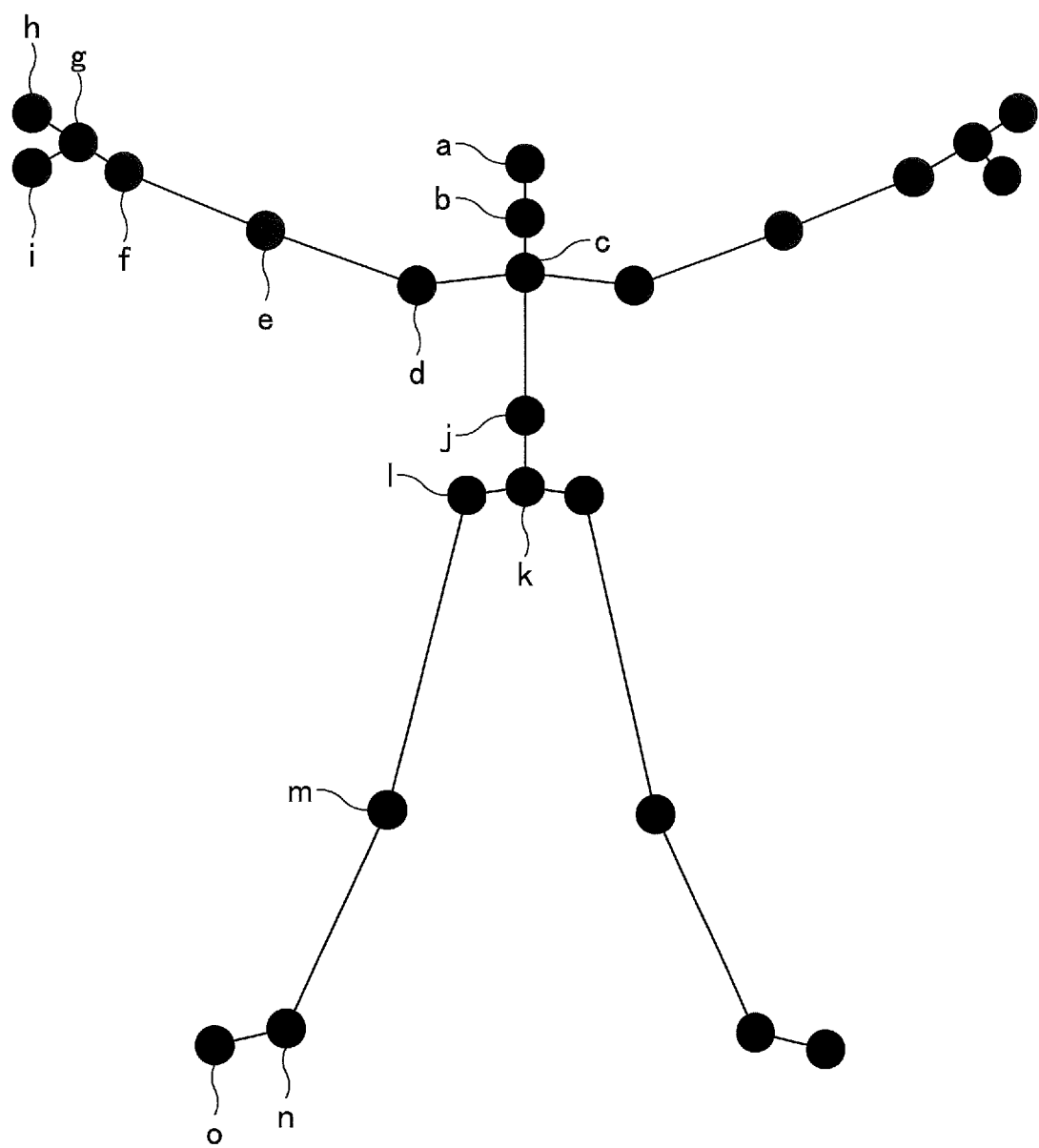
FIG. 5 is a diagram illustrating human joints for which three-dimensional coordinates are obtained.

Skeleton information corresponds to coordinate information of the joints. Skeleton information may is also referred to as bone information. FIG. 5 illustrates joints for which three-dimensional coordinates are obtained. Note that FIG. 5 is a front view of the joints of a user. The names of the joints that are given alphabetical references in FIG. 5 are listed below. Note that the joints illustrated on the left side of FIG. 5 correspond to those illustrated on the right side, and as such, alphabetical references for the joints on the left side are omitted.

a: head joint
    b: neck joint
    c: shoulder central joint
    d: right shoulder joint
    e: right elbow joint
    f: right wrist joint
    g: right hand joint
    h: right hand tip joint
    i: right hand thumb joint
    j: back joint
    k: waist middle joint
    l: right hip joint
    m: right knee joint
    n: right heel joint
    o: right foot joint The motion detection device 10 provides three-dimensional coordinates (X, Y, Z) of each joint within a space as well as coordinates (x, y) of each joint on the color image (on the display 310). That is, because the pixel region where the user U is located is apparent from the color image, the coordinates of each joint can be acquired therefrom. Also, because the three-dimensional coordinates of the right hand tip joint, the right hand thumb joint, the left hand tip joint, and the left hand thumb joint are acquired, the motion detection device 10 can determine whether the palm of the user U is open or closed.

6. Facial Expression

The motion detection device 10 also acquires a facial expression of the user U using face recognition. The motion detection device 10 may typically be able to recognize whether the user U is laughing, surprised, whether the left/right eyes are closed or open, whether the mouth is open or closed, whether the eyes are off the screen, whether the user U is wearing glasses, and the like.

7. Face Orientation

The motion detection device 10 also acquires a face orientation of a person. The motion detection device 10 can detect a yaw angle, a pitch angle, and a roll angle.

8. Heart Rate

The motion detection device 10 also acquires an estimated heart rate of the user U. The estimated heart rate of the user U may be acquired by estimating a skin portion from the color image and the infrared image and detecting delicate changes in the skin portion due to blood flow, for example.

<Functions of Information Processing Apparatus>

Figure 6:
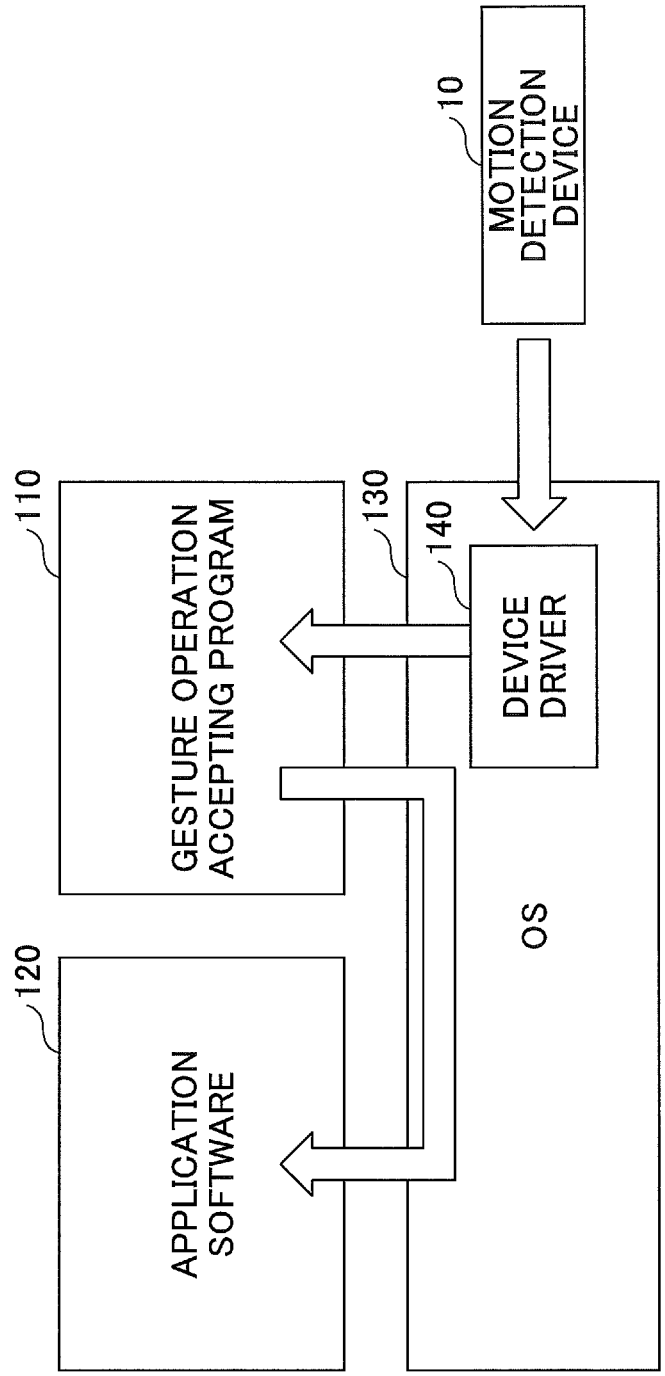
FIG. 6 is a diagram illustrating a relationship between application software and a gesture operation accepting program.

In the following, the relationship between the application software 120 and the gesture operation accepting program 110 will be described with reference to FIG. 6. Both the application software 120 and the gesture operation accepting program 110 are run on the OS 130. The application software 120 may be any application software operable based on position information or an event. For example, the application software 120 may include an application for displaying advertisements, or an application for presentations. However, the application software 120 is not limited to the above examples, and may include, a browser, a word processor, or a game, for example.

A device driver 140 of the motion detection device 10 is installed in the information processing apparatus 30. The device driver 140 is software for processing a signal detected by the motion detection device 10 into sensor information. The device driver 140 may also be referred to as SDK (Software Development Kit). The sensor information generated by the device driver 140 can be acquired by the application software 120 via an API (Application Interface) of the OS 130. In the present embodiment, the gesture operation accepting program 110 uses the API to acquire sensor information to be used for processing.

The gesture operation accepting program 110 acquires sensor information from the motion detection device 10, performs various processes to control the gesture operation accepting program 110, and also transmits information including a position of the cursor 3 and an event to control operations of the application software 120. The application software 120 has a function of detecting the position of the cursor 3 and an event based on an input of an operation of a pointing device, such as a mouse or a touch panel. In general, the OS 130 detects the position of the pointing device and an event and provides the detected position and event to the application software 120. In the present embodiment, a general-purpose pointing device is not used (not connected to the information processing apparatus 30), and instead, the gesture operation accepting program 110 provides the position of the cursor 3 and a detected event to the application software 120. The gesture operation accepting program 110 may provide the position of the cursor 3 and the event to a plurality of types of application software 120, for example.

The method of providing the position and event may depend on specifications of the OS 130 and the application software 120. For example, inter-process communication between the application software 120 and the gesture operation accepting program 110 provided by the OS 130 may be used, or the gesture operation accepting program 110 may notify the OS 130 of the position of the cursor 3 and the event and the application software 120 may acquire the information from the OS 130. With such an arrangement, changes may not have to be implemented in order to enable the application software 120 to acquire the position of the cursor 3 and the event from the gesture operation accepting program 110, and the gesture operation accepting program 110 may be used in conjunction with any general-purpose application software 120.

Note that although the gesture operation accepting program 110 is one type of the application software in the present embodiment, the gesture operation accepting program 110 may also be implemented as a device driver, for example.

<<Functions of Gesture Operation Accepting Program>>

Figure 7:
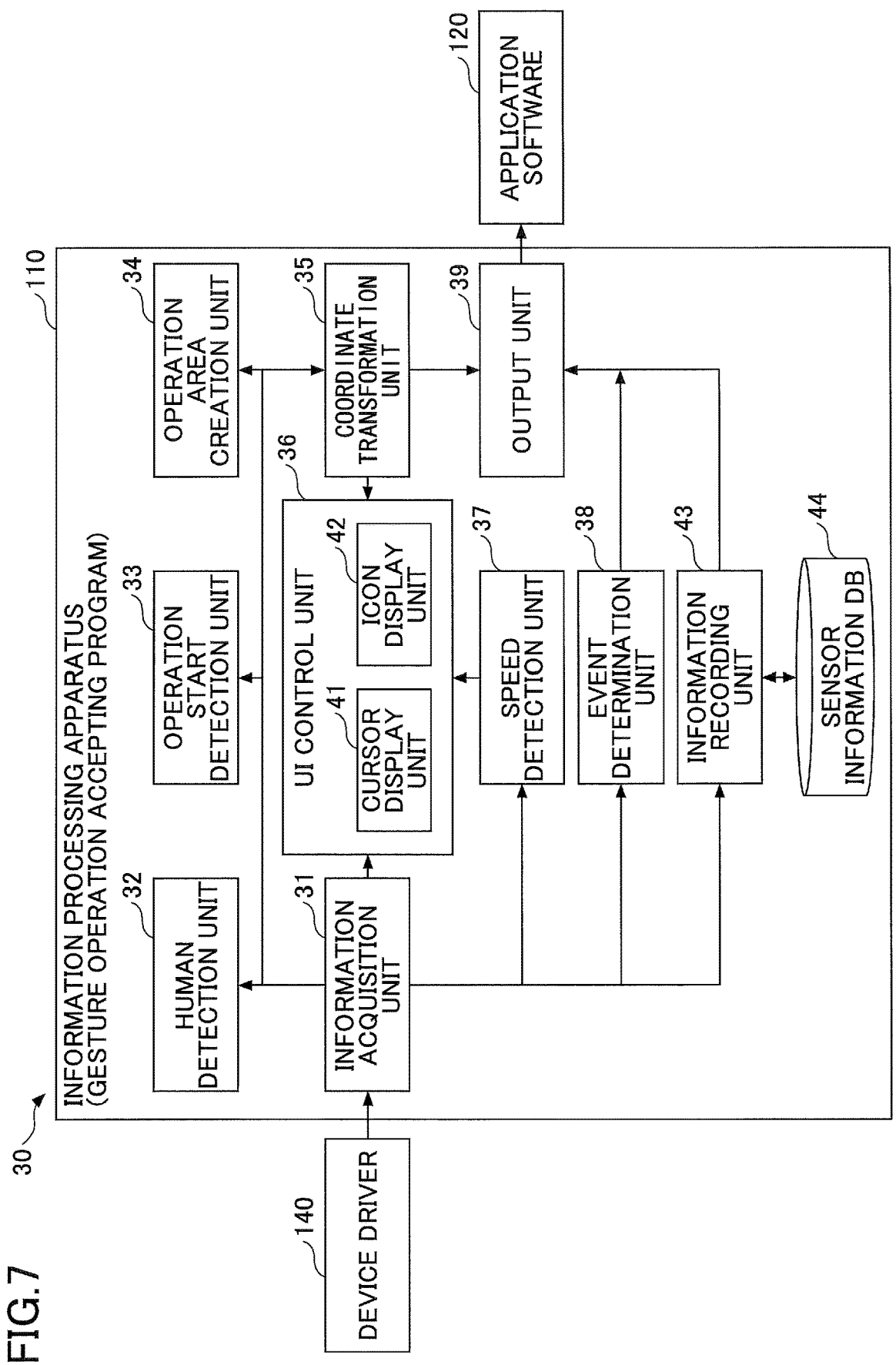
FIG. 7 is a block diagram illustrating functions of the gesture operation accepting program.

FIG. 7 is a block diagram illustrating functions of the gesture operation accepting program 110. The gesture operation accepting program 110 includes an information acquisition unit 31, a human detection unit 32, an operation start detection unit 33, an operation area creation unit 34, a coordinate transformation unit 35, a UI control unit 36, a speed detection unit 37, an event determination unit 38, an information recording unit 43, and an output unit 39. The above functional units may be implemented by one or more of the hardware elements of the information processing apparatus 30 illustrated in FIG. 3 operating in accordance with a command from the CPU 301 based on one or more of the programs 304p that are loaded into the RAM 303 from the secondary storage device 304. Note that the programs 304p include the OS 130, the device driver 140, the application software 120, and the gesture operation accepting program 110.

The information processing apparatus 30 also includes a sensor information DB (database) 44, and the information recording unit 43 records sensor information in the sensor information DB 44. The sensor information DB 44 may be implemented by the secondary storage device 304 and the RAM 303 of FIG. 3, for example.

The information acquisition unit 31 may be implemented by the CPU 301 of FIG. 3 executing the gesture operation accepting program 110, for example. The information acquisition unit 31 acquires sensor information from the device driver 140. In the present embodiment, the motion detection device 10 periodically detects motion, and as such, the information acquisition unit 31 periodically acquires sensor information from the device driver 140. Note, however, that the information acquisition unit 31 does not necessarily have to acquire all the sensor information and may only acquire sensor information to be used for processing, for example. In the present embodiment, the following items of sensor information are used.

- Three-dimensional coordinates of the right shoulder joint d, the right wrist joint f, the right hand joint g, the right hand tip joint h, and the right hand thumb joint i; and three-dimensional coordinates of the left shoulder joint, the left wrist joint, the left hand joint, the left hand tip joint, and the left hand thumb joint (because the user U may perform operations using either the right hand or the left hand)
- Three-dimensional coordinates of each user U (mainly used for displaying the person icon 82)
- Face orientation (used for displaying the eyes of the person icon 82)

The human detection unit 32 may be implemented by the CPU 301 of FIG. 3 executing the gesture operation accepting program 110, for example. The human detection unit 32 detects that the motion detection device 10 has detected a person based on the sensor information acquired by the information acquisition unit 31. The human detection unit 32 may detect a person based on information that the motion detection device 10 has detected the person and/or the number of persons, for example. Also, because the motion detection device 10 acquires shape data and skeleton information upon detecting a person, the human detection unit 32 may use such information to detect the presence of a person, for example. Note that a human detection range 51 for detecting a person is determined by the specification of the motion detection device 10. For example, the angle in the horizontal direction may be 70 degrees, and the distance may be from 0.5 to 4.5 m. Also, the human detection range 51 may be arranged to be narrower than the specification of the motion detection device 10, or the human detection range 51 for detecting a person may be changed in accordance with a change in the specification of the motion detection device 10, for example. Also the number of persons that can be simultaneously detected is six in the present embodiment, but this can also be changed in accordance with a change in the specification of the motion detection device 10, for example.

The operation start detection unit 33 may be implemented by the CPU 301 of FIG. 3 executing the gesture operation accepting program 110, for example. The operation start detection unit 33 detects that the user U has indicated an intention to operate the application software 120 based on the sensor information acquired by the information acquisition unit 31. In the present embodiment, the operation start detection unit 33 detects that the user U has indicated an intention to operate the application software 120 when the user U is positioned at the operation position 52 and raises his/her hand as described in detail below. Also, the operation start detection unit 33 detects that the user U has indicated an intention to end operation of the application software 120 based on the sensor information acquired by the information acquisition unit 31. In the present embodiment, the operation start detection unit 33 detects that the user U has indicated an intention to end operation of the application software 120 when the user U moves away from the operation position 52 or lowers his/her hand.

The operation area creation unit 34 may be implemented by the CPU 301 of FIG. 3 executing the gesture operation accepting program 110, for example. When the operation start detection unit 33 detects the intention of the user U to operate the application software 120, the operation area creation unit 34 creates an operation area 54 for enabling the user to perform operations. The operation area 54 is a range (area) within a three-dimensional space in which the user U can operate the information processing apparatus 30. For example, when the right hand joint g and the right wrist joint f of the user U are in the operation area 54, the three dimensional coordinates of the right hand joint g and the right wrist joint f may be reflected in the position of the cursor 3 and/or a gesture may be detected.

The coordinate transformation unit 35 may be implemented by the CPU 301 of FIG. 3 executing the gesture operation accepting program 110, for example. The coordinate transformation unit 35 transforms the three-dimensional coordinates of the right hand joint g and the right wrist joint f of the user U positioned within the operation area 54 into a position of the cursor 3 based on the sensor information acquired by the information acquisition unit 31.

The speed detection unit 37 may be implemented by the CPU 301 of FIG. 3 executing the gesture operation accepting program 110, for example. The speed detection unit 37 detects the speed of the right hand joint g or the right wrist joint f of the user U within the operation area 54 based on the sensor information acquired by the information acquisition unit 31. Note that the speed detection unit 37 may detect the speed of either the right hand joint g or the right wrist joint f. However, because the user U moves the hand around the elbow, the joint closer to the tip of the hand may be able to move the cursor 3 faster. On the other hand, the amount of movement may be more finely controlled by the joint closer to the elbow.

The event determination unit 38 may be implemented by the CPU 301 of FIG. 3 executing the gesture operation accepting program 110, for example. The event determination unit 38 determines whether the user U has generated an event based on the sensor information acquired by the information acquisition unit 31. Examples of events that may be detected include left-click, right-click, double-click, mouse-over, mouse-down, and mouse-up as described above. However, general gestures corresponding to these events are not defined. Thus, the event determination unit 38 associates a predetermined motion of the user U with a corresponding event in advance as a gesture, and when the user U performs a predetermined gesture, the event determination unit 38 determines that the associated event has occurred. For example, when the user U performs a gesture of clasping the hand within the operation area 54, the event determination unit 38 may determine that the user U has generated a left-click event.

The information recording unit 43 may be implemented by the CPU 301 of FIG. 3 executing the gesture operation accepting program 110, for example. The information recording unit 43 stores the sensor information for each user U in the sensor information DB 44 in chronological order. As described above, because the motion detection device 10 detects the position of the user U, the facial expression of the user U, and the face orientation of the user U, the information recording unit 43 can estimate which part of the display 310 the user U is viewing and record information on whether the user U is viewing the display 310. Also, the information recording unit 43 acquires a screen shot of the content displayed on the display 310 from the application software 120. By arranging the timing of recording the sensor information to be substantially the same as the timing of acquiring the screen shot, a content provider may be able to easily identify content that piqued the interest of the user U, for example.

The output unit 39 may be implemented by the CPU 301 of FIG. 3 executing the gesture operation accepting program 110, for example. The output unit 39 acquires the position of the cursor 3 obtained by the coordinate transformation unit 35 and the event determined by the event determination unit 38 and outputs the acquired position and event to the application software 120. The output unit 39 also has a function of acquiring the status of the application software 120. For example, when the application software 120 displays a moving image on the entire screen, the user U does not have to operate the application software 120, and as such, the information acquisition unit 31 does not acquire the sensor information. Also, when the user U is currently operating the application software 120, the output unit 39 notifies the application software 120 of this fact. In this way, the application software 120 may refrain from transitioning to displaying a full-screen moving image while the user U is performing operations and thereby prevent situations where user operations are abruptly disabled, for example.

The UI control unit 36 may be implemented by the CPU 301 of FIG. 3 executing the gesture operation accepting program 110, for example. The UI control unit 36 includes a cursor display unit 41 and an icon display unit 42. The cursor display unit 41 uses functions of the OS 130 to display the cursor 3 or to display the guide mesh 4 instead of the normal cursor 3, for example. The icon display unit 42 displays the operation accepting support icon 81 on the display 310. The icon display unit 42 changes the display mode of the operation accepting support icon 81 according to the state of the user U. The operation accepting support icon 81 functions as a user interface for assisting the user U in operating the application software 120 through gesture. For example, the operation accepting support icon 81 may guide the user U to the operation position 52 so that the motion detection device 10 can acquire all the skeleton information of the user UI. Also, the operation accepting support icon 81 may clearly identify the user U that is given an operation right (even if multiple person icons 82 are displayed, the person icon 82 having the hand raised has the operation right). The operation right is the right to operate the application software 120, and only one person has the operation right at any given point in time.

<Human Detection Range and Operation Position>

Figure 8:
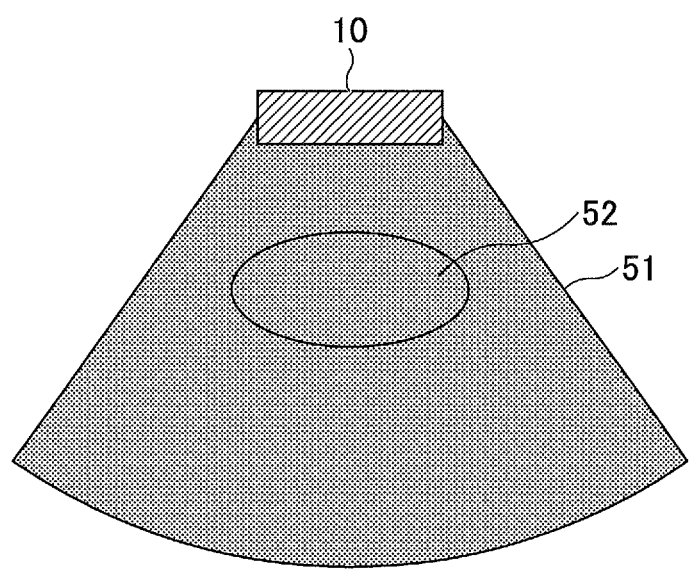
FIG. 8 is a diagram illustrating a detection range and an operation position of a person with respect to the motion detection device.

In the following, the human detection range 51 and the operation position 52 of a person will be described with reference to FIG. 8. FIG. 8 is a diagram illustrating the human detection range 51 and the operation position 52 with respect to the motion detection apparatus 10. As described above, the motion detection device 10 detects a person within a predetermined distance (e.g., 0.5 to 4.5 m) at a predetermined horizontal angle range (e.g., 70 degrees). Note that the operation position 52 is within the human detection range 51.

The operation position 52 may be near the center of the human detection range 51, for example, but may be anywhere as long as it is within the human detection range 51. The operation position 52 is determined in order to make it impossible for an arbitrary user U passing through the human detection range 51 to start operation of the application software 120 by raising his/her hand, for example. Note that when the operation position 52 is too large, the number of users U that can acquire an operation right may increase thereby making it difficult for a given user U to determine whether he/she can operate the application software 120. Also by determining the operation position 52, the user U may understand that he/she can operate the application software 120 by moving to the operation position 52. Note that in preferred embodiments, the actual operation position 52 may be clearly indicated in a color different from the rest of the areas, or text such as "Please operate here" may be displayed, for example.

The user U moves such that the person icon 82 corresponding to the user U enters the operation position indication display 83 within the operation accepting support icon 81 as described in detail below. When the person icon 82 enters the operation position indication display 83, this means that the user U is positioned at the operation position 52. That is, the user is guided to the operation position 52 by the person icon 82, the operation accepting support icon 81, and the operation position indication display 83.

However, the user U may possibly move away from the operation position 52 during operation. For example, the user U may move closer to the display 310 in order to have a closer look at the display 310.

Figure 9A:
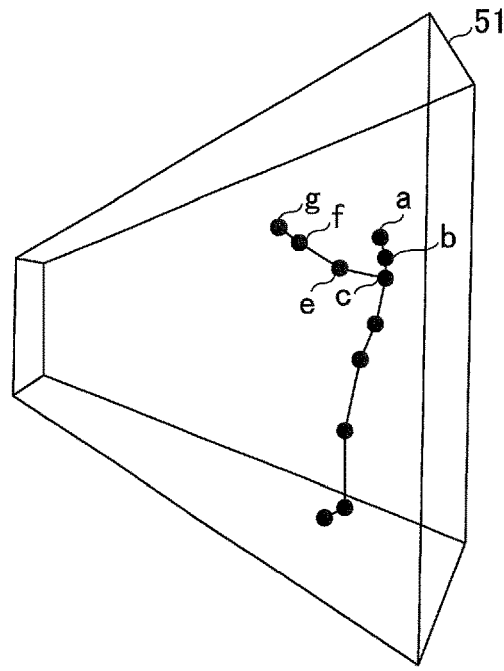
FIGS. 9A-9C are diagrams stereoscopically illustrating the detection range.
Figure 9B:
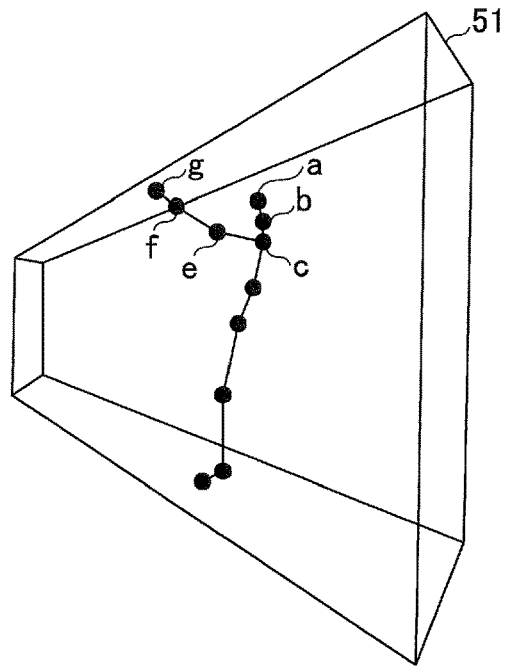

FIGS. 9A and 9B are diagrams stereoscopically illustrating the human detection range 51. In FIG. 9A, all of the skeleton information of the user is included in the detection range 51. Thus, the motion detection device 10 can acquire all of the skeleton information of the user U and send the acquired skeleton information to the gesture operation accepting program 110. In other words, the user can operate the digital signage through motion.

On the other hand, in FIG. 9B, a part of the user's body is outside the human detection range 51. As such, the motion detection device 10 sends only the skeleton information of the user that could be acquired to the gesture operation accepting program 110. For example, the gesture operation accepting program 110 (the operation start detection unit 33, the operation area creation unit 34, the coordinate transformation unit 35, the UI control unit 36, the speed detection unit 37, and the event determination unit 38) use skeleton information of the hand to accept operations from the user. However, if the skeleton information of the hand of the user is not included in the sensor information, skeleton information cannot be acquired. Thus, the gesture operation accepting program 110 may detect that desired skeleton information has not been acquired.

Figure 9C:
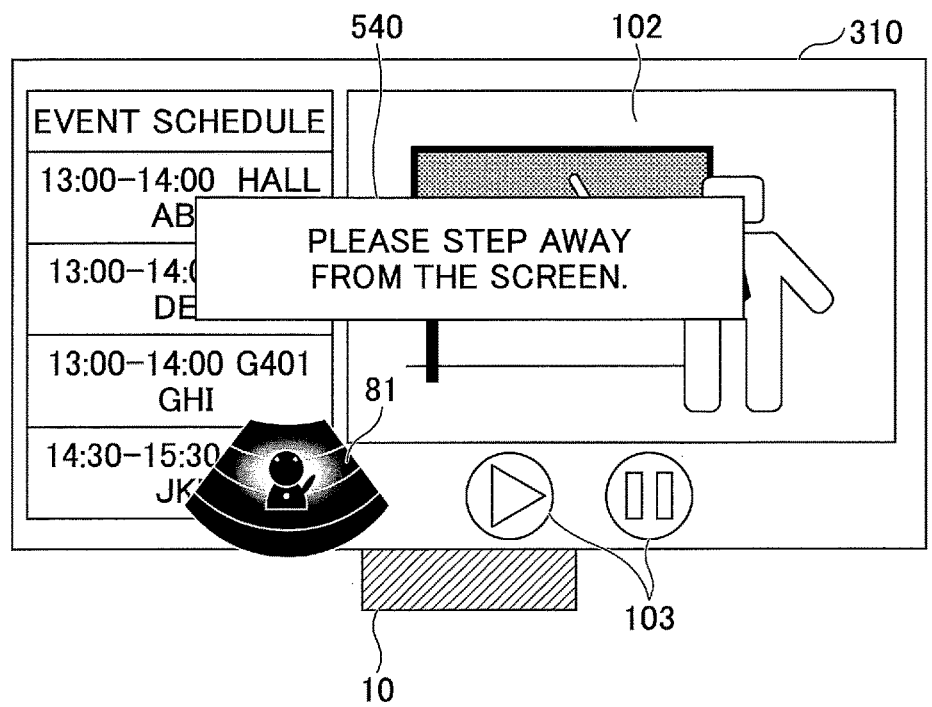

In such a case, the UI control unit 36 can guide the user to the operation position 52 by displaying a message 540 on the display 310 as illustrated in FIG. 9C, for example. In FIG. 9C, the message 540 "Please step away from the screen" is displayed. In this way, when the position of the user changes to the extent that relevant skeleton information (necessary for control) cannot be acquired, the UI control unit 36 can display guidance information to guide the user to the detection range 51.

Note that FIGS. 9B and 9C illustrate an example case where the user moves too close to the display 310. However, the gesture operation accepting program 110 may be configured to guide the user to the detection range 51 when at least a part of the body of the user including the joint is outside the detection range 51.

<Detecting Intention of Operation>

In the following detecting the intention of operation and the operation area 54 will be described with reference to FIG. 10. FIG. 10 is a diagram illustrating an example case of detecting the intention of the user to operate the application software 120 and creating the operation area 54. At the left side of FIG. 10, an initial operation performed by the user U at the operation position 52 is illustrated. Upon reaching the operation position 52, the user U first raises his/her hand. Note that the user U is instructed or otherwise knows beforehand that such operation has to be performed to operate the application software 120. The intention to start operation is detected in order to avoid sending an operation that is not intended by the user U to the application software 120. That is, if any arbitrary movement of the hand made by the user U within the human detection range 51 is accepted as an operation of the application software 120, operations that are not intended may be sent to the application software 120.

The operation start detection unit 33 detects the intention to start operation when the right hand joint g of the user U becomes higher than the head joint a. Note that the hand of the user U may be the right hand or the left hand. In some embodiments, the operation start detection unit 33 may prioritize detection of the right hand and ignore the left hand if the left hand is raised after the right hand, and even if the right hand is raised after the left hand, for example.

The operation start detection unit 33 detects the intention to start operation when the right hand joint g becomes higher than the head joint a in view of the fact that the user U is not very likely to his/her hand higher than the head under normal circumstances. For example, even when talking on a cell phone or touching eyeglasses, the hands normally remain lower than the head. In this way, erroneous detection of the intention to start operation based on movement of a person that is has no intention to operate the application software 12 can be avoided.

<Operation Area>

The operation area creation unit 34 creates the operation area 54 using the distance between the right shoulder joint d and the head joint a (hereinafter referred to as "A"). As illustrated in the middle of FIG. 10, a circle 53 having a center at a point above the right shoulder and a diameter equal to the distance A is created. Then, as illustrated at the right side of FIG. 10, a circumscribed rectangle of the circle 53 is created. This circumscribed rectangle is the operation area 54. Note that the distance A may be approximately 30 cm, for example. However, the size of the operation area 54 is not particularly limited and may be any suitable size within which the user U can move the hand to perform operations.

By creating the operation area 54 based on the circle 53 having the center above the shoulder in the above-described manner, the motion detection device 10 may be able to easily capture an image of the hand of the user U. Note that depending on the height at which the motion detection device 10 is installed, the motion detection device 10 may not be able to accurately capture a desired image. For example, in a case where the motion detection device 10 is installed at a height around the waist of the user U, the motion detection device 10 may not be able to capture the shoulder when the hand is about the same height as the shoulder of the user U. As a result, a substantial detection error may occur in the distance between the right shoulder joint d and the head joint a (the distance A may decrease or increase), and the shape of the operation area 54 may become unstable.

Figure 11:
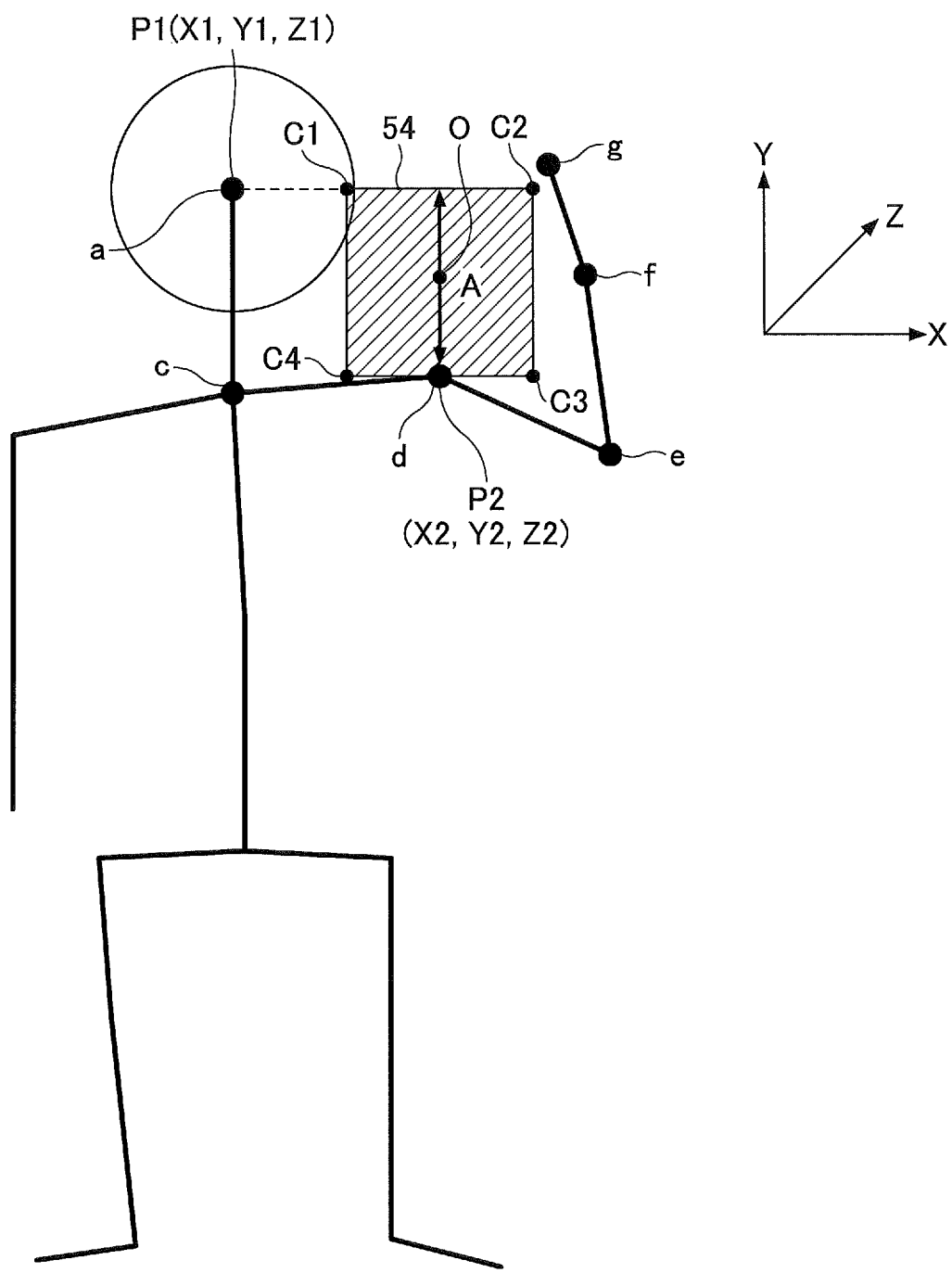
FIG. 11 is a diagram illustrating the operation area in detail.

FIG. 11 is a diagram illustrating the operation area 54 in further detail. Note that in FIG. 11, 21 (X1, Y1, Z1) represents the three-dimensional coordinates of the head joint a, and P2 (X2, Y2, Z2) represents the three dimensional coordinates of the right shoulder joint d. Also, the X-axis represents the horizontal direction, the Y-axis represents the height direction, and the Z-axis represents the vertical direction. The distance A is calculated as follows.

$$A = Y1 - Y2$$

Also, the coordinates of the center O of the circle 53 is (X2, Y2+A/2). Therefore, the operation area creation unit 34 may draw a circle 53 with a radius of A/2 around the center O. Also, the operation area creation unit 34 may obtain the coordinates of the four vertexes C1 to C4 of the operation area 54 without obtaining the circle 53 in the following manner. Note that although the Z coordinates are not included in the coordinates indicated below, Z1, Z2, or the average of Z1 and Z2 may be used as the Z coordinates, for example.

$$C1 = (X2-A/2, Y2+A)$$

$$C2 = (X2+A/2, Y2+A)$$

$$C3 = (X2+A/2, Y2)$$

$$C4 = (X2-A/2, Y2)$$

By creating the operation area 54 in the-above-described manner, the user U can easily control the position of the cursor 3. Note that because the hand of the user U has to remain raised (the user U loses the operation right by lowering the hand), the user U performs operations by moving the hand around the elbow. Because the position of the shoulder is substantially fixed, the user U can perform operations by moving the hand within the operation area 54 created above the shoulder. Thus, the user U can operate the cursor 3 by moving the right wrist joint f and the right hand joint g around the elbow without searching for the location of the operation area 54, for example.

<Non-Operation Movement that Does Not Give Operation Right>

It is not uncommon for a user to raise the hand above the head to talk on a cell phone or to touch his/her eyeglasses, for example. Thus, in a preferred embodiment, the operation start detection unit 33 detects a motion of a user corresponding to a non-operation movement in the following manner.

Figure 12C:
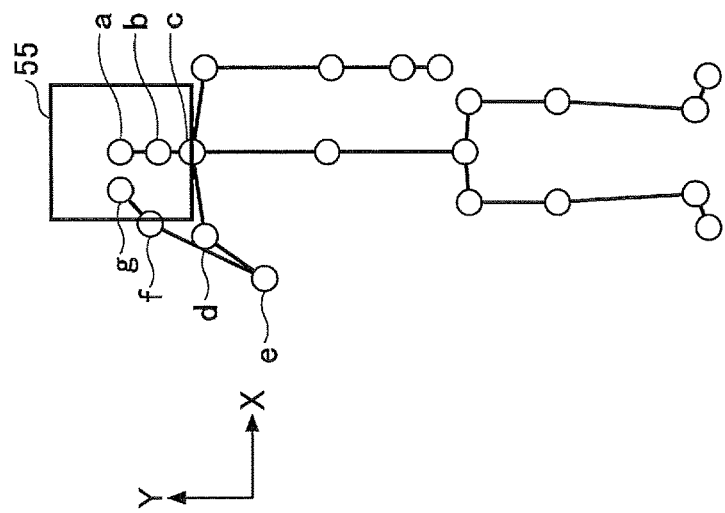
FIGS. 12A-12C are diagrams illustrating example movements of a user corresponding to non-operation movements.
Figure 12B:
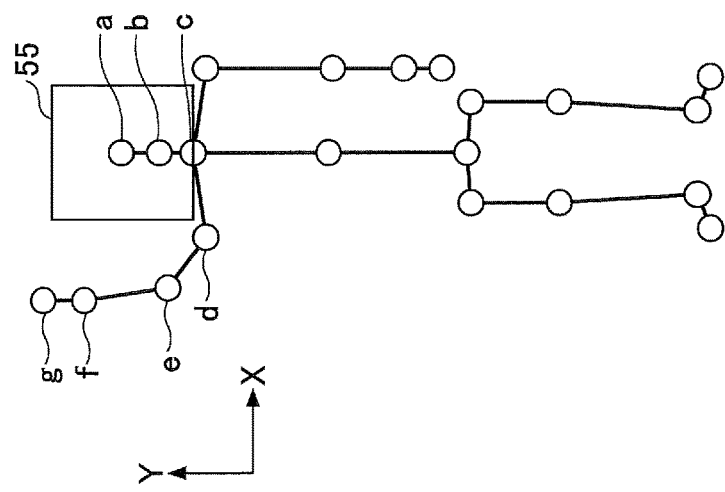
Figure 12A:
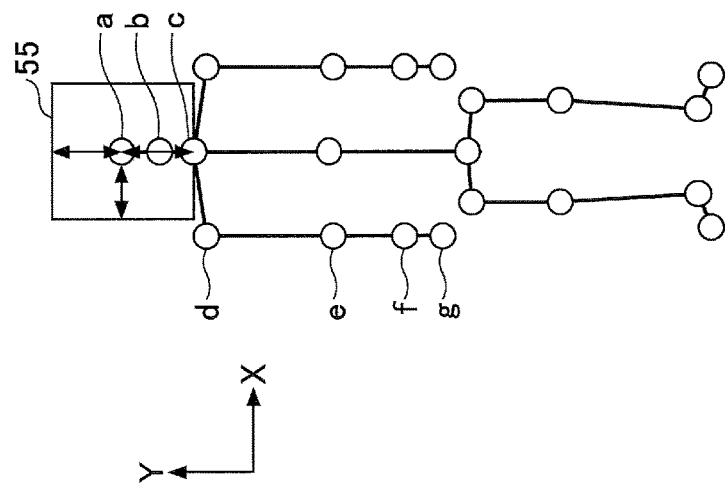

FIGS. 12A-12C are diagrams illustrating detection of a non-operation movement of the user. Non-operation movements are similar to the motion of the user for indicating the intention to operate the digital signage (i.e., raising the hand above the head). For example, the movement of the user talking on the cell phone, the movement of the user touching his/her eyeglasses, the movement of the user touching the forehead, and the movement of the user scratching the head may be non-operation movements similar to the motion of the user for operating the digital signage.

As illustrated in FIG. 12A, the operation start detection unit 33 defines a cube 55 with a center around the head joint a. The definition of the cube 55 may be referred to as setting the cube 55 and involves specifying the coordinates of the cube 55. The cube 55 is arranged to have a size somewhat larger than the size of the head and face of the user such that the user's hand can be captured in the cube 55 when the user's hand touches the face. Note that the size of the cube 55 may be arranged to vary with respect to each user, or the size of the cube 55 may be fixed. Also, the cube 55 is not limited to a cuboid shape, but may alternatively be a rectangular parallelepiped, a sphere, or an ellipsoid, for example.

When the user performs a non-operation movement, the user's hand often enters this cube 55. Thus, the operation start detection unit 33 can determine whether the motion of the user corresponds to a non-operation movement based on whether the user's hand enters the cube 55.

As illustrated in FIG. 12B, when the right-hand joint g does not enter the cube 55, the operation start detection unit 33 determines that the motion of the user is not a non-operation movement. In this case, because the hand of the user U is raised, the operation start detection unit 33 gives an operation right to the user U.

As illustrated in FIG. 12C, when the right-hand joint g enters the cube 55, the operation start detection unit 33 determines that the motion of the user is a non-operation movement. In this case, even if the hand is raised, the operation start detection unit 33 does not give an operation right to the user U because the hand is within the cube 55.

In this way, erroneous detection of the intention to operate the digital signage based on a movement of the user U that does not wish to operate the digital signage may be prevented.

FIG. 13 is an example side view of the cube 55 of FIGS. 12A-12C. The cube 55 is three-dimensional, having a depth in the distance direction (Z direction) with respect to the motion detection device 10. In FIG. 13, the hand of a user U1 is not inside the cube 55, and as such, it is determined that the motion of the user U1 is not a non-operation movement. On the other hand, the hand of a user U2 is inside the cube 55, and as such, the motion of the user U2 is determined to be a non-operation movement.

Because the non-operation movement of a user is determined based on whether the hand is inside/outside the cube 55 as described above, if the hand of the user does not enter the depth range of the cube 55 when the user raises his/her hand, the operation start detection unit 33 gives an operation right to the user, and the coordinate transformation unit 35 detects the coordinates of the right hand joint g, for example.

On the other hand, if the hand of the user enters the depth range of the cube 55 when the user raises his/her hand, the operation start detection unit 33 does not give an operation right to the user even though the user has raised his/her hand. By distinguishing a non-operation movement from a movement for indicating the intention to operate the digital signage based on the cube 55 having a depth as described above, the determination can be facilitated as compared to a case of simply determining whether the hand of the user is near the face within the XY plane, for example.

<Coordinate Transformation>

Figure 14:
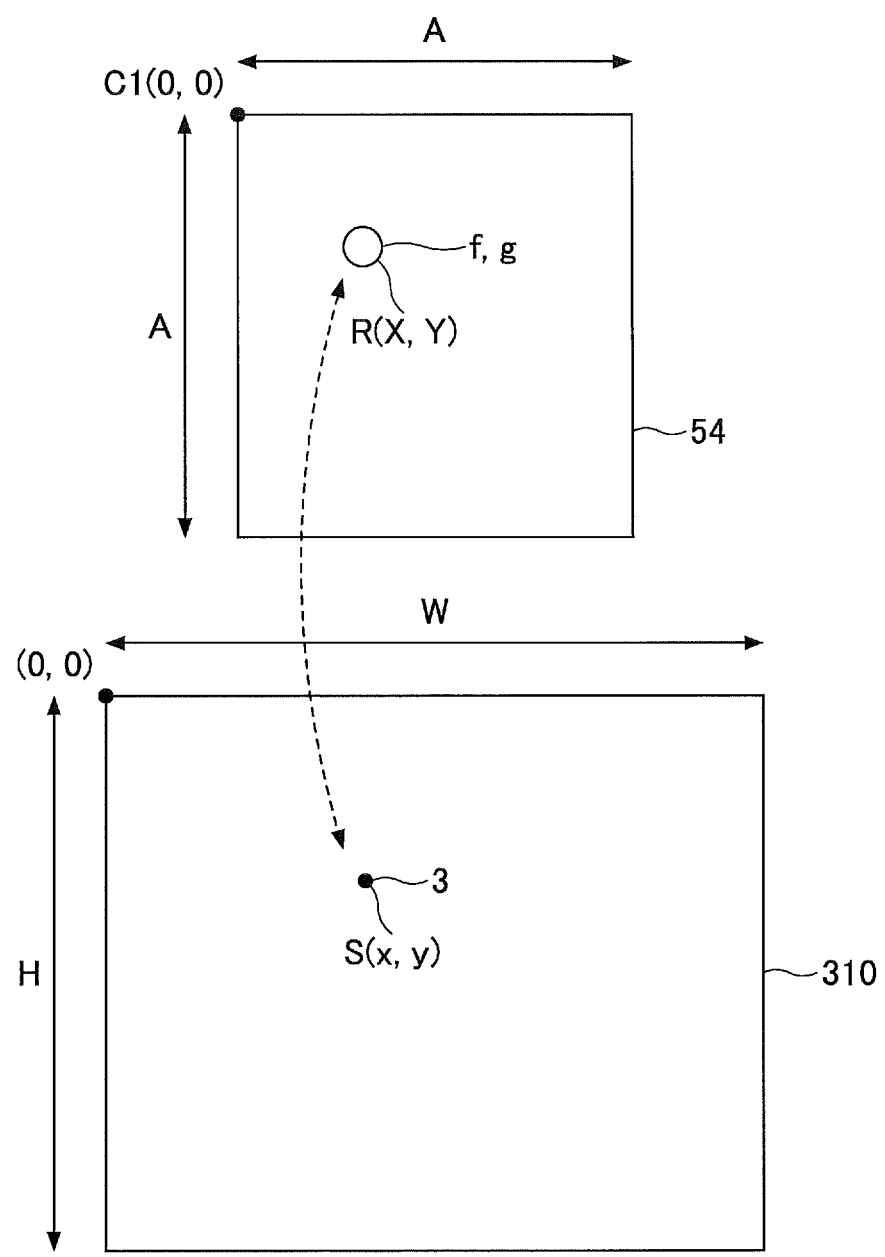
FIG. 14 is a diagram illustrating coordinates of a wrist joint or a hand joint and a cursor position in the operation area.

In the following, coordinate transformation of the wrist joint or hand joint within the operation area 54 into a position of the cursor 3 will be described with reference to FIG. 14. FIG. 14 illustrates example coordinates of the wrist joint or hand joint within the operation area 54 and a corresponding position of the cursor 3. FIG. 14 describes a method of determining the position of the cursor 3 when the speed of motion of the hand is greater than or equal to the threshold value.

The coordinate transformation unit 35 associates the three-dimensional coordinates of the wrist joint or hand joint within the operation area 54 with a corresponding position of the cursor 3 on the display 310. First, the coordinate transformation unit 35 determines the vertex C1 of the upper left corner of the operation area 54 as the origin (0, 0). Then, the three-dimensional coordinates of the wrist joint or hand joint within the operation area 54 are transformed into three-dimensional coordinates within a coordinate system with C1 as the origin (0, 0). Because the operation area 54 is a two-dimensional plane in the XY plane, the Z coordinate of the wrist joint or hand joint is not used. As such, the Z coordinate may be regarded as constant and may be omitted from the calculation of the corresponding position of the cursor 3. In FIG. 14, R (X, Y) represents the three-dimensional coordinates of the wrist joint or hand joint with C1 as the origin.

Further, H represents the resolution of the display 310 in the longitudinal direction and W represents the resolution of the display 310 in the lateral direction. Also, the side lengths of the operation area 54 in the longitudinal and lateral directions are equal to the distance A. Accordingly, a position S (x, y) of the cursor 3 on the display 310 corresponding to the coordinates R (X, Y) of the wrist joint or hand joint can be calculated by a simple proportional calculation as follows.

$$X = W \times A/X$$

$$Y = H \times A/Y$$

Note that although the wrist joint or hand joint of the user U can move outside the operation area 54, the coordinate transformation unit 35 ignores the position of the wrist joint or hand joint that is outside the operation area 54.

The coordinate transformation unit 35 performs coordinate transformation each time the information acquisition unit 31 acquires sensor information. On the other hand, the operation area creation unit 34 updates the operation area 54 for each frame of image data. Thus, even when the user turns to the front or turns the shoulder to the motion detection device 10, the operation area 54 can still be created.

Note that the operation area 54 is deleted when the operation start detection unit 33 detects the intention of the user to end the operation (i.e., when the user U lowers the hand).

FIG. 15 is a side view of the three-dimensional coordinates of the wrist joint or hand joint of the user U1 and U2. Note that the Z-axis extends laterally from left to right in FIG. 15. In FIG. 15, the user U1 is moving the arm near his/her body, and the user U2 has his/her arm extended forward in front of the body and is moving the arm at such position. In other words, the Z coordinates of the wrist joints or hand joints of the users U1 and U2 are different. However, the Y coordinates of the wrist joints or hand joints of the users U1 and U2 are substantially the same (although not apparent from FIG. 15, the X coordinates of the wrist joints or hand joints of the users U1 and U2 are also substantially the same).

Even if the Z coordinates are different as described above, the coordinate transformation unit 35 does not use the Z coordinate when transforming the coordinates of the wrist joint or hand joint into a corresponding position of the cursor 3. As such, the position (trajectory) of the cursor 3 operated by the users U1 and U2 will be the same.

<<Modified Example of Operation Area>>

Generally, the aspect ratio of the display 310 is not 1:1 but is longer in the lateral direction. On the other hand, both the longitudinal and lateral side lengths of the operation area 54 are equal to the distance A. Thus, the cursor 3 moves a greater distance in the lateral direction when the user U moves the hand in the lateral direction as compared to the case where the user moves the hand in the longitudinal direction. As such, the user U may not be able easily control the position of the cursor 3 in the lateral direction. In this respect, in a modified example, the longitudinal and lateral side lengths of the operation area 54 may be adjusted according to the aspect ratio of the display 310. Note that the aspect ratio of the display 310 is input to the information processing apparatus 30.

Figure 16A:
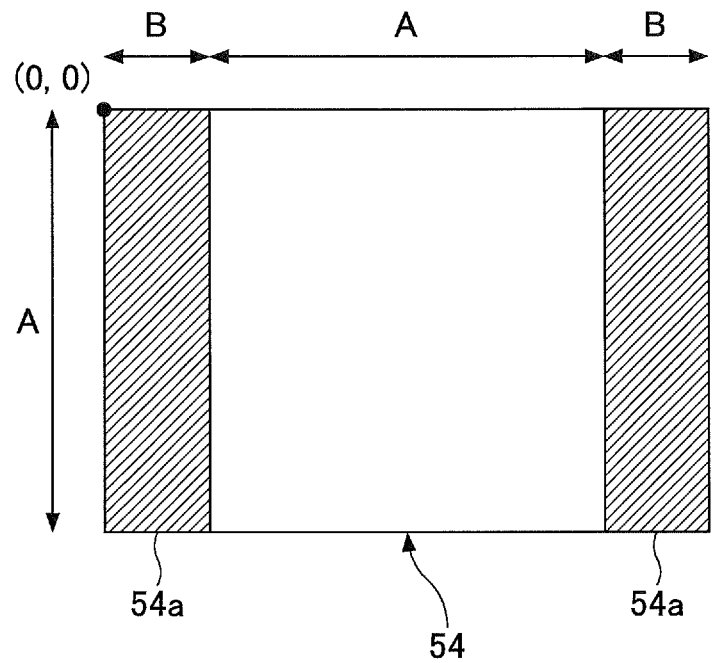
FIGS. 16A and 16B are diagrams illustrating modified examples of the operation area.
Figure 16B:
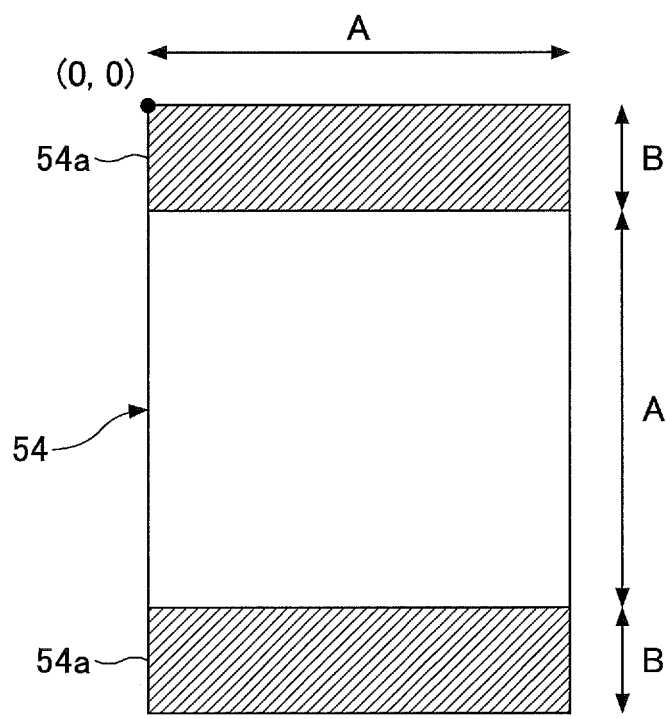

FIGS. 16A and 16B are diagrams illustrating modified examples of the operation area 54. FIG. 16A illustrates an example of the operation area 54 when the aspect ratio of the display 310 is longer in the lateral direction. The operation area creation unit 34 creates the operation area 54 by adding extension areas 54*a* to the left and right of the above-described operation area 54 that is a square. Each of the extension areas 54*a* may extend a distance B equal to 10 cm, for example. That is, because the distance A is 30 cm, the hand of the user U may move within a range of about 50 cm in total. Note that 10 cm is merely one example, and the distance B can be arranged to any suitable distance for defining a range within which the user U can move the hand to perform operations, taking into account the distance A. For example, the distance B may be arranged to be variable according to the height of the user U.

FIG. 16B illustrates an example of the operation area 54 when the aspect ratio of the display 310 is longer in the longitudinal direction. Note that the distance B of the extension areas 54*a* to be added to the operation area 54 may be the same as that of FIG. 16A. However, in FIG. 16B, the extension areas 54*a* are added to the upper and lower sides of the operation area 54. By adjusting the longitudinal and lateral side lengths of the operation area 54 according to the aspect ratio of the display 310 in the above-described manner, user operability may be further improved.

<Speed Detection>

Figure 17:
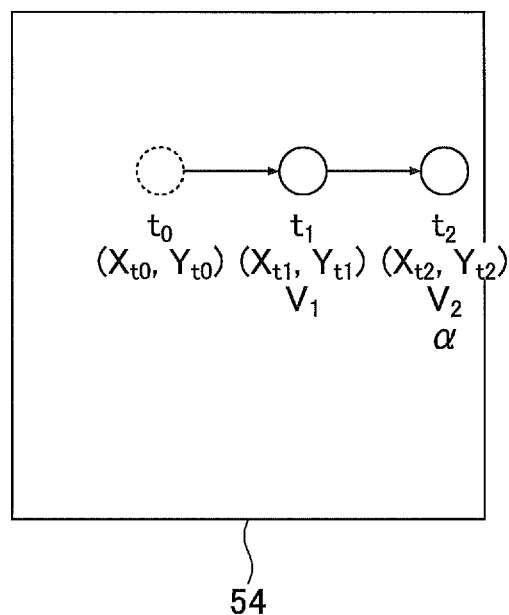
FIG. 17 is a diagram illustrating a method of detecting the speed of a wrist joint or a hand joint.

In the following, speed detection of the wrist joint or hand joint will be described with reference to FIG. 17. FIG. 17 is a diagram illustrating an example method of detecting the speed of the wrist joint or hand joint. The speed detection unit 37 calculates the acceleration using the three-dimensional coordinates of the wrist joint or hand joint acquired for the past few periodic intervals. For example, a velocity $V_1$ of the wrist joint or hand joint at time $t_1$ can be obtained based on the three-dimensional coordinates of the wrist joint or hand joint at times $t_0$ and $t_1$. Note that the periodic interval at which the sensor information is acquired is $\Delta t$. As described above the velocity $V_1$ (speed) at time $t_1$ is calculated using only the X and Y components.

$$V_x = (X_{t1} - X_{t0})/\Delta t$$

$$V_y = (Y_{t1} - Y_{t0})/\Delta t$$

$$V_1 = \sqrt{(V_x^2 + V_y^2)}$$

Similarly, a velocity $V_2$ of the wrist joint or hand joint at time $t_2$ can be obtained from the three-dimensional coordinates of the wrist joint or hand joint at times $t_1$ and $t_2$. The acceleration a at time $t_2$ can be obtained by dividing the difference between the velocities $V_1$ and $V_2$ by the interval $\Delta t$ as follows.

$$\alpha = (V_2 - V_1)/\Delta t$$

Accordingly, if the three-dimensional coordinates of the past three periodic intervals are available, the speed detection unit 37 can calculate the acceleration of the wrist joint or hand joint for each periodic interval.

In the present embodiment, the velocity and acceleration are used as indicators of the speed of the hand. The speed of the hand is compared with a threshold value that is empirically determined. For example, a speed slightly faster than a stopping speed (e.g., 1 to 10 cm/sec) may be set as the threshold value. The threshold value is preferably set to a relatively low speed because the speed of the wrist joint or hand joint can slow down substantially when the user U attempts to click the operation button 103, for example.

When the velocity is used as an indicator of the speed of the wrist joint or hand joint, the speed detection unit 37 can calculate the velocity based on the three-dimensional coordinates of the wrist joint or hand joint for the past two periodic intervals. Further, the acceleration of acceleration may be calculated and used as an indicator of speed. In this case, the speed detection unit 37 can calculate the acceleration of acceleration using three-dimensional coordinates of the wrist joint or hand joint for the past four periodic intervals.

<Event Detection>

Figure 18:
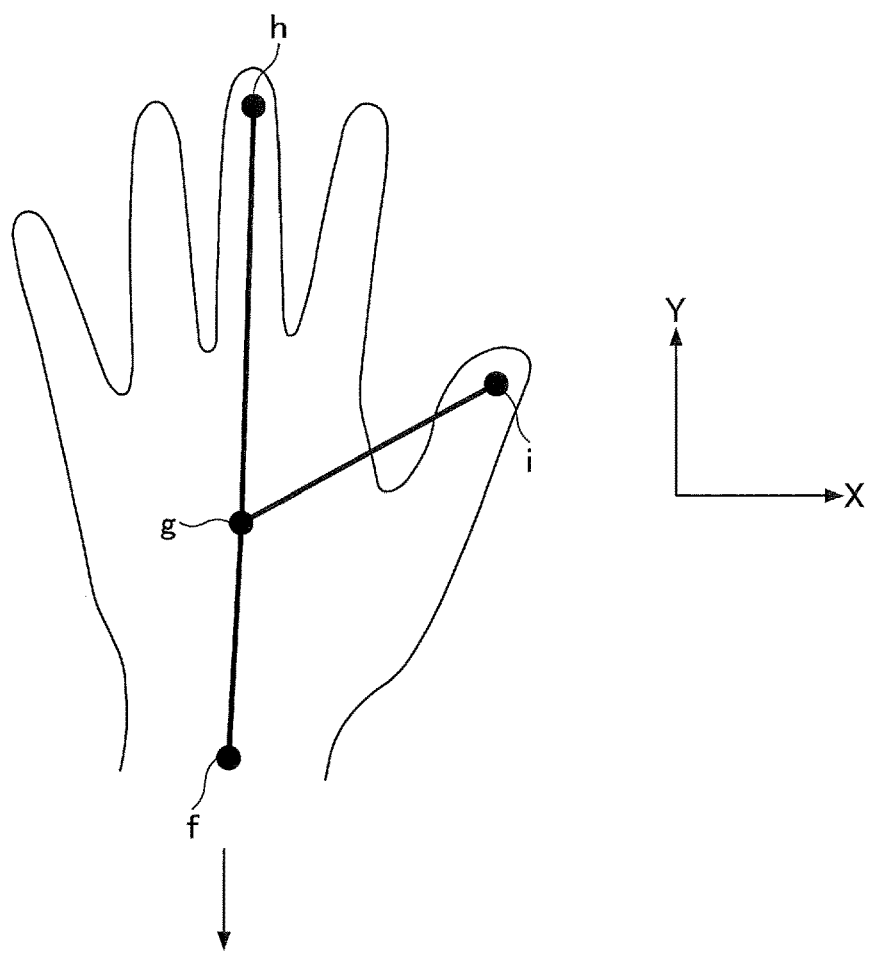
FIG. 18 is a diagram illustrating a method of detecting an event.

In the following, a method of detecting an event is described with reference to FIG. 18. The upper portion of FIG. 18 illustrates the shape of a hand and joints included in the hand. FIG. 18B illustrates the shape of the hand and joints when the user U is clasping the hand. For example, the event determination unit 38 may detects a gesture of the user U clasping the hand and quickly opening the hand thereafter as a click event. For example, clasping of the hand (forming a closed first) may signify a left button-down event of the left mouse button, and opening the hand (forming a flat hand) may signify a left button-up of the left mouse button. By making such a gesture, the user can perform the operation of clicking as well as dragging by moving the hand while keeping the hand clasped, for example. Also, when the hand is clasped for a long period of time, the event determination unit 38 may detect a right button-down event of the right mouse button, for example.

As described above, the motion detection device 10 detects the three-dimensional coordinates of the right hand joint g, the right wrist joint f, the right hand tip joint h, and the right hand thumb joint i (as well as the left hand joint, the left wrist joint, the left hand tip joint, and the left hand thumb joint). As can be appreciated from FIG. 18, when the user U clasps the right hand, the three-dimensional coordinates of the right hand tip joint h and the right hand thumb joint i move a substantial distance in a specific direction. Specifically, with respect to the X and Y coordinates, the Y coordinate of the right hand tip joint h becomes substantially smaller, and the X coordinate of the right hand thumb joint i becomes substantially smaller.

When the Y coordinate of the right hand tip joint h becomes smaller and the X coordinate of the right hand thumb joint i also becomes smaller, the event determination unit 38 determines that a left button-down event of the left mouse button has occurred. When the Y coordinate of the right hand tip joint h becomes larger and the X coordinate of the right hand thumb joint i also becomes larger, i the event determination unit 38 determines that a left button-up event of the left mouse button has occurred. Note that in some examples, the event determination unit 38 may determine that a left button-down event has occurred when the Y coordinate of the right hand tip joint h becomes smaller, or the X coordinate of the right hand thumb joint i becomes smaller.

Note that the motion detection device 10 may detect gestures of the hand game referred to as "rock-paper-scissors". That is, the gestures of the hand game may be used to detect the gesture of clasping the hand. For example, when the hand gesture corresponding to "rock" (closed fist), or "scissors" (first with the index and middle fingers together forming a V sign) is detected, the event determination unit 38 may determine that a left button-down event has occurred.

Also, in some examples, the event determination unit 38 may using the Z coordinates rather than using only two-dimensional coordinates of the three-dimensional coordinates as described above. When the user U clicks the application software 120, for example, the user U may move the hand forward (or backward). In such case, the event determination unit 38 may detects a change in the three-dimensional coordinates of right hand joint g in the Z axis direction at a speed higher than a predetermined speed, for example, and determine that a click event has occurred.

However, when the user U tries to move the hand in the Z direction, the X and Y coordinates are also likely to move, as such, the position of the cursor 3 can potentially move away from the position to be clicked. In this respect, a gesture that can minimize or reduce changes in the X and Y coordinates, such as clasping the hand as in the present embodiment, is preferably used as a gestures to be detected as an event. Accordingly, gestures other than clasping and opening the hand, such as moving a finger, may be associated with a click event, for example.

<Coordinate Transformation when Speed is Less Than Threshold Value>

Figure 19A:
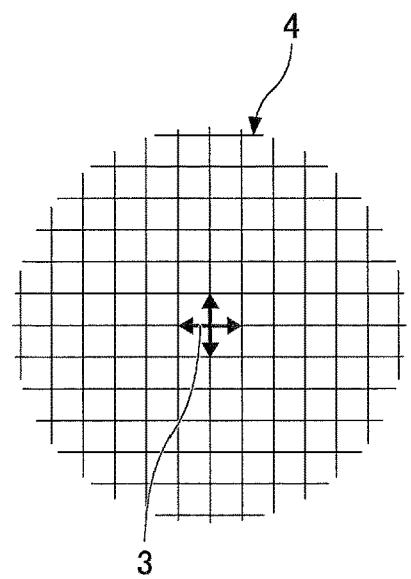
FIGS. 19A-19C are diagrams illustrating an example coordinate transformation that is implemented when the speed is less than a threshold value.
Figure 19B:
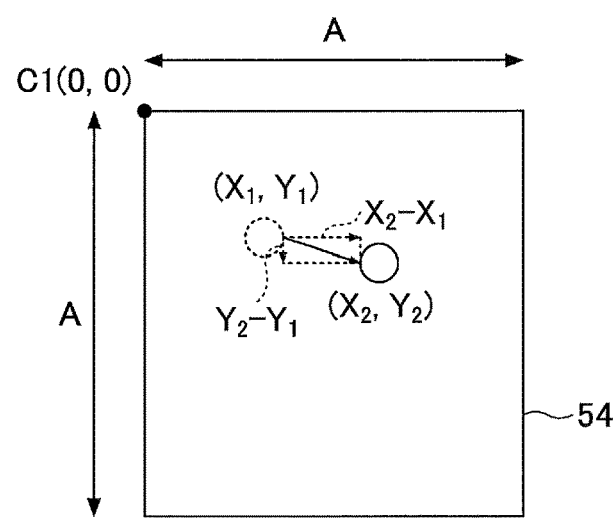
Figure 19C:
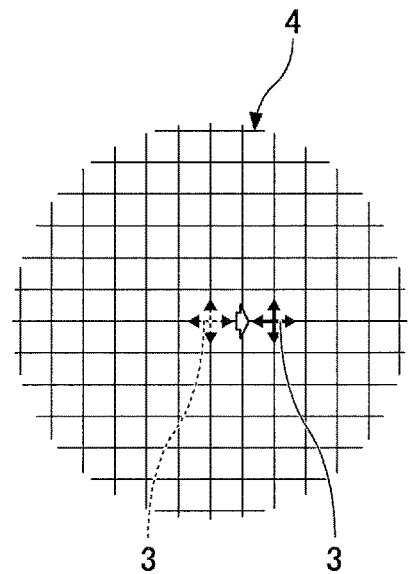

In the following, coordinate transformation when the speed of the hand is less than the threshold value is described with reference to FIGS. 19A-19C. FIGS. 19A-19C are diagrams illustrating an example coordinate transformation that is implemented when the speed of the hand is less than the threshold value. When the speed detection unit 37 determines that the speed of the wrist joint or hand joint is less than the threshold value, the coordinate transformation unit 35 and the UI control unit 36 may perform the following process operations.

(i) The cursor display unit 41 of the UI control unit 36 displays the guide mesh 4 at the position of the cursor 3.

(ii) The coordinate transformation unit 35 determines whether the three-dimensional coordinates of the wrist joint or hand joint has changed by an amount greater than or equal to a predetermined amount (whether the wrist joint or hand joint has moved by an amount greater than or equal to a predetermined amount).

(iii) If the change in the three-dimensional coordinates is greater than or equal to the predetermined amount, the coordinate transformation unit 35 determines which component among the components in the X direction and the Y direction has the larger amount of change.

(iv) The coordinate transformation unit 35 moves the position of the cursor 3 along the grid of the guide mesh 4 in either the X direction or Y direction that has the larger amount of change.

In the following, the above process (i) will be described. Upon acquiring information indicating that the speed detection unit 37 has determined the speed of the hand to be less than the threshold value, the cursor display unit 41 starts displaying the guide mesh 4. As illustrated in FIG. 19A, the cursor display unit 41 associates the position of the cursor 3 obtained from the coordinate transformation unit 35 with a predetermined intersection point in the guide mesh 4, arranges the cursor 3 on the intersection point, and displays the guide mesh 4. The predetermined intersection point is a point approximately at the center of the guide mesh 4 that is determined in advance. Thus, the cursor 3 is displayed substantially at the center of the guide mesh 4. The cursor 3 that is displayed together with the guide mesh 4 has a shape different from that of the normal cursor 3 that is displayed when the speed of the hand is greater than or equal to the threshold value. In FIG. 19A, the cursor 3 is represented by longitudinal and lateral arrows that intersect.

The cursor 3 moves to and from the intersection points in the guide mesh 4. The guide mesh 4 is deleted when the speed of the hand reaches or exceeds the threshold value. While the speed is less than the threshold value, the display of the guide mesh 4 may move within the screen or may be fixed.

Note that the shape of the guide mesh 4 may be a square, for example. However, in some embodiments, the longitudinal and lateral side lengths of the guide mesh 4 may be adjusted according to the aspect ratio of the display 310, for example.

In the following, the above determination process (ii) is performed so that the position of the cursor 3 does not change due to a slight movement of the hand unintended by the user U. Further, when the user U performs a gesture of clasping the hand to click the cursor 3 while the cursor 3 is positioned on the operation button 103 of the application software 120, for example, depending on the gesture, the hand may make a movement other than the gesture for the desired operation. For example, the cursor 3 may have moved away from the operation button 103 when the gesture is made, and the user U may not be able to click the operation button 103. Thus, by performing the above determination process (ii), the position of the cursor 3 may be prevented from being changed due to a slight hand movement unintended by the user U.

In FIG. 19B, it is assumed that the three-dimensional coordinates have changed by at least the predetermined amount. That is, it is assumed that the coordinates of the wrist joint or hand joint have moved from the coordinates (X1, Y1) to (X2, Y2). The cursor display unit 41 calculates the movement amounts ΔX and ΔY respectively in the X direction and the Y direction as follows.

$$\Delta X = X2 - X1$$

$$\Delta Y = Y2 - Y1$$

The cursor display unit 41 determines whether at least one of ΔX and ΔY is greater than or equal to the predetermined amount. The predetermined amount is determined in advance in consideration of the typical amount of movement of a wrist joint or hand joint that would occur even when the user U is attempting to keep the hand still and the detection error of the motion detection device 10. The predetermined amount may be set to several centimeters, for example, but administrators and other persons in charge may determine a suitable amount through experimentation, for example.

In the following, the above process (iii) will be described. When at least one of the movement amounts ΔX and ΔY is greater than or equal to the predetermined amount, the cursor display unit 41 determines which of ΔX and ΔY is greater. In FIG. 19B, ΔX is greater than ΔY (ΔX>ΔY).

In the following, the above process (iv) will be described. The cursor display unit 41 determines the position of the cursor 3 only for X2 out of the coordinates (X2, Y2) of the wrist joint or hand joint. As for the position of the cursor 3 in the Y direction on the guide mesh 4, the same position as that of the previous position of the cursor 3 is used. Because the X coordinate of the position of the cursor 3 obtained by the coordinate transformation unit 35 does not always coincide with an intersection point in the guide mesh 4, the cursor display unit 41 corrects the X coordinate to coincide with an intersection point in the mesh guide 4. For example, the cursor display unit 41 may correct the X coordinate as follows.

Correct the X coordinate of the position of the cursor 3 to coincide with the nearest intersection point in the guide mesh 4;

Correct the X coordinate of the position of the cursor 3 to coincide with the next intersection point in the guide mesh 4 in the moving direction; or Correct the X coordinate of the position of the cursor 3 to coincide with the preceding intersection point in the guide mesh 4 immediately preceding the position of the cursor 3 with respect to the moving direction.

By correcting the X coordinate of the position of the cursor 3 in the above-described manner, the cursor display unit 41 can display the cursor 3 displayed together with the mesh guide 4 on an intersection point in the guide mesh 4. In FIG. 19C, the cursor 3 is moved and displayed at an intersection point two places to the right from the immediately preceding position of cursor 3.

<Switching between Wrist Joint and Hand Joint>

There may be cases where the user U wishes to make a relatively large movement of the cursor 3 and there may also be cases where the user U wishes to move the cursor 3 slightly, such as near the operation button 103. Because the user U moves the hand around the elbow, the joints farther away from the elbow moves faster the joints near the elbow. As such, the coordinate transformation unit 35 may switch the joint (the body part of the user) that is used in the coordinate transformation for obtaining the position of the cursor 3 depending on whether the speed detection unit 37 has detected the speed of the hand to be less than the threshold value. For example, the coordinate transformation unit 35 may switch between coordinate transformation of the wrist joint and the hand joint as follows.

A. When the speed is greater than or equal to the threshold value, the coordinate transformation unit 35 transforms the three-dimensional coordinates of the right hand joint g into a position of the cursor 3.

B. When the speed is less than the threshold value, the coordinate transformation unit 35 transforms the three-dimensional coordinates of the right wrist joint f into a position of the cursor 3.

In this way, when the user U wishes to move the cursor 3 by a large amount, the user U can move the cursor 3 swiftly using the hand, and when the user U wants to make slight a slight movement of the cursor 3, such as near the operation button 103, the user U can more accurately move the cursor 3 to the intended position by using the wrist. In the case of A described above, the three-dimensional coordinates of the right hand tip joint h and the right hand thumb joint i may be used. Since these joints are further away from the elbow as compared to the right wrist joint f, the user can operate the cursor 3 more swiftly.

<Operation Accepting Support Icon>

Figure 20:
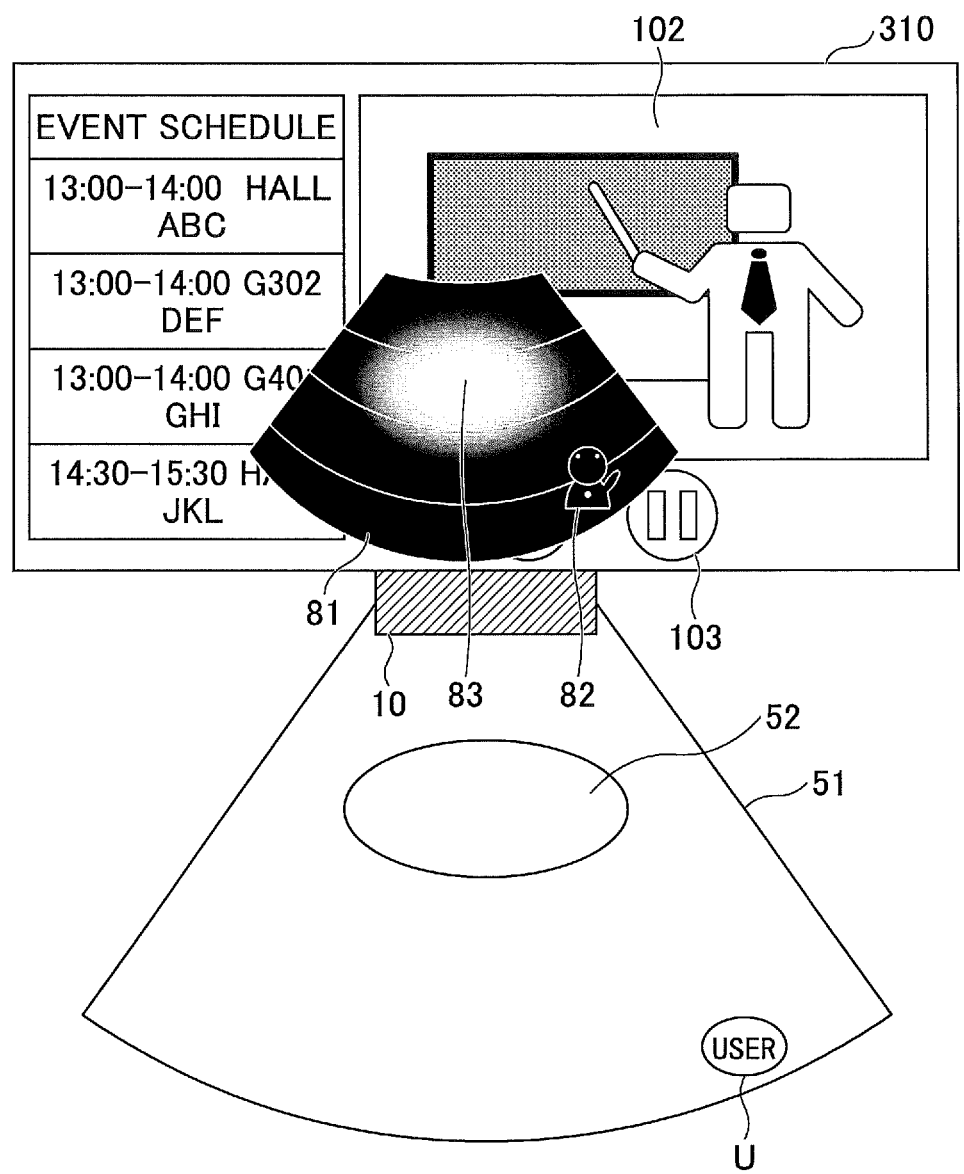
FIG. 20 is a diagram illustrating an example display of an operation accepting support icon when a user is detected by the motion detection device.

In the following, the operation accepting support icon 81 displayed by the icon display unit 42 will be described with reference to FIGS. 20, 21A, 21B, 22, 23A, and 23B. FIG. 20 is a diagram illustrating the operation accepting support icon 81 when the user U is detected by the motion detection device 10. The icon display unit 42 first controls the display 310 to display the operation accepting support icon 81 in a large size. The operation accepting support icon 81 has a shape substantially similar to the detection range 51 of the motion detection device 10.

The operation accepting support icon 81 may always be displayed or may be displayed only when a person is detected. The operation accepting support icon 81 is largely displayed when detected a person is detected. In this way, the user U can recognize that he/she has been detected by the motion detection device 10. The operation accepting support icon 81 can also direct the eyes of the user to the display 310. Also, in addition to largely displaying the operation accepting support icon 81, the icon display unit 42 may display the operation accepting support icon 81 in flickering mode or change its color, for example. Other modes of displaying the operation accepting support icon 81 may include having a device other than the display 310, such as the projector 5, display the operation accepting support icon 81 through hologram projection (stereoscopic display), for example.

In FIG. 20, the user U enters the human detection range 51 from the rear right side of the detection range 51 of the motion detection device 10. When the user U enters the human detection range 51, the information acquisition unit 31 acquires the three-dimensional coordinates of the user U, and in turn, the information acquisition unit 31 displays the person icon 82 on the operation accepting support icon 81 at a position corresponding to the position of the user U (referred to as position on icon). By displaying the person icon 82 at the position on the icon, the user U may be able to determine the position of the user U within the human detection range 51. Also, because the information acquisition unit 31 acquires the face orientation of the user U, the icon display unit 42 can display the position of the eyes estimated based on the face orientation of the person icon 82.

In the operation accepting support icon 81, a location corresponding to the operation position 52 (operation position indication display 83) is emphatically displayed, and the user U is prompted to move so that that the person icon 82 enters the operation position indication display 83.

Figure 21A:
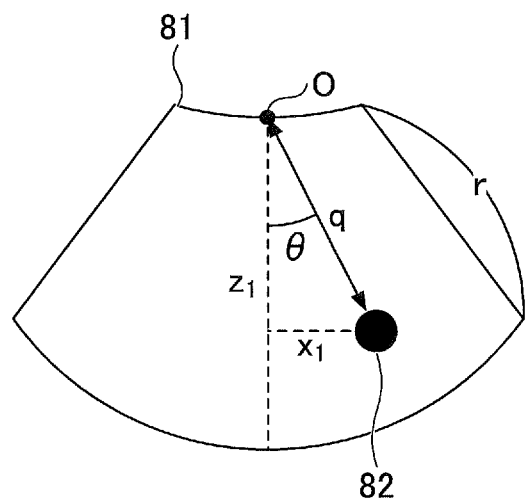
FIGS. 21A and 21B are diagrams illustrating a method of calculating the position of a person icon within the operation accepting support icon.
Figure 21B:
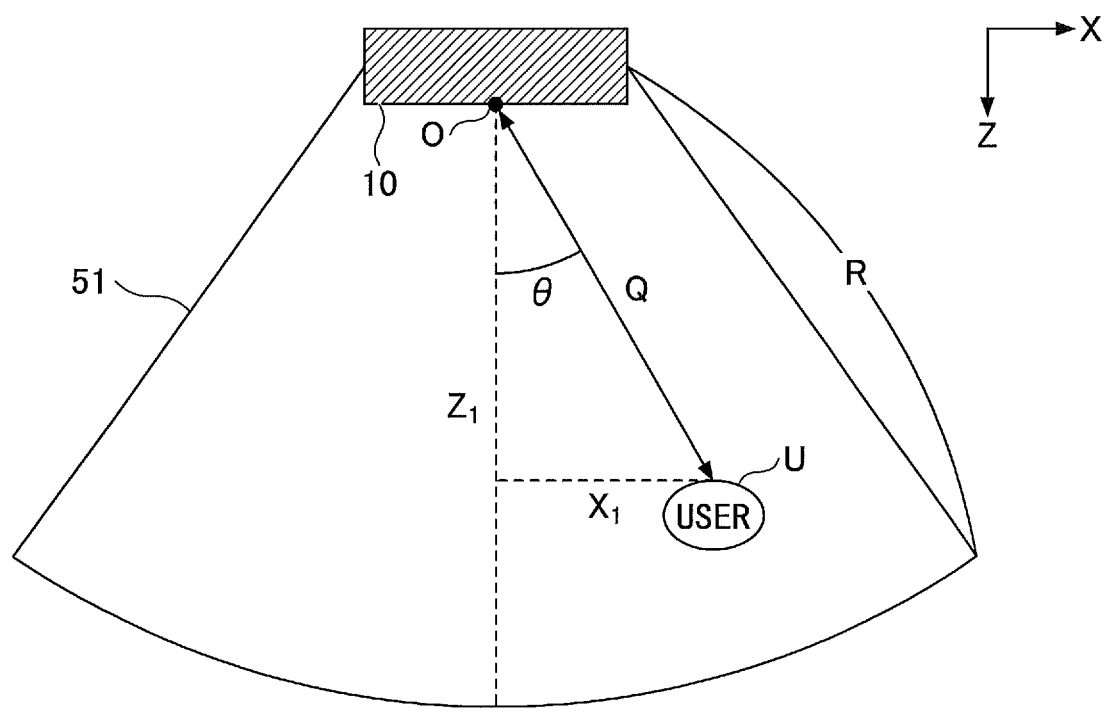

FIGS. 21A and 21B are diagrams illustrating a method of calculating the position of the person icon 82 within the operation accepting support icon 81. FIG. 21A illustrates the operation accepting support icon 81, and FIG. 21B illustrates a top view of the human detection range 51. The motion detection device 10 detects the coordinates of each joint of the user U. For example, the motion detection device 10 can determine coordinates ($X_1$, $Z_1$) of the user U with respect the center of the motion detection device 10 that is set as the origin O. That is, a relative position (first relative position) of the user U with respect to the motion detection device 10 is determined. Note that a distance Q from the origin O and a direction A with respect to a forward direction of the motion detection device 10 are also known.

The operation accepting support icon 81 has a shape similar to that of the human detection range 51. In the operation accepting support icon 81, a position corresponding to the installation position of the motion detection device 10 is set as the origin O (upper side center in FIG. 21A). The icon display unit 42 converts the first relative position of the user U into a relative position (second relative position) of the person icon 82 with respect to the origin O of the operation accepting support icon 81 and displays the person icon 82 at the second relative position.

Assuming R [m] represents the distance of the human detection range 51 within which a user can be detected, a corresponding side length r (pixels) of the operation accepting support icon 81 corresponding to the distance R may be known. As such, coordinates ($x_1$, $z_1$) of the person icon 82 within the operation accepting support icon 81 corresponding to the coordinates ($X_1$, $Z_1$) of the user U can be calculated using the ratio r/R as follows.

$$x_1 = X_1 \times r/R$$

$$z_1 = Z_1 \times r/R$$

The icon display unit 42 updates the position of the person icon 82 each time the information acquisition unit 31 periodically acquires the sensor information.

Figure 22:
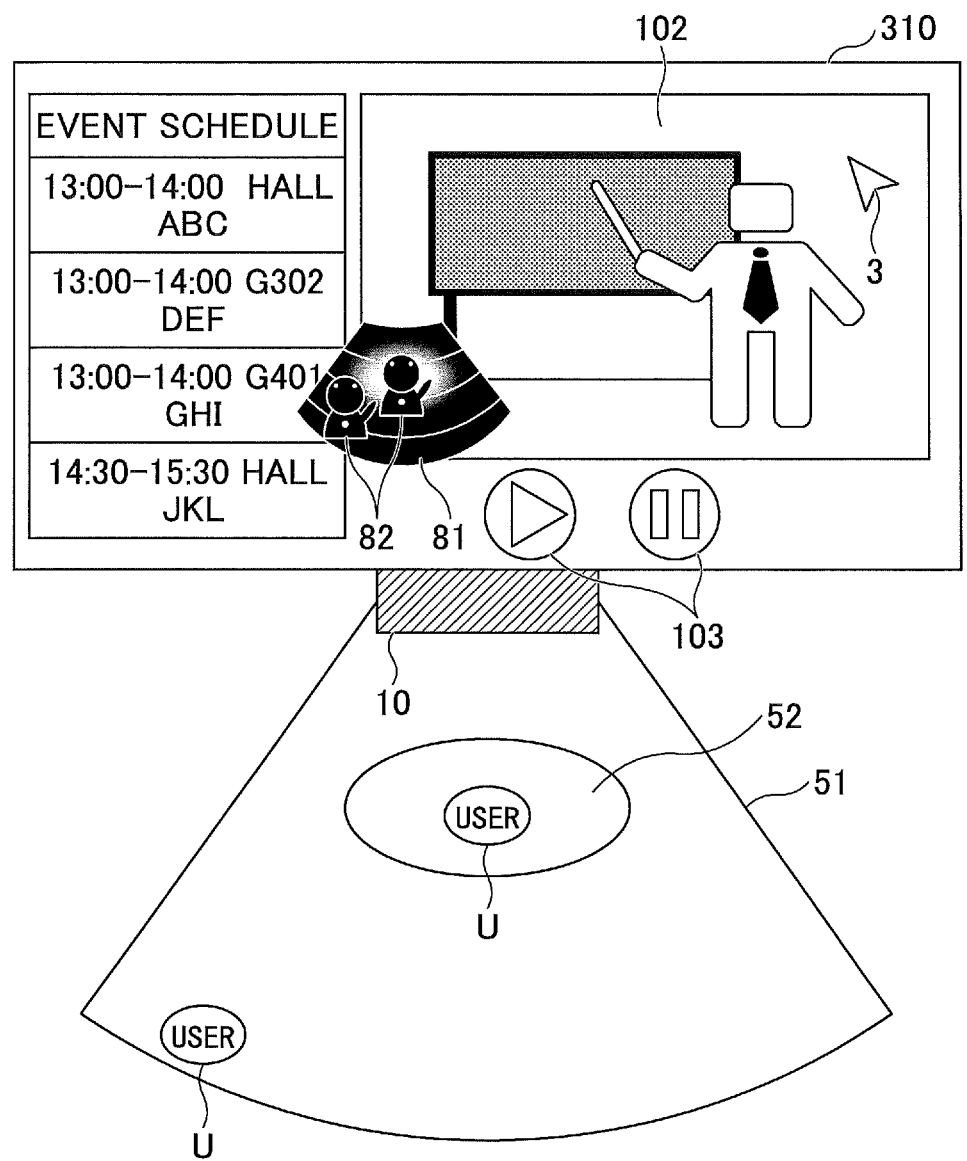
FIG. 22 is a diagram illustrating an example display of the operation accepting support icon when the user raises a hand at the operation position.

FIG. 22 is a diagram illustrating the operation accepting support icon 81 when the user U raises his/her hand at the operation position 52. FIG. 22 shows an example screen displayed when the speed of the wrist joint or hand joint is greater than or equal to the threshold value. When a predetermined time has elapsed since the user U entered the operation position 52 or when a predetermined time has elapsed since the user U raised his/her hand at the operation position 52, the icon display unit 42 displays the operation accepting support icon 81 in a smaller size. This makes it easier for the user U to view the screen of the application software 120 displayed on the display 310.

When the user U raises his/her hand, the operation start detection unit 33 detects that the user U has raised his/her hand, and in turn, the icon display unit 42 raises the hand of the person icon 82. In other words, the person icon 82 having the right hand raised is displayed on the operation accepting support icon 81. Further, an operation right is given to the user U that has raised his/her hand. Once the operation right is given to the user U, even if another user U raises his/her hand, the gesture operation accepting program 110 does not accept an operation from the other user. In FIG. 22, although another user U enters the human detection range 51 from the left rear side, this user U cannot operate the application software 120. That is, the user U that first raises his/her hand at the operation position 52 obtains the operation right.

The user U has the operation area 54 created at the operation position 52 in the manner described above, and the user U may move his/her hand to display the cursor 3 or make a gesture to generate an event, for example.

Figure 23A:
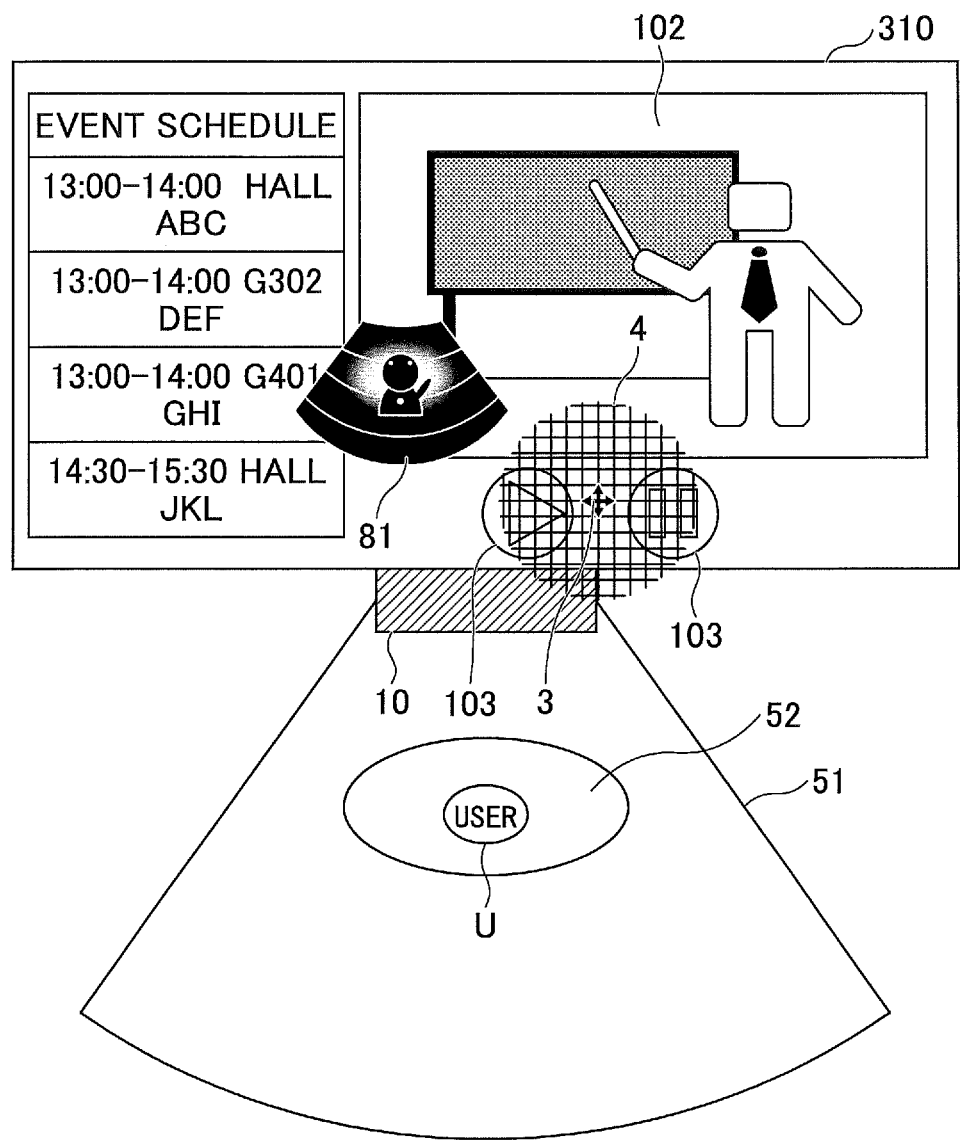
FIGS. 23A and 23B are diagrams illustrating a guide mesh displayed in a case where the user raises a hand at the operation position but the speed of the wrist joint or the hand joint is less than the threshold value.

FIG. 23A illustrates an example of the guide mesh 4 displayed when the user U raises a hand at the operation position 52 but the speed of the wrist joint or hand joint is less than the threshold value. In this case, the cursor display unit 41 displays the cursor 3 at an intersection point in the guide mesh 4. Further, because the cursor 3 moves only in the longitudinal or lateral direction, the user U can control minute movements of the cursor 3 along the grid of the guide mesh 4.

Note that the guide mesh 4 does not have to be displayed. That is, the cursor 3 may be controlled to move only in the longitudinal or lateral directions even if no guide mesh 4 is displayed, and the user U can still control the minute movements of the cursor 3. However, by displaying the guide mesh 4, the user U may be able to better understand that the cursor 3 can be moved only on the grid points of the guide mesh 4, and in this way, user operability may be improved, for example.

Also, note that the lateral lines of the guide mesh 4 need not be horizontal, and the longitudinal lines of the guide mesh 4 need not be vertical lines. For example, the guide mesh 4 may simply include straight lines that intersect.

Figure 23B:
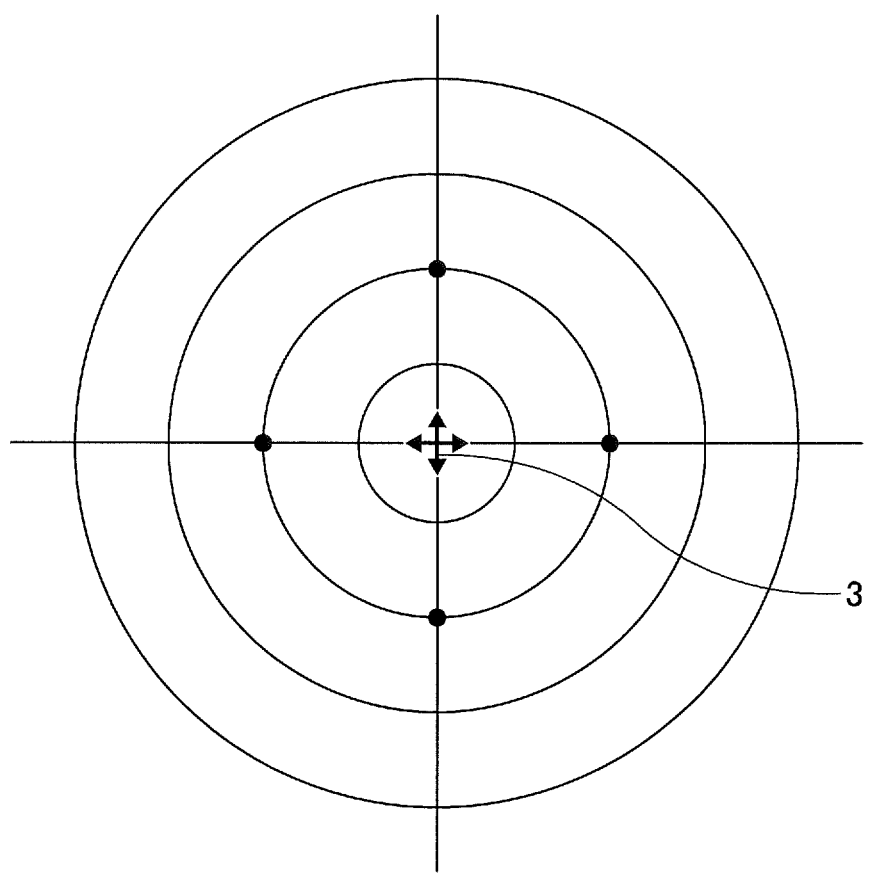

Further, as illustrated in FIG. 23B, the cursor 3 may move in radial directions on intersection points with concentric circles formed around a predetermined center position, for example.

<Operation Procedure>

Figure 24:
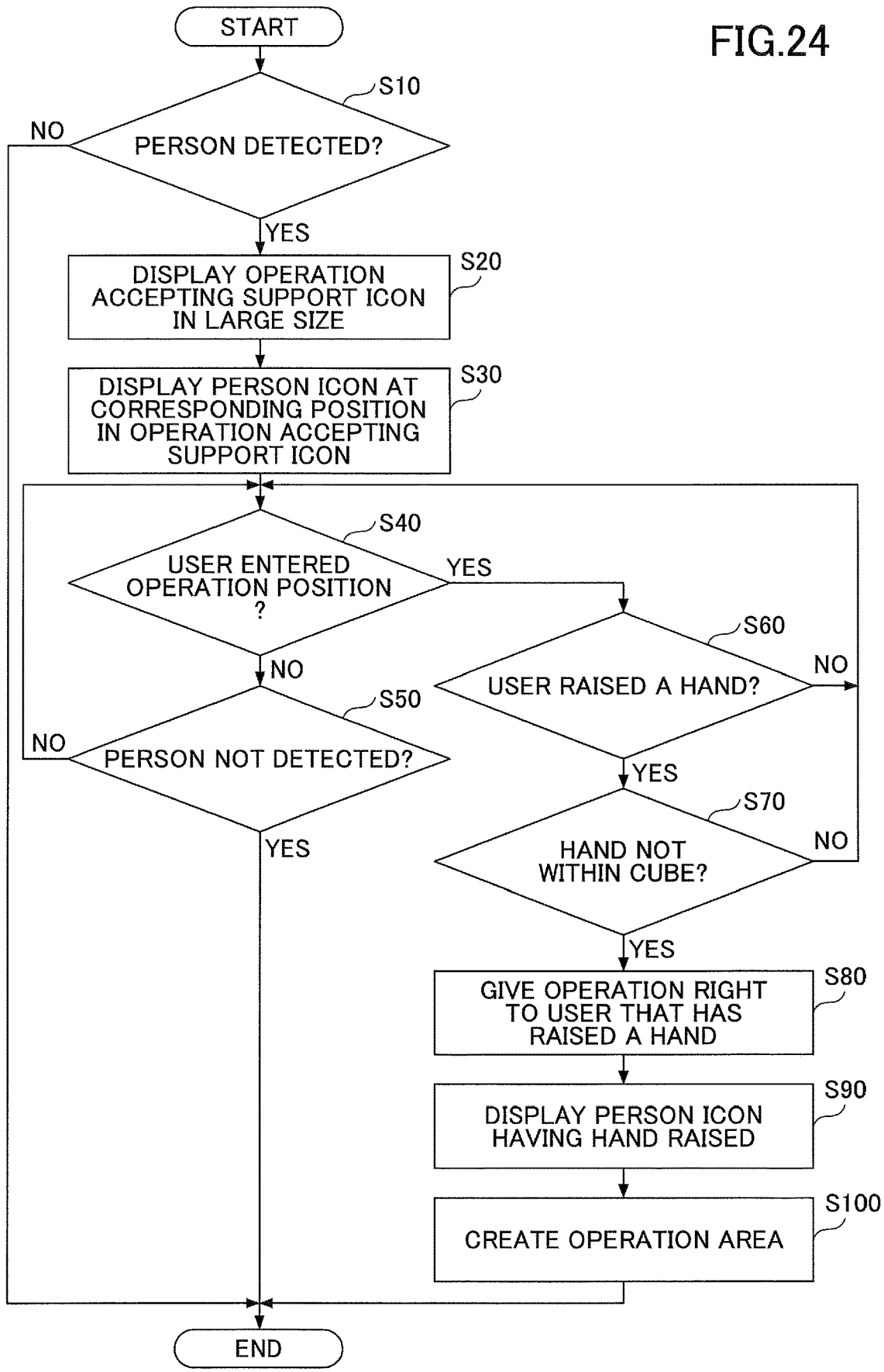
FIG. 24 is a flowchart illustrating process operations until the gesture operation accepting program grants an operation right to a user.

FIG. 24 is a flowchart illustrating example process operations up until the gesture operation accepting program 110 gives an operation right to the user U. The process of FIG. 24 may be repeatedly executed while the information processing apparatus 30 is executing the gesture operation accepting program 110, for example.

The human detection unit 32 determines whether the motion detection device 10 has detected a person (step S10). When no person is detected (NO in step S10), the process of FIG. 24 is ended.

When a person is detected by the motion detection device 10 (YES in step S10), human detection unit 32 determines that a user U has been detected and the icon display unit 42 displays the operation accepting support icon 81 on the display 310 in a large size (step S20). Note that after a certain period of time elapses, the icon display unit 42 displays the operation accepting support icon 81 in a smaller size even when a person (user U) is detected.

Then, based on the position of the user U that is detected, the icon display unit 42 displays the person icon 82 at the corresponding position on the icon of the operation accepting support icon 81 (step S30). Note that because the information acquisition unit 31 periodically acquires sensor information, the icon display unit 42 periodically updates the position of the person icon 82.

The operation start detection unit 33 determines whether the user U has entered the operation position 52 (step S40). That is, the operation start detection unit 33 determines whether the X, Y, and Z coordinates of the user U are included in the operation position 52.

Note that while it is determined that the user U has not entered the operation position 52 (NO in step S40), the operation start detection unit determines whether a person is not detected (step S50). When a person is not detected anymore (YES in step S50), the process of FIG. 24 is ended.

While a person is being detected (NO in step S50), the operation start detection unit 33 repeatedly determines whether the user U has entered the operation position 52 (step S40).

Then, when the user U enters the operation position 52 (YES in step S40), the operation start detection unit 33 determines whether the user U has raised his/her hand (step S60). For example, the operation start detection unit 33 determines whether the hand of the user U is positioned at least above a certain height from the waist of the user U.

Note that while it is determined that the user U has not raised his/her hand (NO in step S60), the determination processes of steps S40-S60 are repeatedly executed.

Upon determining that the user U has raised his/her hand (YES in step S60), the operation start detection unit 33 determines whether the hand is not positioned within a predetermined region, such as the cube 55 as described above (step S70). Note that the determination using the cube 55 is an example of a determination as to whether the hand of the user U is not positioned within a predetermined region. For example, the operation start detection unit 33 may confirm whether the right hand tip joint h or the right hand joint g is not positioned close to the head joint a. In this way, for example, if the user U is talking on the phone, such conduct of the user may be prevented from being detected as an operation directed to the application software 120. Note that the determination process of step S70 is executed in order to prevent giving an operation right to a user that does not intend to operate the application software 120. However, this process step is not indispensable and may be omitted in some embodiments. Also, in the determination process of step S70, the operation start detection unit 33 preferably determines whether the hand is not positioned within a rectangular cuboid extending from the head toward the waist (e.g. to a height slightly above the waist) of the user U as a predetermined region of the body of the user U, for example. In this way, a predetermined region independent of the user's posture can be created. Specifically, there may be cases where the user U is carrying an item, such as a binder, for example. Thus, by using such a rectangular cuboid, not only the area around the head but also the torso can be included in the non-operation region.

If a positive determination (YES) is made in step S70, the operation start detection unit 33 detects the intention of the user U to start operation of the application software 120 and gives an operation right to the user U that has raised his/her hand (step S80). As a result, even if another user U raises his/her hand at the operation position 52, the operation start detection unit 33 does not allow such other user U to operate the application software 120.

Then, the icon display unit 42 displays the person icon 82 having the hand raised at the position on the icon (step S90). In this way, the user U can determine that the user's movement of raising his/her hand has been recognized and can start operation.

When the intention to start operation is detected, the operation area creation unit 34 creates the operation area 54 (step S100). Thereafter, the user U can manipulate the position of the cursor 3 with the wrist joint or hand joint and operate the application software 120 with a gesture. The gesture operation accepting program 110 starts accepting operations of the application software 120 by the user U.

Figure 25:
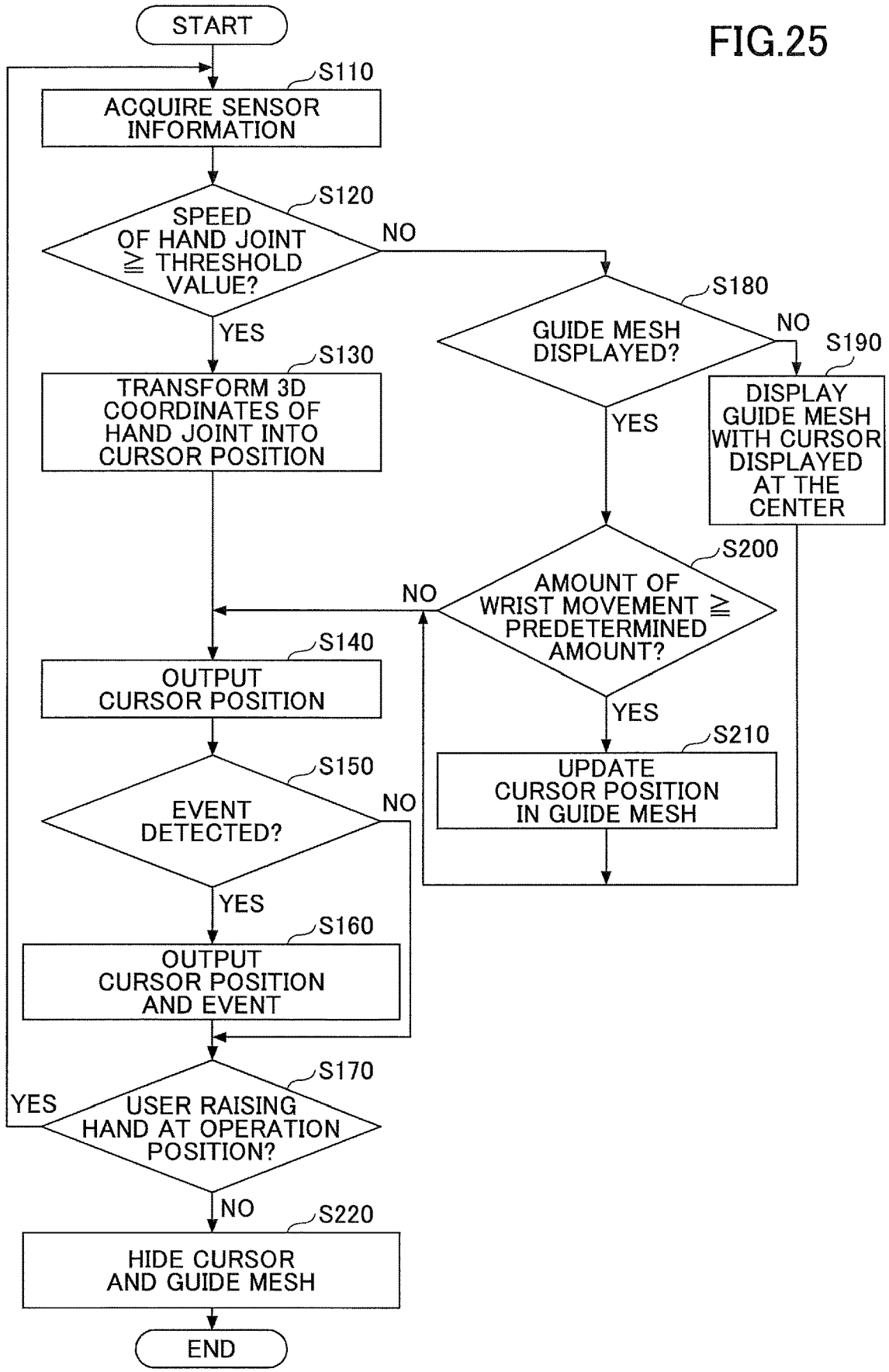
FIG. 25 is a flowchart illustrating process operations of the gesture operation accepting program accepting a user operation and operating application software.

FIG. 25 is a flowchart illustrating a process of the gesture operation accepting program 110 accepting an operation of the user U and operating the application software 120. The process of FIG. 25 starts when the operation area 54 is created.

First, the information acquisition unit 31 acquires sensor information (step S110).

Based on the sensor information, the speed detection unit 37 determines whether the speed of the hand joint is greater than or equal to a threshold value (step S120).

When the speed of the hand joint is greater than or equal to the threshold value (YES in step S120), the coordinate transformation unit 35 transforms the three-dimensional coordinates of the hand joint into a position of the cursor 3 (step S130).

The output unit 39 outputs the position of the cursor 3 to the application software 120 (step S140).

Also, the event determination unit 38 determines whether the user U has made a gesture to generate an event (step S150). That is, the user U can make a gesture even if the guide mesh 4 is not displayed.

When an event is detected, the output unit 39 outputs the position of the cursor 3 and the detected event to the application software 120 (step S160). Note that the position of the cursor 3 and the detected event do not have to be output at the same time.

Then, if the speed of the wrist joint is not greater than or equal to the threshold value (NO in step S120), the cursor display unit 41 determines whether the guide mesh 4 is being displayed (step S180). That is, if the guide mesh 4 is being displayed, there is no need to display the guide mesh 4 again.

When the guide mesh 4 is not being displayed (NO in S180), the cursor display unit 41 displays the guide mesh 4 with the cursor 3 being displayed approximately at the center of the guide mesh 4 (step S190). The cursor display unit 41 acquires the position of the cursor 3 from the coordinate transformation unit 35. Thereafter, the process proceeds to step S140.

When the guide mesh 4 is being displayed (YES in step S180), the cursor display unit 41 determines whether the three-dimensional coordinates of the wrist joint have moved by at least a predetermined amount (step S200). That is, in step S200, the cursor display unit 41 considers the movement of the wrist joint rather than the hand joint, and in this way, the user U can easily control minute movement of the cursor 3.

If a positive determination (YES) is made in step S200, the cursor display unit 41 updates the position of the cursor 3 on the guide mesh 4 (step S210). That is, the cursor display unit 41 transforms only the larger amount of movement, from among the amounts of movement in the X direction and Y direction of the wrist joint 3, into a position of the cursor 3. The cursor display unit 41 corrects the position of the cursor 3 to coincide with an intersection point in the guide mesh 4. Thereafter, the process proceeds to step S140, and the cursor 3 is displayed on the guide mesh 4.

Also, the operation start detection unit 33 determines whether the user U is in the operation position 52 and is raising his/her hand as appropriate (step S170). That is, the operation start detection unit 33 confirms whether the user U still has the intention to operate the software application 120.

If a positive determination (YES) is made in step S170, the process returns to step S110 and the operation of the application software 120 is continued.

If a negative determination (NO) is made in step S170, the output unit 39 requests the application software 120 to hide the guide mesh 4 and the cursor 3 (step S220), and the process of FIG. 25 is ended thereafter. In this case, the operation area 54 is deleted and the user U loses the operation right.

<Recording and Utilization of Sensor Information>

In the following, recording and utilization of sensor information will be described with reference to FIGS. 26 to 29. Digital signage applications typically do not have the capability to keep track of history information regarding whether content has been viewed by a user. In this respect, the information processing apparatus 30 according to the present embodiment acquires sensor information including the face orientation of the user U from the motion detection apparatus 10, and as such, a content provider or the like can subsequently analyze the sensor information to determine the number of users that have viewed a given display of content, for example. Further, the information recording unit 43 records a screen shot of the content displayed on the display 310, and as such, the content provider can analyze the types of screen shots that have attracted the interest of users, for example. Note that because a screen shot has a relatively large data size, a screen shot may be recorded only when the face orientation indicates that a user was facing the display 310, for example.

FIG. 26 illustrates an example of sensor information recorded by the information recording unit 43 for analyzing the face orientation of a user. FIG. 26 illustrates sensor information of one user recorded by the information recording unit 43 in XML format. In the following, the information items included in the sensor information are described.

The <TrackingID> tag indicates user identification information assigned to a user that is recognized (including a user that does not have an operation right).

The <Glasses> tag indicates whether the user is wearing glasses.

The <Happy> tag indicates whether the user is smiling.

The <LeftEyeClosed> tag indicates whether the left eye of the user is closed.

The <RightEyeClosed> tag indicates whether the right eye of the user is closed.

The <LookingAway> tag indicates whether the user is facing the display 310.

The <MouthMoved> tag indicates whether the mouth of the user is moving.

The <MouthOpen> tag indicates whether the mouth of the user is open.

The <Yaw> tag indicates the angle of the face in the lateral direction (yaw angle). When the neck is turning toward the left side with respect to the motion detection device 10, the yaw angle is positive, and when the neck is turned toward the right side, the yaw angle is negative.

The <Pitch> tag indicates an angle of the face with respect to the vertical direction (pitch angle). When the user is facing upward with respect to the motion detection device 10, the pitch angle is positive, and when the user is facing downward, the pitch angle is negative.

The <Roll> tag indicates the angle of the face in a tilting direction of the face (roll angle). The roll angle is zero when the eyes and the mouth are upright (vertical).

The <PositionInfo> tag indicates the position of the user, and the <X> tag indicates a distance in the lateral direction from the center of the motion detection device 10 (a positive value meaning to the right, and a negative value meaning to the left). The <Y> tag indicates the height, and the <Z> tag indicates a distance from the motion detection device 10.

The <LeftButtonDown> tag of the <MouseTrackingInfo> tag indicates whether the left mouse button is being pressed, and the <RightButtonDown> tag indicates whether the right mouse button is being pressed. The <MousePositionInfo> tag indicates the X coordinate and the Y coordinate of the cursor 3.

Note that <MouseTrackingInfo> and <MousePositionInfo> are recorded only for a user that has an operation right. The information recording unit 43 records information as described above for each user.

Figure 27:
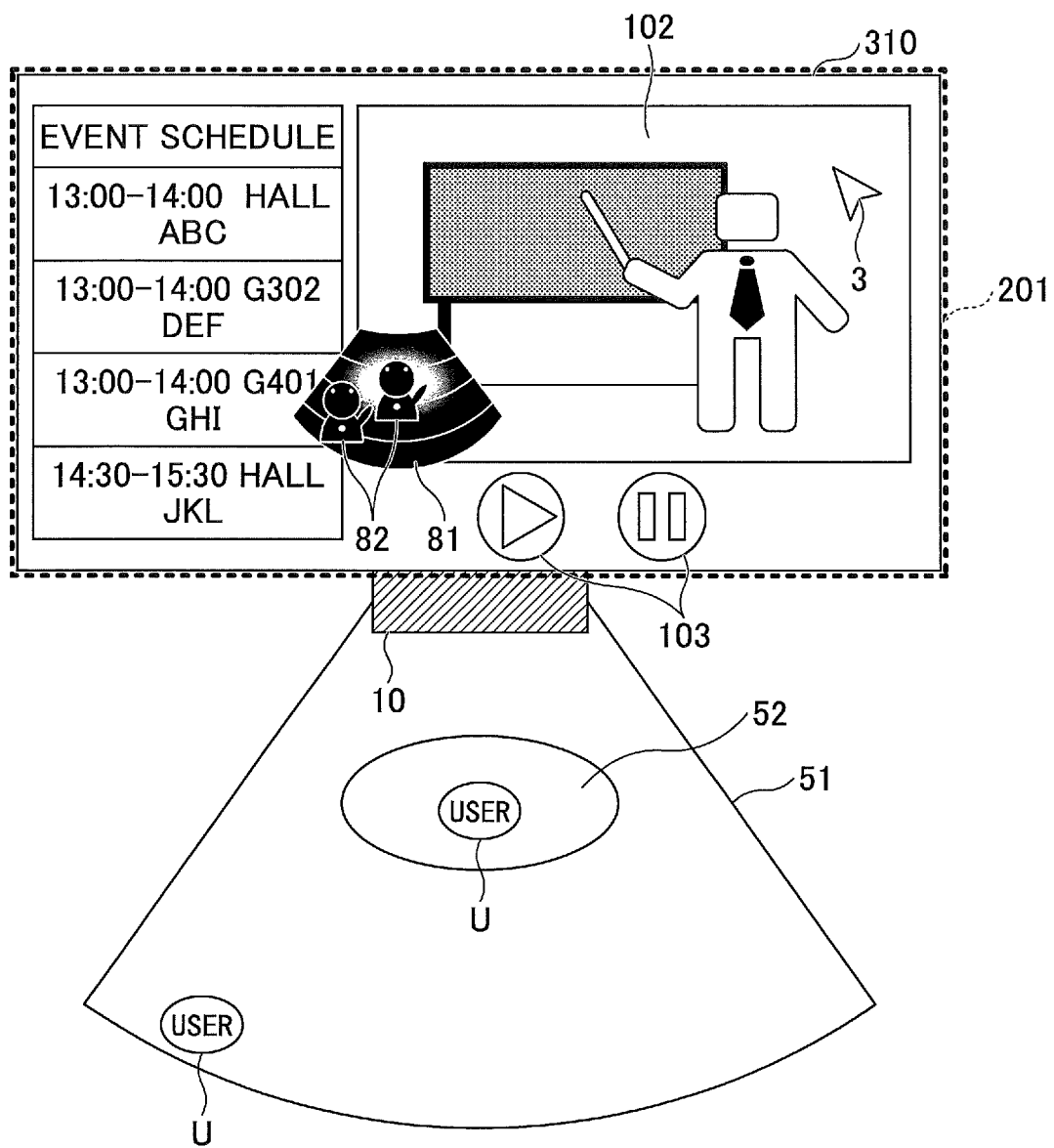
FIG. 27 is a diagram illustrating a screen shot acquired by the information recording unit upon acquiring the sensor information of FIG. 26.

FIG. 27 illustrates an example of a screen shot 201 acquired by the information recording unit 43 when the sensor information of FIG. 26 is acquired. In this way, the content provider can determine, based on the <Yaw>, <Pitch>, and <Roll> tags, the part of the content (screen shot 201) that is gazed by the user (the part that is of interest to the user) and further measure the duration of the user's gaze, for example. Also, based on the <MouseTrackingInfo> tag and the screen shot 201, the content provider can determine whether the user is performing an operation, and if so, the part of the screen shot 201 that has attracted the interest of the user.

Figure 28:
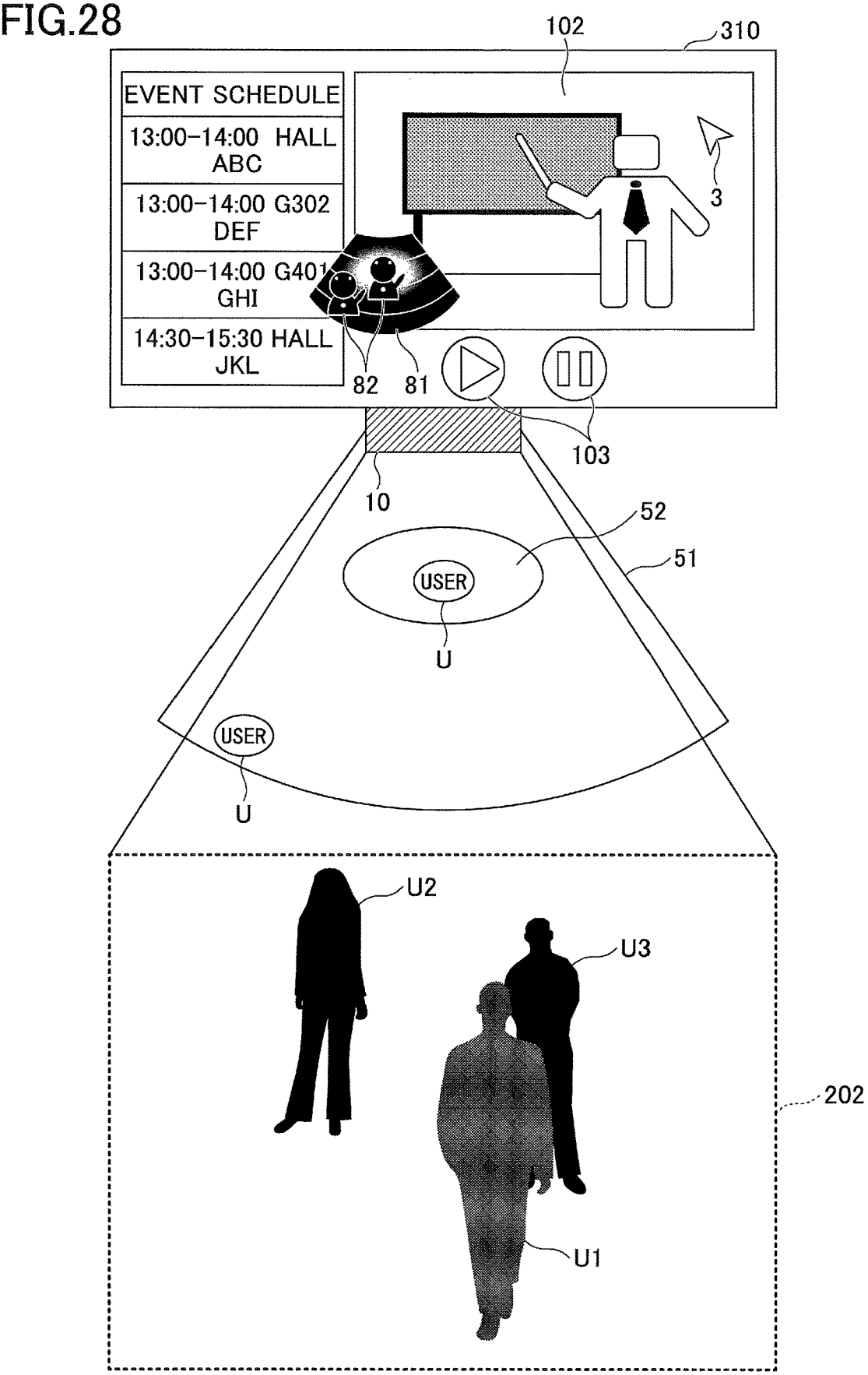
FIG. 28 is a diagram illustrating users that would not be detected.

Note that the motion detection device 10 uses distance information to detect a user, and as such, when there are multiple users, there may be cases where one or more users cannot be detected depending on the positions of the multiple of users. FIG. 28 is a diagram illustrating an example case where a user cannot be detected. In FIG. 28, there are three users, including users U1, U2, and U3, in the human detection range 51 of the motion detection device 10. However, because the user U1 and the user U3 overlap in the distance direction as viewed from the motion detection device 10, the motion detection device 10 cannot detect the user U3. That is, the motion detection device 10 cannot acquire skeleton information of the user U3.

However, because the motion detection device 10 captures a color image 202 as described above, the user U3 is captured in the color image 202. Also, distance information of the image region where the user U3 is captured is acquired from the color image 202. Thus, for example, the information recording unit 43 may perform face recognition and/or silhouette recognition on the color image 202 to determine that another user exists. In this way, the information recording unit 43 may be able to accurately determine the number of users in the human detection range 51.

Note that the image region where the user U3 is captured can be extracted as a region having Z coordinates within a certain range (e.g., processing range at the rear of the user U1), and in this way, an image region subjected to processing, such as face recognition, can be restricted to a region with Z coordinates at the rear of the user U1 to thereby reduce detection time, for example.

As described above, although the number of users that can be detected at once based on skeleton information alone may be limited (e.g., 6 persons), by using the color image 202 and distance information in combination with the skeleton information, even when multiple users are clustered together, the number of users can still be accurately detected. Also, in some embodiments, the information recording unit 43 may compare a color image acquired before the user U3 has been obstructed by the user U1 and a color image acquired after the obstruction, or compare distance information acquired before the user U3 has been obstructed by the user U1 and distance information after the obstruction, for example. When the number of users detected by the human detection unit 32 suddenly decreases, the information recording unit 43 can presume that one or more users are hidden and can search for users from a color image acquired at the time the number of users has decreased by performing face recognition with respect to an image region with about the same distance information as the distance information of the users acquired before they ceased to be detected, for example.

Figure 29:
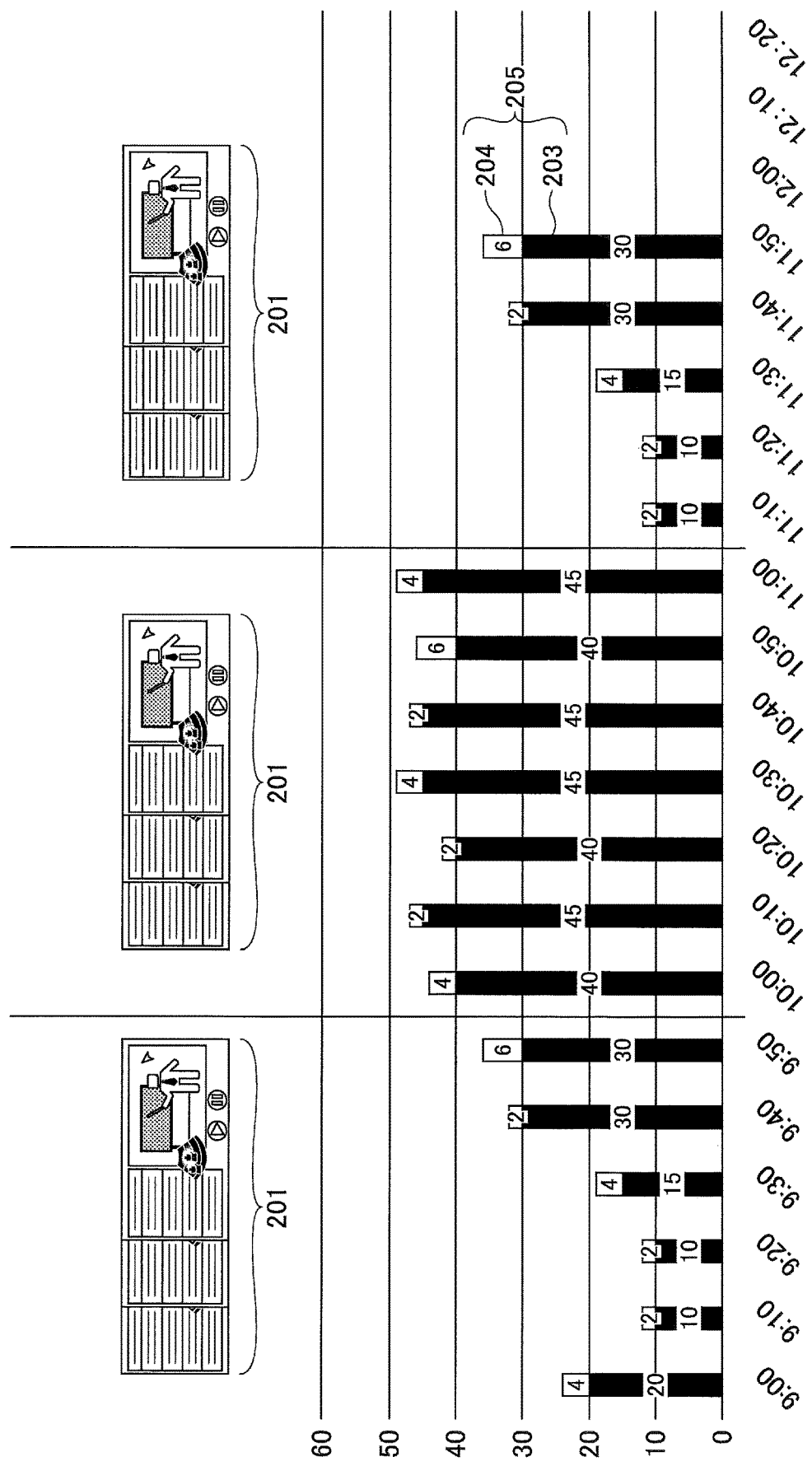
FIG. 29 is a diagram illustrating an example analysis of sensor information stored in a sensor information database by the information recording unit.

FIG. 29 is a diagram illustrating an example analysis of sensor information stored in the sensor information DB 44 by the information recording unit 43. The information processing apparatus 30 tallies the number of users for each time zone (every 10 minutes in FIG. 29) based on the sensor information stored in the sensor information DB 44. In FIG. 29, a bar graph 205 indicates the number of users for each time zone. Also, each bar graph 205 is divided into a section 204 indicating the number of users that were given an operation right and a section 203 indicating the number of other users. Note that the same <TrackingID> is assigned to the same user that is continuously detected, and in this way, the information processing apparatus 30 may be prevented from double counting one user as more than one, for example.

Also, in FIG. 29, screen shots 201 for the time zones are displayed above the bar graph 205 in a timeline. Alternatively, a representative screen shot 201 for the time zones may be displayed. A representative screenshot 201 may be a screenshot at the beginning or the end of the time zone, or a screen shot with the greatest image change, for example.

In this way, the content provider can determine the content that has attracted the interest or attention of many users. For example, in a case where the content of FIG. 29 corresponds to content of various instructors (school teacher, prep school instructor, supporter, etc.), the popularity of the instructors can be determined by obtaining an analysis of the sensor information as described above.

<Embodiments and Other Application Examples>

As described above, the information processing apparatus 30 according to an embodiment of the present invention restricts the moving direction of the cursor 3 to predetermined directions when a detected speed of motion is less than a threshold value, and in this way, operability of the cursor 3 may be improved. Also, when the detected speed of motion is less than the threshold value, the cursor 3 is not moved unless the right wrist joint f moves a distance of at least a predetermined amount. In this way, the cursor 3 may be prevented from moving when a user is making a gesture for performing a clicking operation, for example. Also, according to an aspect of the present embodiment, different joints of the user are used to perform operations depending on whether the detected speed of motion is less than the threshold value, and in this way, user operability may be improved. Also, according to an aspect of the present embodiment, the longitudinal and lateral side lengths of the operation area 54 may be adjusted according to the aspect ratio of the display 310, and in this way, operability of the cursor 3 may be further improved. Also, according to an aspect of the present embodiment, even when multiple users are detected, an operation right can be given to the user that first indicates an intention to operate. Also, according to an aspect of the present embodiment, the operation accepting support icon 81 is displayed, and in this way, a user can easily move to the operation position 52 and also determine that the user's operations are being accepted, for example.

Although the present invention has been described above with reference to certain embodiments, the present invention is not limited to these embodiments, and various modifications and changes may be made without departing from the scope of the present invention.

For example, in the above-described embodiments, operations such as moving the cursor 3 and clicking a mouse button have been described. However, the information processing apparatus 30 can acquire various other types of information from the motion of a user. For example, because content displayed by the display 310 is often video that changes automatically, the gesture operation accepting program 110 may superimpose a question such as "Do you want to tune to this channel?" on the content, for example. When a user makes a predetermined motion in response, the event determination unit 38 may detect the motion as an event, and the output unit 39 may send a pause request to the application software 120, for example. Note that the above question is preferably displayed only when a user is detected.

Also, a simple survey may be displayed along with content that is being viewed by a user, and the information processing apparatus 30 may acquire an answer to the survey from the user based on the motion of the user, for example.

In some embodiments, the information processing apparatus 30 may be implemented in a server client system. In this case, the information processing apparatus 30 may transmit sensor information to a server and receive the position of the cursor 3 and a detected event from the server. Then, the information processing apparatus 30 may transmit the position of the cursor 3 and the detected event to the application software 120.

Also, although the gesture operation accepting program 110 is mainly responsible for moving and displaying the cursor 3 in the above-described embodiment, the cursor 3 may also be displayed using a function of the OS 130, for example. Also, the cursor 3 may be displayed by the application software 120, for example.

Also, instead of associating the coordinates of the wrist joint or hand joint within the operation area 54 with a corresponding cursor position as in the above-described embodiment, the cursor 3 may be operated by a user based on the amount of movement of the user's hand. For example, when moving the cursor 3, the user may clasp his/her hand and move the hand at a speed greater than or equal to a predetermined speed. In turn, the coordinate transformation unit 35 may transform the amount of movement of the hand to an amount of movement of the cursor 3 and update the position of the cursor 3 to the latest position, for example. In this case, the operation area 54 may be omitted, for example.

Also, although the gesture corresponding to a left click event has been described in the above embodiment, the information processing apparatus 30 may be configured to distinguish between the right hand and the left hand and accept a gesture corresponding to a right click event, for example. Also, the cursor 3 may be moved based on three-dimensional coordinates of a joint of a leg/foot or a face orientation, for example. Also, a variety of human gestures in addition to the clasping of the hand may be associated with various events.

Also, although raising the hand is described as the movement for acquiring an operation right in the above-described embodiment, an operation right may also be given to a user in response to the following:

The microphone 17 detecting a voice or a sound (e.g., hand clap);

The operation start detection unit 33 determining that the voice or sound (e.g., hand clap) detected by the microphone 17 has a specific rhythm;

The operation start detection unit 33 analyzing image data and determining that a user is carrying a wireless device, such as a smartphone;

The operation start detection unit 33 detecting a signal transmitted from a wireless device such as a smartphone carried by a user;

The operation start detection unit 33 detecting a user that has raised his/her leg;

The operation start detection unit 33 detecting the hand of a user forming a predetermined shape (e.g., closed first for "rock", V sign for "scissors", and flat hand for "paper");

The operation start detection unit 33 detecting that a user is standing (e.g., in a conference or seminar setting, an operation right can be given when a person that is seated stands up);

The operation start detection unit 33 detecting that the facial expression of a user has turned into a specific facial expression meeting a predetermined condition (e.g., laughing, smiling); and/or The operation start detection unit 33 detecting that the gaze (face orientation) of a user is directed towards a specific region.

Also, the information processing apparatus 30 is not limited to the example detailed configuration described above. For example, FIG. 7 illustrates merely one conceptual division of processing units implemented by the information processing apparatus 30 based on the main functions of the information processing apparatus 30. The present invention is not limited by the method of division of the processing units and their names. The processing units of the information processing apparatus 30 can be divided into more processing units according to specific processes. Also, a processing unit may be subdivided to include more specific processes, for example.

In the following, further aspects and features of the present invention are described. Note that the speed detection unit 37 described above is an example embodiment of a speed detection unit, the coordinate transformation unit 35 is an example embodiment of a position information generation unit, the cursor display unit 41 is an example embodiment of a position indication display information item display unit, the event determination unit 38 is an example embodiment of a gesture detection unit, the output unit 39 is an example embodiment of an output unit, the operation start detection unit 33 is an example embodiment of a start action detection unit, the operation area creation unit 34 is an example embodiment of an area creation unit, the icon display unit 42 is an example embodiment of an icon display unit, and the information recording unit 43 is an example embodiment of an image recording unit. Also, the icon display unit 42 is an example embodiment of a position display unit, the information acquisition unit 31 is an example embodiment of an information acquisition unit, and the coordinate transformation unit 35 and the event determination unit 38 are an example embodiment of an operation accepting unit. Note that the reference numerals indicated in parentheses are only presented by way of example and should not be construed as limiting the features and aspects of the present invention described below.

According to one aspect of the present invention, an information processing apparatus (30) is provided that is configured to generate position information of a position indication display information item (3), which is displayed on a display device (310) and indicates a position designated by a user (U), the position information being generated based on motion information relating to a motion of the user (U) that is detected by a detection device (10). The information processing apparatus (30) includes a speed detection unit (37) configured to detect a speed of motion of the user (U) based on the motion information, and a position information generation unit (35) configured to generate the position information of the position indication display information item (3) by restricting a moving direction of the position indication display information item (3) to a predetermined direction when the speed of motion detected by the speed detection unit (37) does not meet a predetermined speed condition.

According to a further aspect of the present invention, the position information generation unit (35) restricts the moving direction of the position indication display information item (3) to a lateral direction or a longitudinal direction of the display device (310).

According to a further aspect of the present invention, the information processing apparatus (30) includes a position indication display information item display unit (41) configured to display the position indication display information item (3) based on the position information. When the speed detected by the speed detection unit (37) is less than a threshold value, the position indication display information item display unit (41) displays a mesh (4) together with the position indication display information item (3) and displays the position indication display information item (3) on an intersection point included in the mesh (4).

According to a further aspect of the present invention, when the speed detected by the speed detection unit (37) is less than the threshold value and an amount of motion of the user is greater than or equal to a predetermined amount, the position information generation unit (35) updates the position information of the position indication display information item (3) in the mesh (4).

According to a further aspect of the present invention, the position information generation unit (35) generates the position information of the position indication display information item (3) based on different body parts of the user (U) depending on whether the speed detected by the speed detection unit (37) is greater than or equal to a threshold value.

According to a further aspect of the present invention, the information processing apparatus (30) includes a gesture detection unit (38) configured to detect a predetermined gesture based on the motion information, and an output unit (39) configured to output the position information and the predetermined gesture detected by the gesture detection unit (38) to application software (120).

According to a further aspect of the present invention, the gesture detection unit (38) detects the user (U) moving a hand without moving a wrist as the predetermined gesture based on the motion information.

According to a further aspect of the present invention, the information processing apparatus (30) includes a start motion detection unit (33) configured to detect, based on the motion information, a predetermined motion made by the user (U) to start inputting the position information. When the detection device (10) detects a plurality of users (U), the start motion detection unit (33) gives an operation right to input the position information to a user (U) that has made the predetermined motion the earliest among the plurality of users (U), and the position information generation unit (35) generates the position information of the position indication display information item (3) based on the motion information of the user (U) that has been given the operation right by the start motion detection unit (33).

According to a further aspect of the present invention, the information processing apparatus (30) includes an area creation unit (34) configured to create an operation area (54) above a shoulder of the user (U) when the start motion detection unit (33) detects the predetermined motion that corresponds to raising a hand, and the position information generation unit (35) transforms coordinates of the hand of the user (U) with respect to an origin of the operation area (54) into the position information of the position indication display information item (3) on the display device (310).

According to a further aspect of the present invention, the predetermined motion corresponds to raising a hand and having the hand positioned outside a predetermined region (55) of the body of the user (U).

According to a further aspect of the present invention, the area creation unit (34) adjusts a longitudinal length and a lateral length of the operation area (54) based on an aspect ratio of the display device (310).

According to a further aspect of the present invention, the information processing apparatus (30) includes an icon display unit (42) configured to display an icon (81) representing a detection range (51) of the detection device (10) on the display device (310) and display a person icon (82) representing the user (U) that is detected by the detection device (10) within the icon (81) based on a user position of the detected user (U) that is included in the motion information.

According to a further aspect of the present invention, the icon display unit (42) explicitly displays an indication (83) of an operation position (52) at which the user (U) can input the position information in the icon (81) representing the detection range (51).

According to a further aspect of the present invention, when the user raises a hand at the operation position (52), the icon display unit (42) displays the person icon (82) having a hand raised.

According to a further aspect of the present invention, a case where the predetermined speed condition is not met corresponds to a case where the speed is less than a threshold value.

According to a further aspect of the present invention, the information processing apparatus (30) includes an image recording unit (43) configured to record face orientation information relating to a face orientation of the user (U) that is included in the motion information, a number of users (U), and an image displayed on the display device (310) in association with each other.

According to another aspect of the present invention, a program (304p) is provided that is run on an information processing apparatus (30) configured to generate position information of a position indication display information item (3), which is displayed on a display device (310) and indicates a position designated by a user (U), based on motion information relating to a motion of the user (U) detected by a detection device (10). Upon being executed, the program (304p) causes the information processing apparatus (30) to implement processes of detecting a speed of motion of the user (U) based on the motion information, and generating the position information of the position indication display information item (3) by restricting a moving direction of the position indication display information item (3) to a predetermined direction when the detected speed of motion does not meet a predetermined speed condition.

According to another aspect of the present invention, a position information generation method is provided that is implemented by an information processing apparatus (30) configured to generate position information of a position indication display information item (3), which is displayed on a display device (310) and indicates a position designated by a user (U), based on motion information relating to a motion of the user (U) detected by a motion detection device (310). The information generation method includes detecting a speed of motion of the user (U) based on the motion information, and generating the position information of the position indication display information item (3) by restricting a moving direction of the position indication display information item (3) to a predetermined direction when the detected speed of motion does not meet a predetermined speed condition.

According to another aspect of the present invention, an information processing system (100) is provided that includes a detection device (10) configured to detect motion information relating to a motion of a user (U), a speed detection unit (37) configured to detect a speed of motion of the user (U) based on the motion information, and a position information generation unit (35) configured to generate position information of a position indication display information item (3), which is displayed on a display device (310) and indicates a position indicated by the user (U), by restricting a moving direction of the position indication display information item (3) to a predetermined direction when the detected speed of motion does not meet a predetermined speed condition.

According to another aspect of the present invention, an information processing apparatus (30) is provided that is configured to acquire user position information relating to a user position of a user (U) from a detection device (10) that detects the user position of the user (U) in the vicinity of a display device (310). The information processing apparatus (30) includes a position display unit (42) configured to transform the user position of the user (U) into a corresponding display position on the display device (310) and display user position display information (82) representing the user position at the corresponding display position on the display device (310). The position display unit (42) displays on the display device (310), guidance position display information (83) for guiding the user (U) to an operation position (52) at which the user (U) operates display content displayed on the display device (310) based on a motion of the user (U).

According to a further aspect of the present invention, the information processing apparatus (30) includes an information acquisition unit (31) configured to acquire motion information relating to the motion of the user (U) from the detection device (10). The detection device (10) detects the motion information in addition to the user position information of the user (U) that is positioned at the operation position (52), and the guidance position display information (83) represents the operation position (52) at which the motion information of the user (U) can be detected by the detection device (10).

According to a further aspect of the present invention, the information processing apparatus (30) includes an operation accepting unit (35, 38) configured to accept an operation with respect to application software (120) that is run on the information processing apparatus (30) based on the motion information. The guidance position display information (83) represents the operation position (52) at which the user (U) can operate the application software (120).

According to a further aspect of the present invention, when the user position display information (82) is displayed in the guidance position display information (83) and the motion information of the user (U) indicates that the user (U) has raised a hand, the position display unit (42) changes a shape of the user position display information (82) into a shape representing the user (U) having the hand raised.

According to a further aspect of the present invention, the position display unit (42) displays detection range display information (81) representing a detection range (51) within which the user (U) can be detected by the detection device (10) on the display device (310).

According to a further aspect of the present invention, when the detection device (10) detects the user (U), the position display unit (42) displays the user position display information (82) within the detection range display information (81).

According to a further aspect of the present invention, the user position information represents a first relative position relative to the detection device (10), and the position display unit (42) transforms the first relative position into a second relative position with respect to a predetermined position in the detection range display information (81) and displays the user position display information (82) at the second relative position in the detection range display information (81).

According to another aspect of the present invention, a display system (100) is provided that includes at least one information processing apparatus (30) configured to guide a user (U) based on user position information relating to a user position of the user (U) that is acquired from a detection device (10) configured to detect the user position of the user (U) in the vicinity of a display device (310). The display system (100) includes a position display unit (42) configured to transform the user position information into a corresponding display position on the display device (310) and display user position display information (82) representing the user position of the user (U) at the corresponding display position on the display device (310). The position display unit (42) displays on the display device (310), guide position display information (83) for guiding the user (U) to an operation position (52) at which the user operates display content displayed on the display device (310) based on a motion of the user (U).

According to another aspect of the present invention, a display system (100) is provided that includes a detection device (10) configured to detect a user position of a user (U) in the vicinity of a display device (310), an information acquisition unit (31) configured to acquire user position information relating to the user position of the user (U) from the detection device (10), a program (304p) executed by an information processing apparatus (30) to implement functions of a position display unit (42) that transforms the user position information into a corresponding display position on the display device (310) and displays user position display information (82) representing the user position of the user (U) at the corresponding display position on the display device (310), and the display device (310) that is controlled by the position display unit (42) to display guide position display information (83) for guiding the user (U) to an operation position (52) at which the user (U) operates display content displayed on the display device (310) based on a motion of the user (U).

According to another aspect of the present invention, a program (304p) to be installed in an information processing apparatus (30) is provided. Upon being executed, the program (304p) causes the information processing apparatus (30) to implement functions of an information acquisition unit (31) configured to acquire user position information relating to a user position of a user (U) from a detection device (10) that detects the user position of the user (U) in the vicinity of the display device (10), and a position display unit (42) configured to transform the user position information into a corresponding display position on the display device (310) and display user position display information (82) representing the user position of the user (U) at the corresponding display position on the display device (310). The position display unit (42) displays on the display device (310), guidance position display information (83) for guiding the user (U) to an operation position (52) at which the user (U) operates display content displayed on the display device (310) based on a motion of the user (U).

Note that the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may be implemented by a processor of any desired type and number. For example, the CPU may be implemented by at least one processor. The RAM may be implemented by any desired volatile or nonvolatile memory. The HDD may be implemented by any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

Each of the functions of the above described embodiments may be implemented by one or more processing circuits or circuitry. Processing circuitry includes a programmed processor, as a process includes circuitry. A processing circuit also include devices, such as an application specific integrated circuit (ASIC), a DSP (digital signal processor), a FPGA (field programmable gate array), and conventional circuit components arranged to perform the described functions.

What is claimed is:

1. An information processing apparatus comprising:
a memory storing a program; and
at least one processor configured to execute the program to implement processes of
detecting user position information relating to a user position of a user from among one or more users within a detection region in front of a display device based on position information relating to the user position of each user of the one or more users detected by a detection device;
generating user icons of the detected one or more users to be included in a user interface screen displayed on the display device, the user icons being displayed at positions in the user interface screen based on the detected user positions;
detecting a speed of motion of the user from among the one or more users based on motion information relating to a motion of each user of the one or more users detected by the detection device;
displaying guidance position display information for guiding the user to an operation position within the detection region of the detection device at which the user operates display content displayed on the display device based on the position and motion of the user, the guidance position display information including
a first guidance position display region corresponding to the detection region of the detection device, and
a second guidance position display region corresponding to the operation position;
detecting, based on the motion information, a predetermined motion made by the user from among the detected one or more users, the predetermined motion being a motion to initiate inputting position information of a position indication display information item included in the user interface screen;
causing the generated user icon corresponding to the user from among the detected one or more users, the user being present in the operation position and first to complete the predetermined motion, to make the predetermined motion;
giving an operation right to input the position information of the position indication display information item to the user from among the detected one or more users who is both present in the operation position and the first to complete the predetermined motion; and
generating the position information of the position indication display information item indicating a position designated by the user given the operation right, based on the motion information relating to the motion of the user;
displaying the position indication display information item based on the position information; and
displaying a mesh together with the position indication display information item and displaying the position indication display information item on an intersection point included in the mesh when the detected speed of motion of a hand of the user is less than a threshold value, wherein
the position of the displayed user icon is displayed relative to the first guidance position display region and the second guidance position display region of guidance position display information on the display device based on the detected user position relative to the operation position within the detection region of the detection device,
the user icon of the user given the operation right from among detected one or more users is distinguishably displayed in the user interface screen from the user icons of the detected one or more users who have not been given the operation right,
the user given the operation right from among the detected one or more users retains the operation right, even in a case where another user from among the detected one or more users within the detection region makes the predetermined motion,
the position information of the position indication display information item is generated by restricting a moving direction of the position indication display information item to a predetermined direction when the detected speed of motion of the user does not meet a predetermined speed condition, and
the display of the mesh is cancelled when the detected speed of the hand of the user is equal to or exceeds the threshold value.

2. The information processing apparatus according to claim 1, wherein the moving direction of the position indication display information item is restricted to a lateral direction or a longitudinal direction of the display device.

3. The information processing apparatus according to claim 1, wherein the processor further implements a process of
updating the position information of the position indication display information item in the mesh when the detected speed of motion of the user is less than the threshold value and an amount of motion of the user is greater than or equal to a predetermined amount.

4. The information processing apparatus according to claim 1, wherein
the position information of the position indication display information item is generated based on different body parts of the user depending on whether the detected speed of motion of the user is greater than or equal to a threshold value.

5. The information processing apparatus according to claim 1, wherein the processor further implements processes of
creating an operation area above a shoulder of the user when the predetermined motion made by the user that corresponds to raising a hand is detected; and
transforming coordinates of the hand of the user with respect to an origin of the operation area into the position information of the position indication display information item on the display device.

6. The information processing apparatus according to claim 1, wherein the predetermined motion corresponds to raising the hand and having the hand positioned outside a predetermined region of the body of the user.

7. The information processing apparatus according to claim 1, wherein the processor further implements a process of adjusting a longitudinal length and a lateral length of the operation area based on an aspect ratio of the display device.

8. The information processing apparatus according to claim 1, wherein a case where the predetermined speed condition is not met corresponds to a case where the speed is less than a threshold value.

9. The information processing apparatus according to claim 1, wherein the processor further implements a process of
recording face orientation information relating to a face orientation of the user that is included in the motion information, a number of users, and an image displayed on the display device in association with each other.

10. The information processing apparatus according to claim 1, wherein
the detection device detects the motion information in addition to the user position info nation of the user that is positioned at the operation position; and
the guidance position display information represents the operation position at which the motion information of the user can be detected by the detection device.

11. The information processing apparatus according to claim 10, the processor further implements a process of
accepting an operation with respect to application software that is run on the information processing apparatus based on the motion information;
wherein the guidance position display information represents the operation position at which the user can operate the application software.

12. The information processing apparatus according to claim 10, wherein the processor further implements a process of
changing a shape of the user position display information into a shape representing the user having a hand raised when the user position display information is displayed in the guidance position display information and the motion information of the user indicates that the user has raised a hand.

13. The information processing apparatus according to claim 1, wherein the processor further implements a process of
displaying on the display device, detection region display information representing a detection region within which the user can be detected by the detection device.

14. The information processing apparatus according to claim 13, wherein the processor further implements a process of
displaying the user position display information within the detection region display information when the detection device detects the user.

15. The information processing apparatus according to claim 13, wherein
the user position information represents a first relative position relative to the detection device; and
the processor further implements processes of transforming the first relative position into a second relative position with respect to a predetermined position in the detection region display information, and displaying the user position display information at the second relative position in the detection region display information.

16. The information processing apparatus according to claim 1, wherein
when the detection device detects the user position, the guidance position display information is displayed in a large size.

17. The information processing apparatus according to claim 1, wherein
the processor determines that the predetermined motion made by the user does not correspond to the motion to initiate inputting position information of the position indication display information item included in the displayed user interface screen in a case where the predetermined motion is made within a space, centered on a head of the user, having a predetermined shape and extending around the head of the user by a predetermined depth.

18. A position information generation method implemented by an information processing apparatus configured to generate position information of a position indication display information item, which is displayed on a display device and indicates a position designated by a user, the position information generation method comprising:
detecting user position info nation relating to a user position of a user from among one or more users within a detection region in front of a display device based on position information relating to the user position detected by a detection device;
generating a user icon of the detected user to be included in a user interface screen displayed on the display device, the user icon being displayed at a position in the user interface screen based on the detected user position;
acquiring motion information relating to a motion of the user from among one or more users detected by a detection device;
detecting a speed of motion of the user from among the detected one or more users based on the motion information;
displaying guidance position display information for guiding the user to an operation position within the detection region of the detection device at which the user operates display content displayed on the display device based on the position and motion of the user, the guidance position display information including
a first guidance position display region corresponding to the detection region of the detection device, and
a second guidance position display region corresponding to the operation position;
detecting, based on the motion information, a predetermined motion made by the user from among the detected one or more users, the predetermined motion being a motion to initiate inputting position information of a position indication display information item included in the user interface screen;
causing the generated user icon corresponding to the user from among the detected one or more users, the user being present in the operation position and first to complete the predetermined motion, to make the predetermined motion;
giving an operation right to input the position information of the position indication display information item to the user from among the detected one or more users who is both present in the operation position and the first to complete the predetermined motion;
generating the position information of the position indication display information item indicating a position designated by the user given the operation right, based on the motion information relating to the motion of the user;
displaying the position indication display information item based on the position information; and
displaying a mesh together with the position indication display information item and displaying the position indication display information item on an intersection point included in the mesh when the detected speed of motion of a hand of the user is less than a threshold value, wherein
the position of the displayed user icon is displayed relative to the first guidance position display region and the second guidance position display region of guidance position display information on the display device based on the detected user position relative to the operation position within the detection region of the detection device,
the user icon of the given the operation right from among detected one or more users is distinguishably displayed in the user interface screen from the user icons of the detected one or more users who have not been given the operation right,
the user given the operation right from among the detected one or more users retains the operation right, even in a case where another user from among the detected one or more users within the detection region makes the predetermined motion,
the position information of the position indication display information item is generated by restricting a moving direction of the position indication display information item to a predetermined direction when the detected speed of motion of the user does not meet a predetermined speed condition, and
the display of the mesh is cancelled when the detected speed of the hand of the user is equal to or exceeds the threshold value.

19. An information processing system comprising:
a detection device configured to detect motion information relating to a motion of a user from among one or more users detected by the detection device;
an information processing apparatus including a memory storing a program and at least one processor configured to execute the program to implement processes of
detecting user position information relating to a user position of a user from among one or more users within a detection region in front of a display device based on position information relating to the user position of each user of the one or more users detected by a detection device;
generating user icons of the detected one or more users to be included in a user interface screen displayed on the display device, the user icons being displayed at positions in the user interface screen based on detected positions of the detected one or more users;
detecting a speed of motion of the user from among the detected one or more users based on the motion information of each user of the detected one or more users;
displaying guidance position display information for guiding the user to an operation position within the detection region of the detection device at which the user operates display content displayed on the display device based on the position and motion of the user, the guidance position display information including
a first guidance position display region corresponding to the detection region of the detection device, and
a second guidance position display region corresponding to the operation position;
detecting, based on the motion information, a predetermined motion made by the user from among the detected one or more users, the predetermined motion being a motion to initiate inputting position information of a position indication display information item included in a user interface screen displayed on a display device;
causing the generated user icon corresponding to the user from among the detected one or more users, the user being present in the operation position and first to complete the predetermined motion, to make the predetermined motion;
giving an operation right to input the position information of the position indication display information item to the user from among the detected one or more users who is the first to complete the predetermined motion; and
generating the position information of the position indication display information item indicating a position designated by the user given the operation right, based on the motion information relating to the motion of the user;
displaying the position indication display information item based on the position information; and
displaying a mesh together with the position indication display information item and displaying the position indication display information item on an intersection point included in the mesh when the detected speed of motion of a hand of the user is less than a threshold value, wherein
the position of the displayed user icon is displayed relative to the first guidance position display region and the second guidance position display region of guidance position display information on the display device based on the detected user position relative to the operation position within the detection region of the detection device, the user icon of the given the operation right from among detected one or more users is distinguishably displayed in the user interface screen from the user icons of the detected one or more users who have not been given the operation right, the user given the operation right from among the detected one or more users retains the operation right, even in a case where another user from among the detected one or more users within the detection region makes the predetermined motion, and the position information of the position indication display information item is generated by restricting a moving direction of the position indication display information item to a predetermined direction when the detected speed of motion of the user does not meet a predetermined speed condition, and the display of the mesh is cancelled when the detected speed of the hand of the user is equal to or exceeds the threshold value.

\* \* \* \* \*